United States Patent
Tanaka et al.

(10) Patent No.: US 11,195,658 B2
(45) Date of Patent: Dec. 7, 2021

(54) MULTI-LAYER CERAMIC ELECTRONIC DEVICE

(71) Applicant: TDK CORPORATION, Tokyo (JP)

(72) Inventors: Hirobumi Tanaka, Tokyo (JP); Toshio Sakurai, Tokyo (JP); Keisuke Okai, Tokyo (JP); Daisuke Iwanaga, Tokyo (JP); Hisashi Nakata, Tokyo (JP); Tomoya Shibasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/668,044

(22) Filed: Oct. 30, 2019

(65) Prior Publication Data

US 2020/0161051 A1    May 21, 2020

(30) Foreign Application Priority Data

Oct. 30, 2018  (JP) .............................. JP2018-203974
Mar. 27, 2019  (JP) .............................. JP2019-060530
Mar. 27, 2019  (JP) .............................. JP2019-060539
Oct. 29, 2019  (JP) .............................. JP2019-195875

(51) Int. Cl.
*H01G 4/232* (2006.01)
*H01G 4/005* (2006.01)
*H01G 4/12* (2006.01)
*H01G 4/224* (2006.01)
*H01G 4/30* (2006.01)

(52) U.S. Cl.
CPC ............. *H01G 4/232* (2013.01); *H01G 4/005* (2013.01); *H01G 4/12* (2013.01); *H01G 4/224* (2013.01); *H01G 4/30* (2013.01)

(58) Field of Classification Search
CPC .......... H01G 4/232; H01G 4/30; H01G 4/005; H01G 4/12; H01G 4/224
USPC ....................................................... 361/306.3
See application file for complete search history.

(56) References Cited

U.S. PATENT DOCUMENTS

| 5,339,068 A | 8/1994 | Tsunoda et al. |
| 10,153,090 B2 * | 12/2018 | Kato ...................... H01G 4/232 |
| 2012/0019978 A1 | 1/2012 | Yoshida |
| 2012/0019981 A1 | 1/2012 | Yoshida |
| 2015/0187495 A1 * | 7/2015 | Maeda ..................... H01G 4/30 361/303 |

(Continued)

FOREIGN PATENT DOCUMENTS

| JP | 2010-147098 A | 7/2010 |
| JP | 2012-044149 A | 3/2012 |

(Continued)

OTHER PUBLICATIONS

Jun. 30, 2021 Office Action issued in U.S. Appl. No. 16/668,050.

*Primary Examiner* — Timothy J Thompson
*Assistant Examiner* — Michael F McAllister
(74) *Attorney, Agent, or Firm* — Oliff PLC

(57) ABSTRACT

A multi-layer ceramic electronic device includes an element body and terminal electrodes. The terminal electrodes include end electrode parts covering ends of the element body in which internal electrode layers are led and upper electrode parts continuing to the end electrode parts and each partially covering an upper surface of the element body in a lamination direction. The terminal electrodes are not substantially formed on a lower surface of the element body located opposite to the upper surface of the element body in the lamination direction.

4 Claims, 32 Drawing Sheets

(56) References Cited

U.S. PATENT DOCUMENTS

| | | | |
|---|---|---|---|
| 2017/0213649 A1 | 7/2017 | Kato et al. | |
| 2017/0250027 A1* | 8/2017 | Kowase | H01G 4/232 |
| 2017/0250028 A1 | 8/2017 | Makino | |
| 2017/0278634 A1* | 9/2017 | Kato | H01G 4/012 |
| 2018/0025844 A1 | 1/2018 | Sato et al. | |
| 2018/0134613 A1 | 5/2018 | Kobuke et al. | |
| 2019/0006106 A1* | 1/2019 | Kowase | H01G 4/30 |
| 2019/0287720 A1* | 9/2019 | Mori | H01G 4/232 |
| 2020/0066447 A1 | 2/2020 | Murai et al. | |

FOREIGN PATENT DOCUMENTS

| | | |
|---|---|---|
| JP | 2013-235928 A | 11/2013 |
| JP | 2015-023173 A | 2/2015 |
| JP | 2017-028254 A | 2/2017 |
| JP | 2017-152621 A | 8/2017 |
| KR | 10-2012-0018715 A | 3/2012 |
| KR | 10-2017-0085873 A | 7/2017 |

* cited by examiner

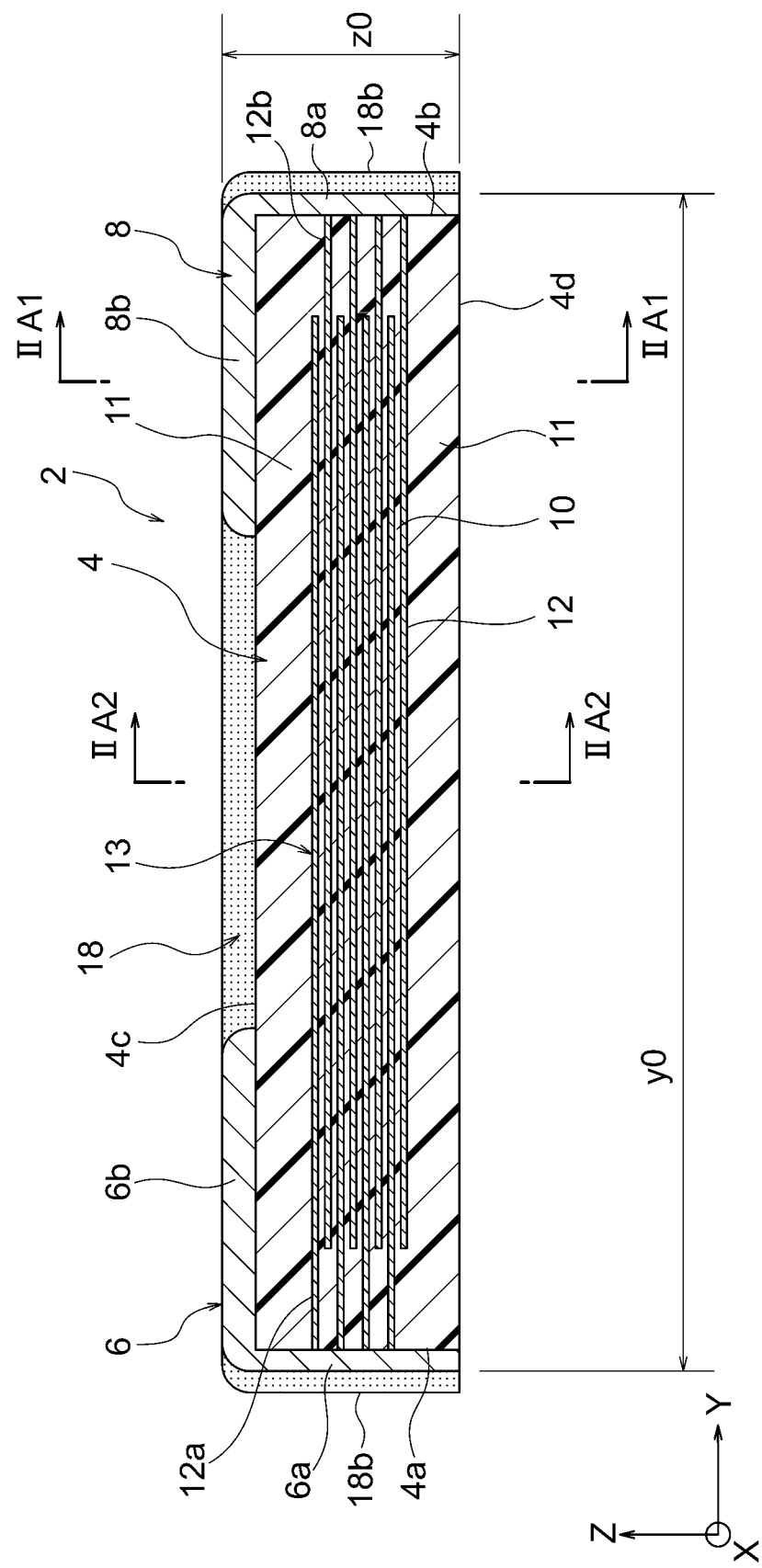

FIG. 2A1
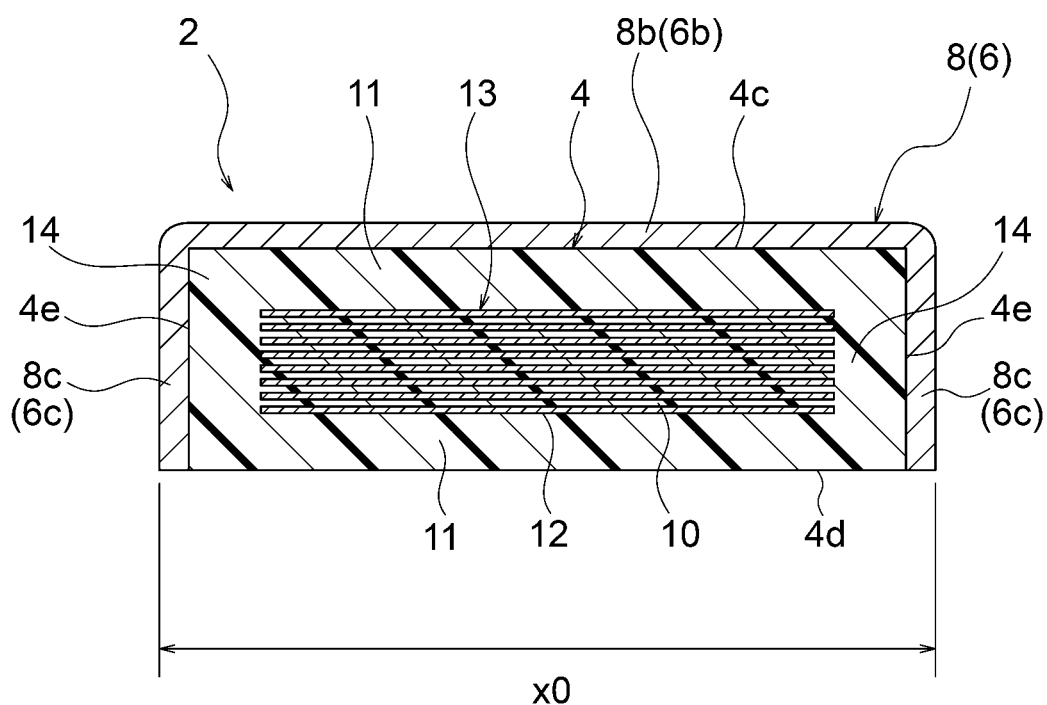

FIG. 2A2
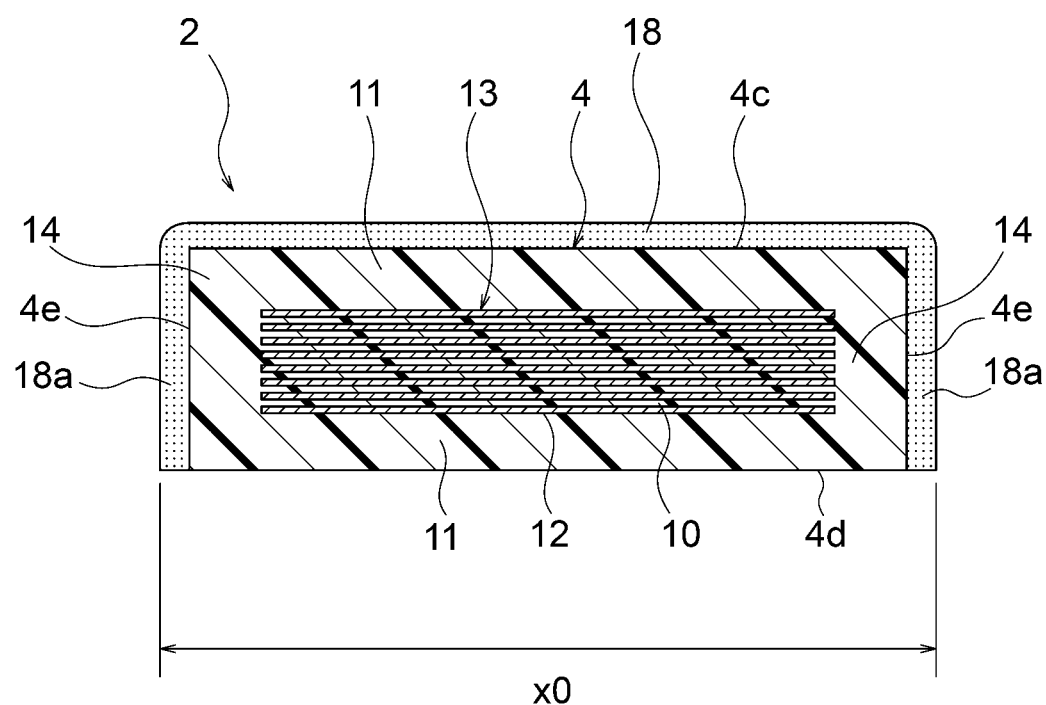
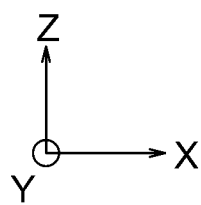

FIG. 2B
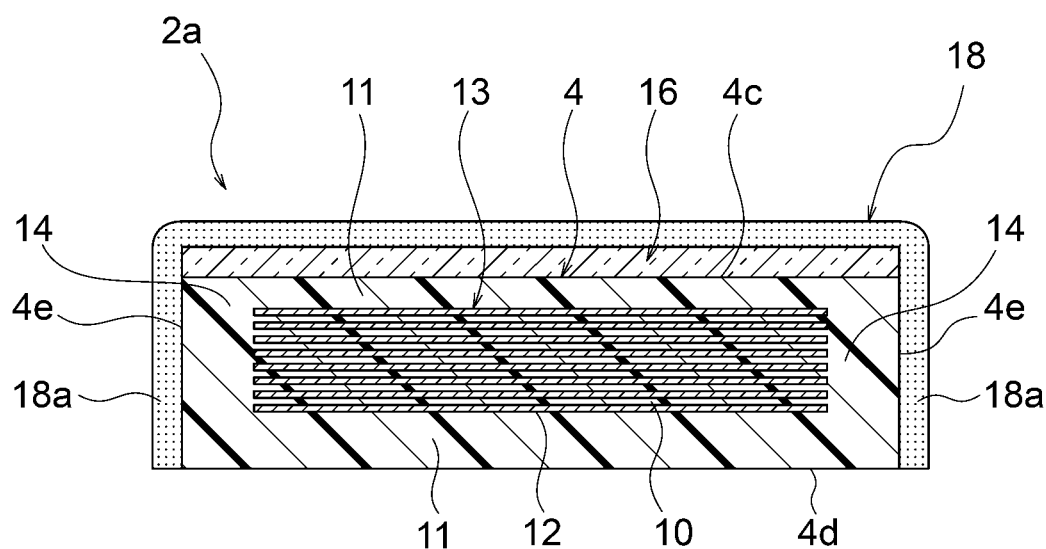
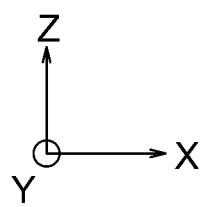

FIG. 2C
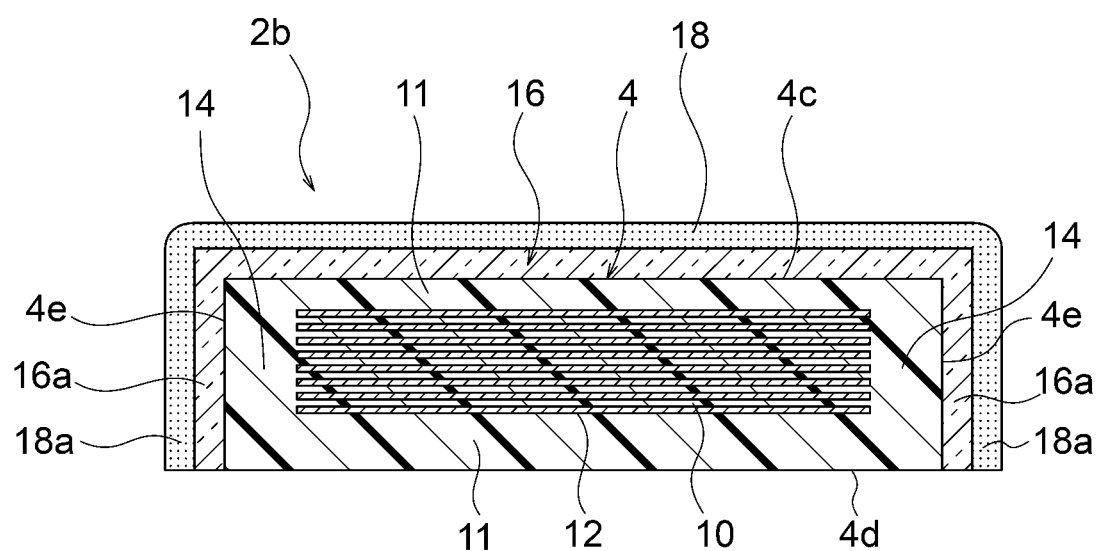
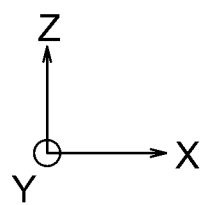

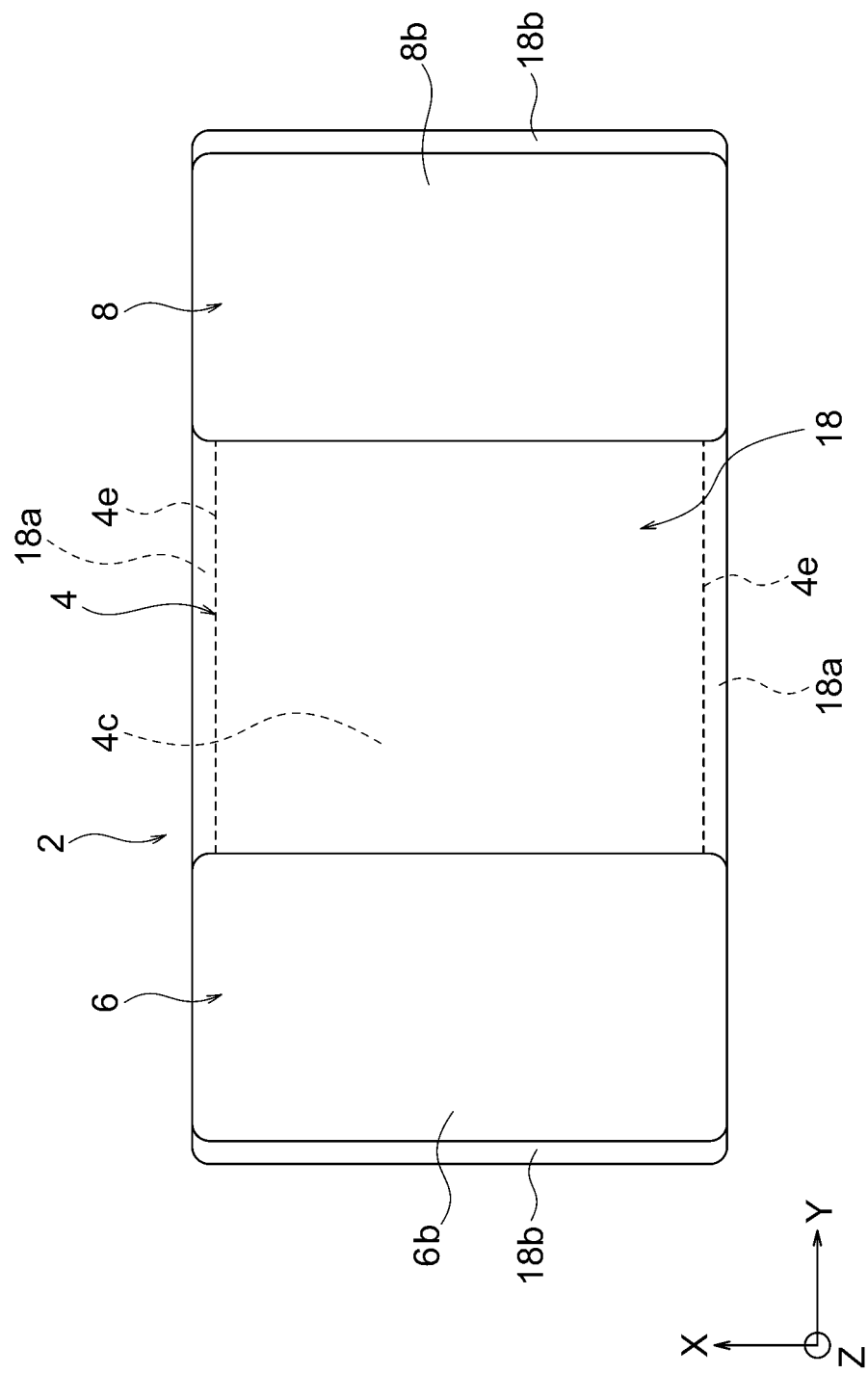

FIG. 8A1
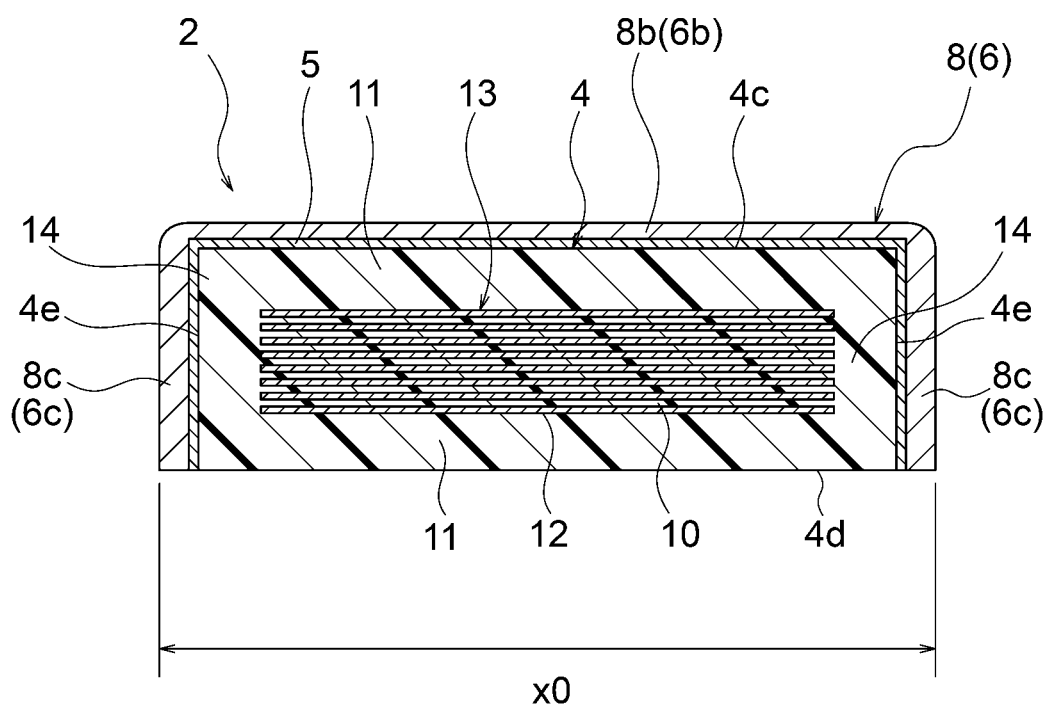
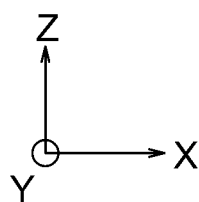

FIG. 8A2
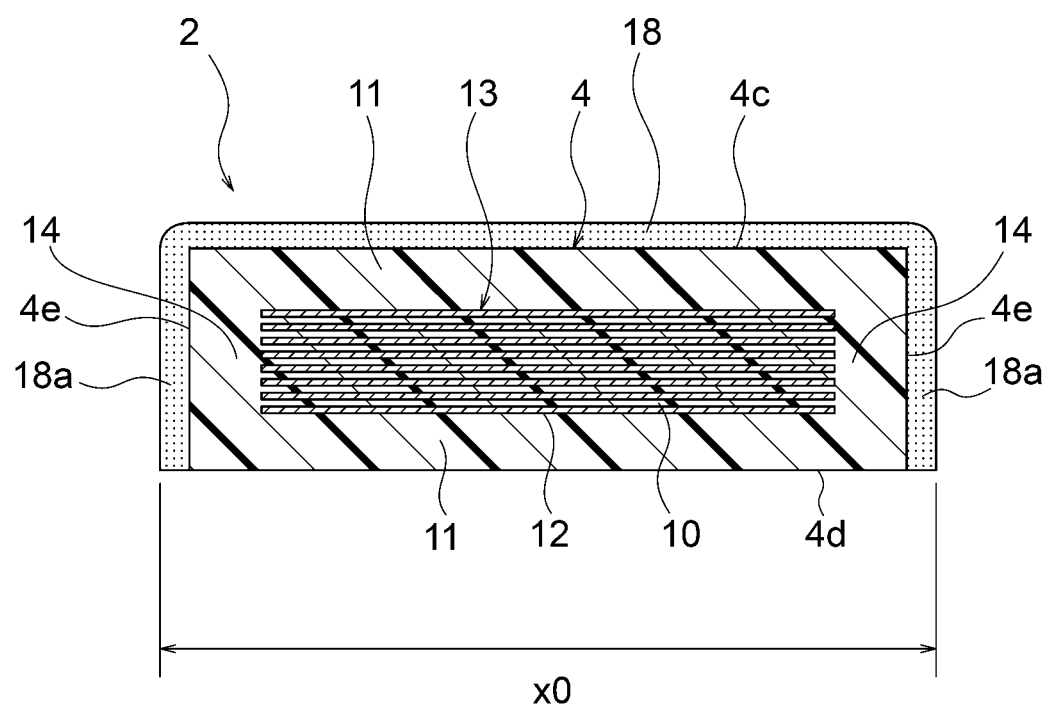
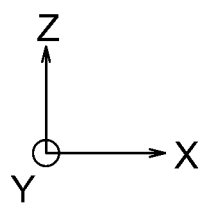

FIG. 8A3
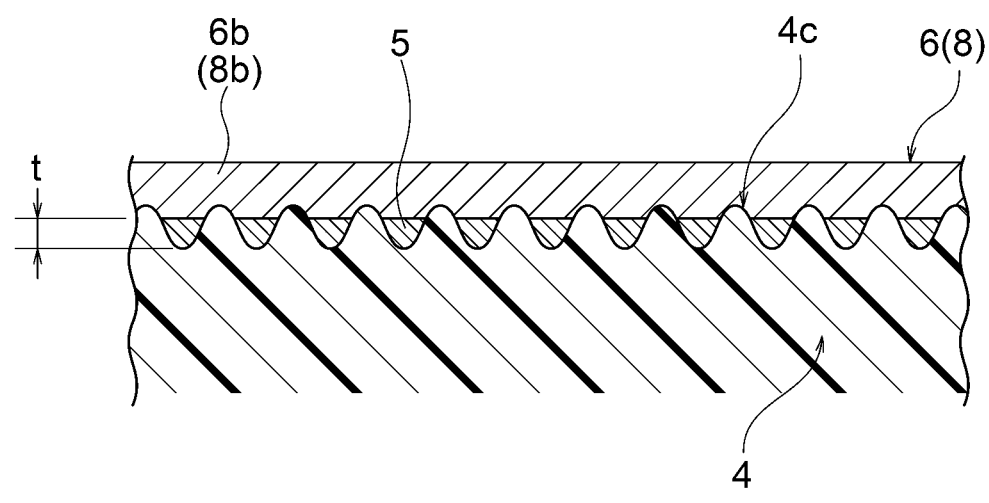
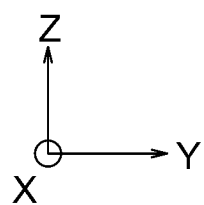

FIG. 8B
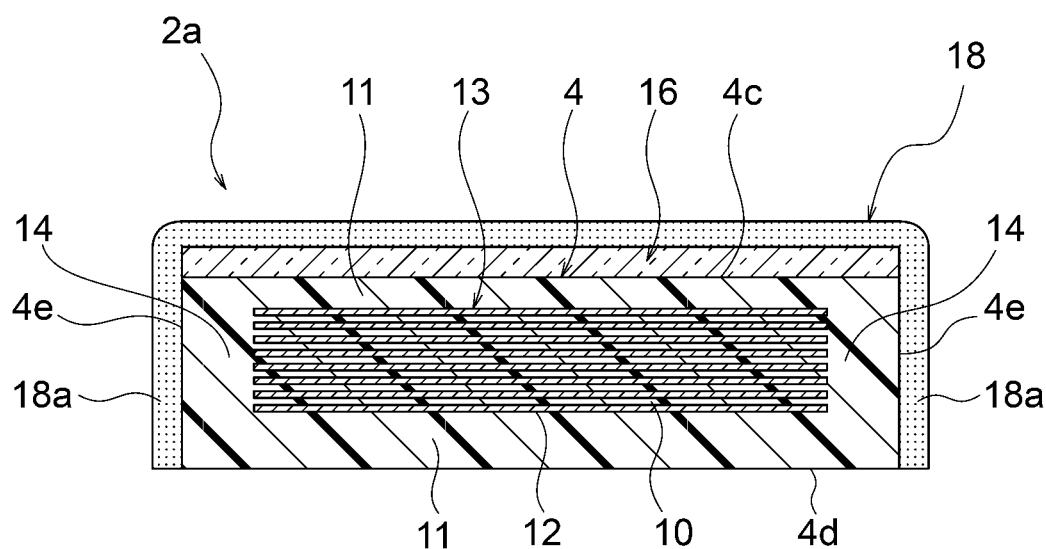
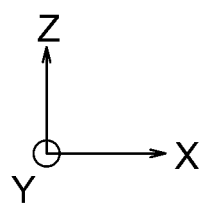

FIG. 8C
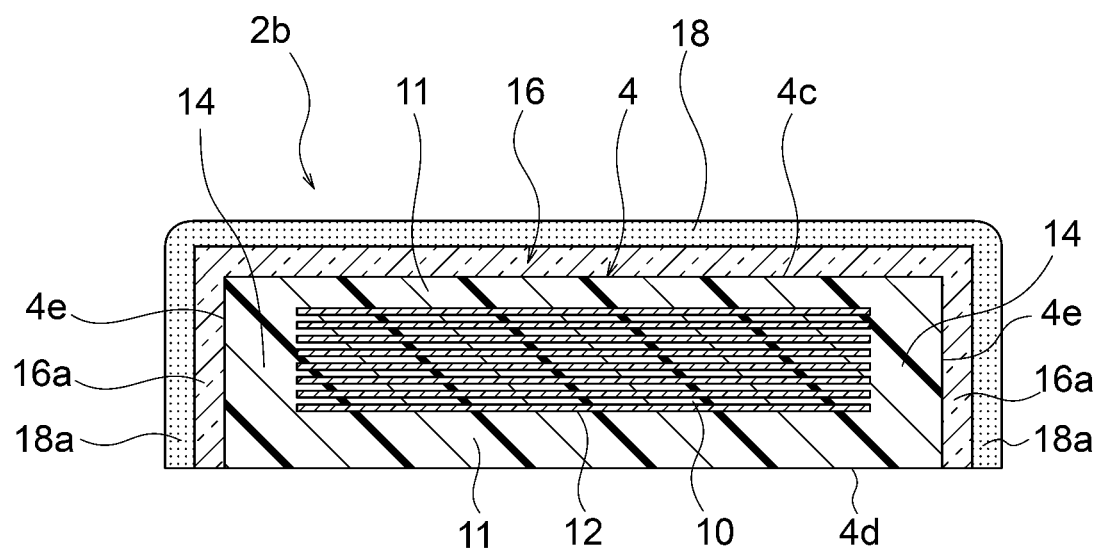
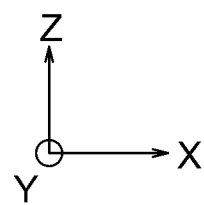

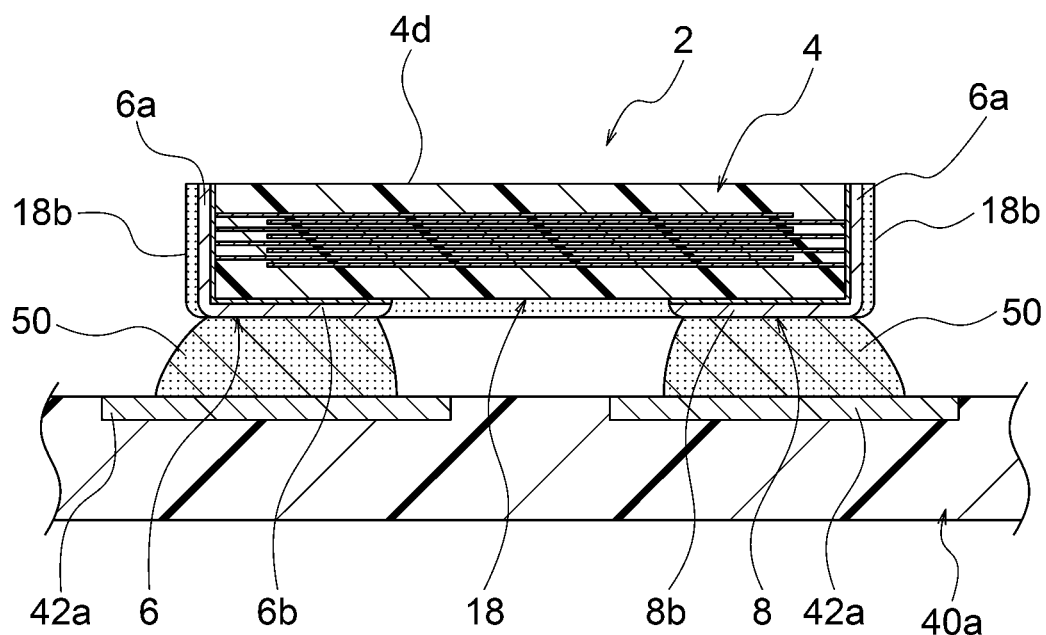
FIG. 12
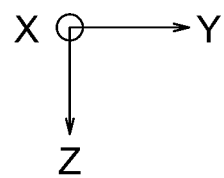

FIG. 14A
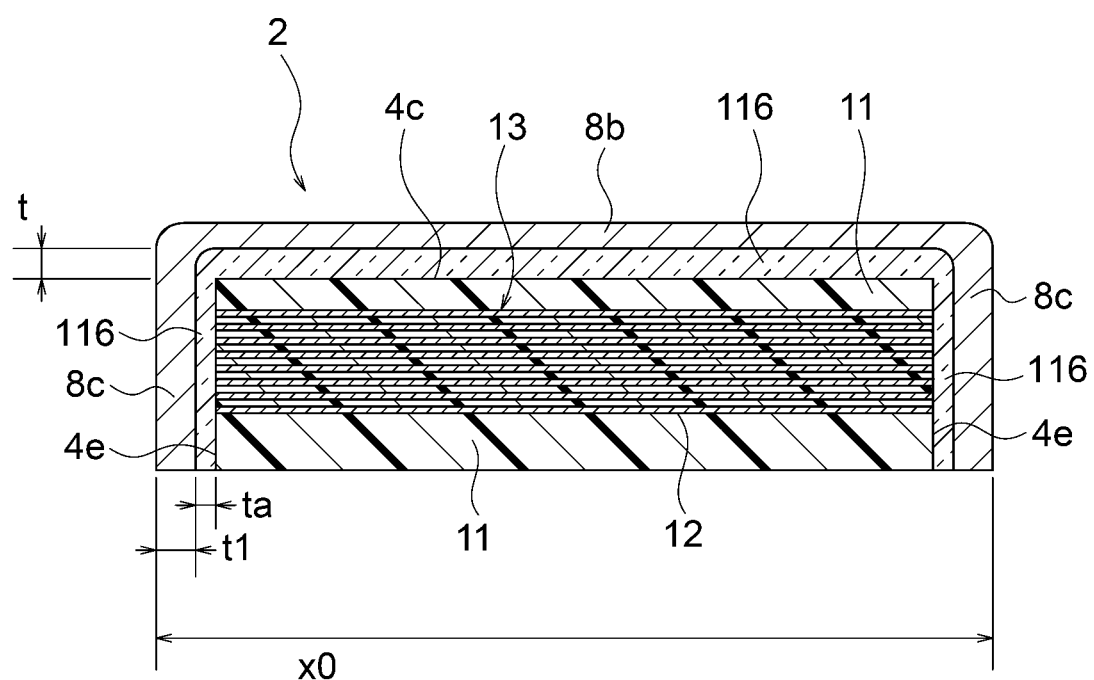
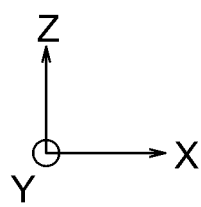

FIG. 14B
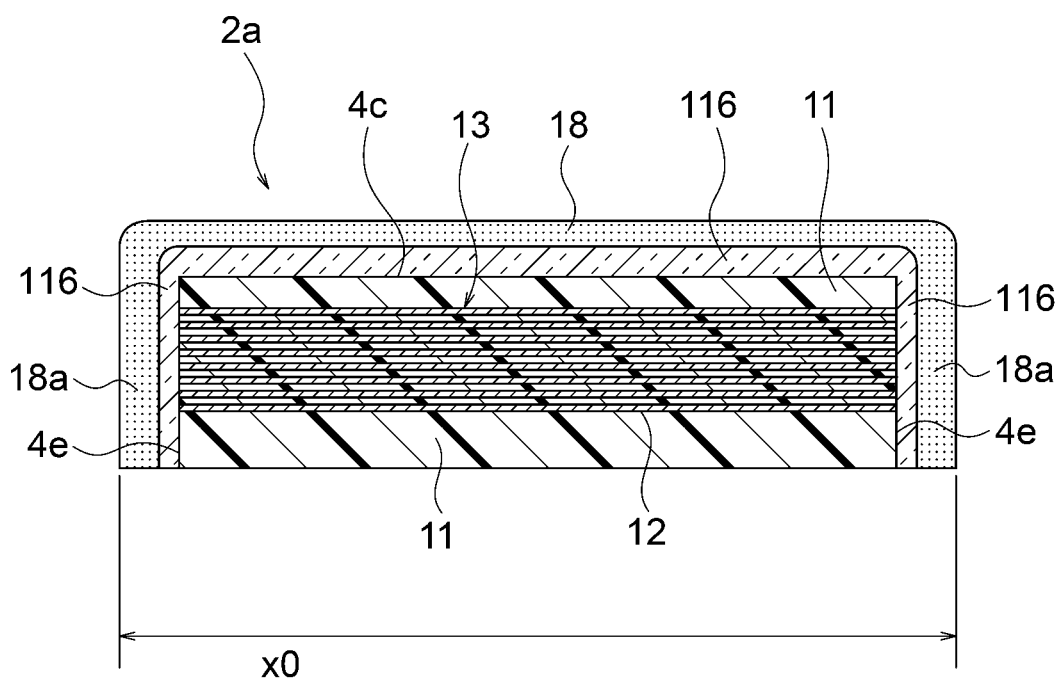
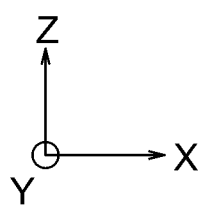

FIG. 18
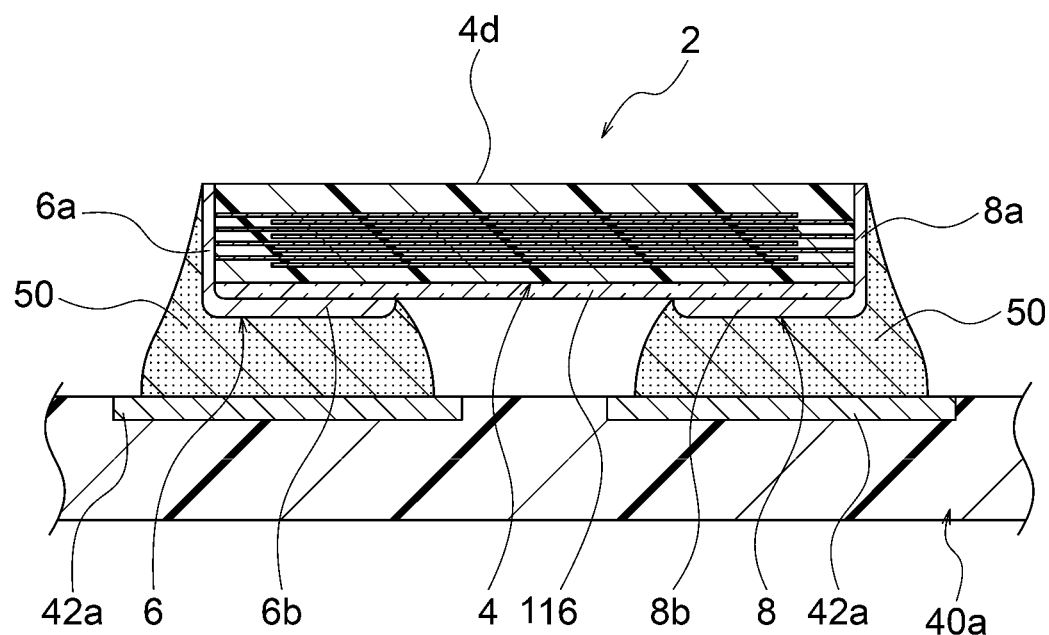
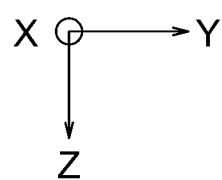

MULTI-LAYER CERAMIC ELECTRONIC DEVICE

BACKGROUND OF THE INVENTION

The present invention relates to a multi-layer ceramic electronic device used as, for example, a multilayer ceramic capacitor. Specifically, the present invention relates to a multi-layer ceramic electronic device capable of being thinned.

For example, as shown in Patent Document 1, it is normal that a conventional multilayer ceramic capacitor has terminal electrodes on both ends in the longitudinal direction of the element body, and that each of the terminal electrodes has an end electrode part of the element body, an upper electrode part covering an upper surface of the element body, and a lower-surface electrode part covering a lower surface of the element body.

Base electrodes of the terminal electrodes are formed by immersing ends of the element body into a solution containing conductive particles. In the immersion, multiple element bodies are put into respective holding holes formed on a holding plate, and ends of the element bodies are immersed by one ends at a time into the solution to form the base electrodes. After that, if necessary, plating films are formed on the base electrodes to obtain the terminal electrodes.

In any case, if the element bodies are not thick enough, it is hard to form the base electrodes and the plating films in forming the terminal electrodes onto the element bodies. That is, if the element bodies are thin, they easily get broken in putting them into the holding holes of the holding plate. In addition, if the element bodies are thin, they easily get broken in carrying out the plating. In such a conventional multi-layer ceramic capacitor, it is thereby hard to thin the element body and to achieve the low profile of the multilayer ceramic capacitor.

In the multilayer ceramic capacitor of Patent Document 2, first and second external electrodes are not formed on either of surfaces in the lamination direction (height direction) of dielectric layers and internal electrode layers. This makes it possible to increase the height of the capacitor and contributes to increase in capacitance.

However, Patent Document 2 does not consider strengthening the element body in a low profile of the multilayer ceramic capacitor.

Patent Document 1: JP201728254 (A)
Patent Document 2: JP2017152621 (A)

BRIEF SUMMARY OF INVENTION

The present invention has been achieved under such circumstances. It is an object of the invention to provide a multi-layer ceramic electronic device capable of low profile, such as multilayer ceramic capacitors.

To achieve the above object, a multi-layer ceramic electronic device according to the first aspect of the present invention includes:

an element body in which internal electrode layers and insulation layers substantially parallel to a plane including a first axis and a second axis are laminated alternately in a third axis; and terminal electrodes formed on an external surface of the element body and electrically connected with the internal electrode layers, wherein the terminal electrodes include:

a pair of end electrode parts facing each other in the second axis and covering ends of the element body in the second axis in which the internal electrode layers are led; and a pair of upper electrode parts continuing to the end electrode parts and each partially covering an upper surface of the element body substantially perpendicular to the third axis, wherein external surfaces of the end electrode parts are covered with end cover layers, and wherein the terminal electrodes are not substantially formed on a lower surface of the element body located opposite to the upper surface of the element body in the third axis.

A multi-layer ceramic electronic device according to the second aspect of the present invention includes:

an element body in which internal electrode layers and insulation layers substantially parallel to a plane including a first axis and a second axis are laminated alternately in a third axis; and terminal electrodes formed on an external surface of the element body and electrically connected with the internal electrode layers, wherein the terminal electrodes include:

a pair of end electrode parts facing each other in the second axis and covering ends of the element body in the second axis in which the internal electrode layers are led; and a pair of upper electrode parts continuing to the end electrode parts and each partially covering an upper surface of the element body substantially perpendicular to the third axis, wherein external surfaces of the end electrode parts are covered with end cover layers, and wherein a lower surface of the element body located opposite to the upper surface of the element body in the third axis is entirely exposed outside.

In the multi-layer ceramic electronic device according to the first aspect of the present invention and the multi-layer ceramic electronic devices according to the third and fifth aspects of the present invention mentioned below, the terminal electrodes are not substantially formed on the lower surface of the element body. In the multi-layer ceramic electronic device according to the second aspect of the present invention and the multi-layer ceramic electronic devices according to the fourth and sixth aspects of the present invention mentioned below, the lower surface of the element body is entirely exposed. In the structure of conventional multi-layer ceramic electronic devices, only reducing the thickness of the element body (e.g., about 100 μm or less) is not enough to form the terminal electrodes on the element body.

The multi-layer ceramic electronic devices according to the first and second aspects of the present invention and the multi-layer ceramic electronic devices according to the third to sixth aspects of the present invention mentioned below can be formed by, for example, combining two or more thin element bodies, forming the terminal electrodes thereon, and thereafter dividing the element bodies. It is thereby possible to easily manufacture a multi-layer ceramic electronic device that is about half as thin as conventional ones.

In a multi-layer ceramic electronic device to be obtained, the terminal electrodes are not substantially formed on the lower surface of the element body, or the lower surface of the element body is entirely exposed. Then, the multi-layer ceramic electronic device can have a small total thickness of 100 μm or smaller (preferably 90 μm or smaller, more preferably 80 μm or smaller, and still more preferably 60 μm or smaller). This contributes to a low profile of the multi-layer ceramic electronic device.

In the multi-layer ceramic electronic devices according to the first and second aspects of the present invention, the external surfaces of the end electrode parts are covered with the end cover layers. This makes it possible to increase humidity resistance of the multi-layer ceramic electronic devices. That is, even if the terminal electrodes are thinned by low profile of the multi-layer ceramic electronic devices, water can be prevented from entering the multi-layer ceramic electronic devices. It is thereby possible to use the multi-layer ceramic electronic devices in an environment containing water or a humid environment. Moreover, even if the manufacturing steps of the multi-layer ceramic electronic devices include a step using water or a wet step, it is possible to prevent water from entering the multi-layer ceramic electronic devices and to prevent decrease in insulation property.

Moreover, since the external surfaces of the end electrode parts are covered with the end cover layers, the multi-layer ceramic electronic devices according to the first and second aspects of the present invention can be strengthened.

In the multi-layer ceramic electronic devices according to the first and second aspects of the present invention, the lower surface of the element body is preferably a flat surface. When the lower surface of the element body is a flat surface, for example, the multi-layer ceramic electronic devices according to the first and second aspects of the present invention are easily embedded into a substrate. When the flat surface (the lower surface of the element body) is placed on a mount surface, the element body is attached on the mount surface, and the multi-layer ceramic electronic devices have an improved bending strength.

In the multi-layer ceramic electronic devices according to the first and second aspects of the present invention, the end cover layers preferably have a cover rate of 96 to 100%, which is represented by (a cover area of the end cover layers/an area of the external surfaces of the end electrode parts)×100.

When the end cover layers have a predetermined cover rate or more, it is possible to further increase humidity resistance of the multi-layer ceramic electronic devices and to strengthen them.

In the multi-layer ceramic electronic devices according to the first and second aspects of the present invention, the end cover layers preferably have a relative thickness of 20 to 500%, which is represented by (an average thickness of the end cover layers/an average thickness of the end electrode parts)×100.

When the end cover layers have a relative thickness in the above range, the multi-layer ceramic electronic devices can have a further increased humidity resistance and be strengthened, and the multi-layer ceramic electronic devices are prevented from having a too large length in the second axis and can be mounted without any problem.

In the multi-layer ceramic electronic devices according to the first and second aspects of the present invention, the end cover layers are preferably made of a glass whose main component is Si or a film whose main component is resin.

This makes it possible to further increase humidity resistance of the multi-layer ceramic electronic devices and to strengthen them.

The multi-layer ceramic electronic devices according to the first and second aspects of the present invention include a predetermined upper-surface cover layer formed between the pair of upper electrode parts. The predetermined upper-surface cover layer is attached to the multi-layer ceramic electronic devices so that the surface of the upper-surface cover layer covering the upper surface of the element body located between the pair of upper electrode parts is substantially flush with the surfaces of the upper electrode parts.

This smoothes steps near the upper surface of the element body and makes it possible to prevent a stress concentration on the steps even if the multi-layer ceramic electronic devices are thinned and to increase the bending strength of the multi-layer ceramic electronic devices.

The improvement in bending strength makes it easy to increase the length of the element body in the first axis or the second axis, increases a facing area between the internal electrode layers in the element body, and improves characteristics (e.g., capacitance) of the electronic devices.

As described above, when there are no steps on the upper surface of the element body on which the upper electrode parts are formed, it is easy to pick up the multi-layer ceramic devices by vacuum suction and to incorporate them in a substrate.

In the multi-layer ceramic electronic devices according to the first and second aspects of the present invention, the surfaces of the upper electrode parts are preferably covered with at least one of Ni plating, Sn plating, Au plating, and Cu plating.

In the multi-layer ceramic electronic devices according to the first and second aspects of the present invention, the element body may include an upper-surface reinforcement layer located below the upper electrode parts and the upper-surface cover layer.

In this structure, the multi-layer ceramic electronic device has a further improved bending strength and can have fewer cracks in the following steps.

To achieve the above object, a multi-layer ceramic electronic device according to the third aspect of the present invention includes:

an element body in which internal electrode layers and insulation layers substantially parallel to a plane including a first axis and a second axis are laminated alternately in a third axis; and terminal electrodes formed on an external surface of the element body and electrically connected with the internal electrode layers, wherein the terminal electrodes include:

a pair of end electrode parts facing each other in the second axis and covering ends of the element body in the second axis in which the internal electrode layers are led; and a pair of upper electrode parts continuing to the end electrode parts and each partially covering an upper surface of the element body substantially perpendicular to the third axis, wherein conductive metal films are formed in interfaces between the element body and the terminal electrodes, and wherein the terminal electrodes are not substantially formed on a lower surface of the element body located opposite to the upper surface of the element body in the third axis.

A multi-layer ceramic electronic device according to the fourth aspect of the present invention includes:

an element body in which internal electrode layers and insulation layers substantially parallel to a plane including a first axis and a second axis are laminated alternately in a third axis; and terminal electrodes formed on an external surface of the element body and electrically connected with the internal electrode layers, wherein the terminal electrodes include:

a pair of end electrode parts facing each other in the second axis and covering ends of the element body in the second axis in which the internal electrode layers are led; and a pair of upper electrode parts continuing to the end electrode parts and each partially covering an upper surface of the element body substantially perpendicular to the third axis, wherein conductive metal films are formed in interfaces between the element body and the terminal electrodes, and wherein a lower surface of the element body located opposite to the upper surface of the element body in the third axis is entirely exposed outside.

In the multi-layer ceramic electronic devices according to the third and fourth aspects of the present invention, conductive metal films are formed in interfaces between the element body and the terminal electrodes. This structure makes it possible to increase the adhesion between the terminal electrodes and the element body. It is thereby possible to achieve improvement in the adhesion between the element body and the terminal electrodes and to strengthen the humidity resistance.

In the multi-layer ceramic electronic devices according to the third and fourth aspects of the present invention, the lower surface of the element body is preferably a flat surface. When the lower surface of the element body is a flat surface, for example, the multi-layer ceramic electronic devices according to the third and fourth aspects of the present invention are easily embedded into a substrate. When the flat surface (the lower surface of the element body) is placed on a mount surface, the multi-layer ceramic electronic devices are attached on the mount surface and have an improved bending strength.

In the multi-layer ceramic electronic devices according to the third and fourth aspects of the present invention, preferably, the conductive metal films contain at least any one of Pt, Rh, Ru, Re, Ir, and Pd. When the conductive metal films made of such metals are formed on the surface of the element body, the adhesion between the terminal electrodes and the element body is further strengthened.

In the multi-layer ceramic electronic devices according to the third and fourth aspects of the present invention, preferably, a coverage area ratio of uneven surfaces formed on a surface of the element body and covered by the conductive metal films is 20 to 70%. When the coverage area ratio of the surface of the element body by the conductive metal films is too small or too large, an improvement effect on the adhesion between the terminal electrodes and the element body is small. When the coverage area ratio of the surface of the element body by the conductive metal films is 20 to 70%, the improvement effect is large.

In the multi-layer ceramic electronic devices according to the third and fourth aspects of the present invention, preferably, external surfaces of the end electrode parts are covered with end cover layers. This makes it possible to further increase humidity resistance of the multi-layer ceramic electronic devices. That is, even if the terminal electrodes are thinned by low profile of the multi-layer ceramic electronic devices, water can be prevented from entering the multi-layer ceramic electronic devices. It is thereby possible to use the multi-layer ceramic electronic devices in an environment containing water or a humid environment. Moreover, even if the manufacturing steps of the multi-layer ceramic electronic devices include a step using water or a wet step, it is possible to prevent water from entering the multi-layer ceramic electronic devices and to prevent decrease in insulation property.

Moreover, when the external surfaces of the end electrode parts are covered with the end cover layers, the multi-layer ceramic electronic devices according to the third and fourth aspects of the present invention can be further strengthened.

In the multi-layer ceramic electronic devices according to the third and fourth aspects of the present invention, the end cover layers preferably have a cover rate of 96 to 100%, which is represented by (a cover area of the end cover layers/an area of the external surfaces of the end electrode parts)×100.

When the end cover layers have a predetermined cover rate or more, it is possible to further increase humidity resistance of the multi-layer ceramic electronic devices and to strengthen them.

In the multi-layer ceramic electronic devices according to the third and fourth aspects of the present invention, the end cover layers preferably have a relative thickness of 20 to 500%, which is represented by (an average thickness of the end cover layers/an average thickness of the end electrode parts)×100.

When the end cover layers have a relative thickness in the above range, the multi-layer ceramic electronic devices can have a further increased humidity resistance and be strengthened, and the multi-layer ceramic electronic devices are prevented from having a too large length in the second axis and can be mounted without any problem.

In the multi-layer ceramic electronic devices according to the third and fourth aspects of the present invention, the end cover layers are preferably made of a glass whose main component is Si or a film whose main component is resin.

This makes it possible to further increase humidity resistance of the multi-layer ceramic electronic devices and to strengthen them.

The multi-layer ceramic electronic devices according to the third and fourth aspects of the present invention include a predetermined upper-surface cover layer formed between the pair of upper electrode parts. The predetermined upper-surface cover layer is attached to the multi-layer ceramic electronic devices so that the surface of the upper-surface cover layer covering the upper surface of the element body located between the pair of upper electrode parts is substantially flush with the surfaces of the upper electrode parts. This smoothes steps near the upper surface of the element body and makes it possible to prevent a stress concentration on the steps even if the multi-layer ceramic electronic devices are thinned and to increase the bending strength of the multi-layer ceramic electronic devices.

The improvement in bending strength makes it easy to increase the length of the element body in the first axis or the second axis, increases a facing area between the internal electrode layers in the element body, and improves characteristics (e.g., capacitance) of the electronic devices.

As described above, when there are no steps on the upper surface of the element body on which the upper electrode parts are formed, it is easy to pick up the multi-layer ceramic devices by vacuum suction and to incorporate them in a substrate.

In the multi-layer ceramic electronic devices according to the third and fourth aspects of the present invention, the surfaces of the upper electrode parts are preferably covered with at least one of Ni plating, Sn plating, Au plating, and Cu plating.

In the multi-layer ceramic electronic devices according to the third and fourth aspects of the present invention, the element body may include an upper-surface reinforcement layer located below the upper electrode parts and the upper-surface cover layer.

In this structure, the multi-layer ceramic electronic device has a further improved bending strength and can have fewer cracks in the following steps.

To achieve the above object, a multi-layer ceramic electronic device according to the fifth aspect of the present invention includes:

an element body in which internal electrode layers and insulation layers substantially parallel to a plane including a first axis and a second axis are laminated alternately in a third axis; and terminal electrodes formed on an external surface of the element body and electrically connected with the internal electrode layers, wherein the terminal electrodes include:
a pair of end electrode parts facing each other in the second axis and covering ends of the element body in the second axis in which the internal electrode layers are led; and
a pair of upper electrode parts continuing to the end electrode parts and each partially covering an upper surface of the element body substantially perpendicular to the third axis, wherein the terminal electrodes are not substantially formed on a lower surface of the element body located opposite to the upper surface of the element body in the third axis, wherein the element body includes a reinforcement layer, wherein the reinforcement layer covers at least one of a pair of lateral surfaces facing each other in the first axis, the upper surface, and the lower surface of the element body, wherein the reinforcement layer contains a filler and a substrate, wherein the filler is made of glass or alumina, and wherein the filler has a needle-like shape, a column-like shape, or a plate-like shape.

To achieve the above object, a multi-layer ceramic electronic device according to the sixth aspect of the present invention includes:

an element body in which internal electrode layers and insulation layers substantially parallel to a plane including a first axis and a second axis are laminated alternately in a third axis; and terminal electrodes formed on an external surface of the element body and electrically connected with the internal electrode layers, wherein the terminal electrodes include:
a pair of end electrode parts facing each other in the second axis and covering ends of the element body in the second axis in which the internal electrode layers are led; and
a pair of upper electrode parts continuing to the end electrode parts and each partially covering an upper surface of the element body substantially perpendicular to the third axis, wherein the lower surface of the element body located opposite to the upper surface of the element body in the third axis is entirely exposed outside, wherein the element body includes a reinforcement layer, wherein the reinforcement layer covers at least one of a pair of lateral surfaces facing each other in the first axis, the upper surface, and the lower surface of the element body, wherein the reinforcement layer contains a filler and a substrate, wherein the filler is made of glass or alumina, and wherein the filler has a needle-like shape, a column-like shape, or a plate-like shape.

In the multi-layer ceramic electronic devices according to the fifth and sixth aspects of the present invention, the reinforcement layer containing a filler made of a predetermined material and having a needle-like shape, a column-like shape, or a plate-like shape is formed on at least one of the lateral surfaces, the upper surface, and the lower surface of the element body. This makes it possible to increase the bending strength of the multi-layer ceramic electronic devices.

The improvement in bending strength makes it easy to increase the length of the element body in the first axis or the second axis, increases a facing area between the internal electrode layers in the element body, and improves characteristics (e.g., capacitance) of the electronic devices.

The multi-layer ceramic electronic devices according to the fifth and sixth aspects of the present invention may include the reinforcement layer covering the upper surface of the element body.

When the reinforcement layer covering the upper surface is formed in contact with the upper electrode parts, the adhesion between the element body and the terminal electrodes can be strong, and the humidity resistance from the upper surface tends to be excellent.

In the multi-layer ceramic electronic devices according to the fifth and sixth aspects of the present invention, the substrate may be made of at least one of glass and resin.

When the substrate is made of at least one of glass and resin, the multi-layer ceramic electronic devices can have an increased bending strength.

In the multi-layer ceramic electronic devices according to the fifth and sixth aspects of the present invention, the reinforcement layer covering the upper surface and the reinforcement layers covering the lateral surfaces may continuously cover the element body.

When the reinforcement layer covering the upper surface and the reinforcement layers covering the lateral surfaces continuously cover the element body, the multi-layer ceramic electronic devices can have an increased bending strength.

In the multi-layer ceramic electronic devices according to the fifth and sixth aspects of the present invention, an upper-surface cover layer covering the upper surface of the element body located between the pair of upper electrode parts may have an external surface substantially flush with external surfaces of the upper electrode parts.

This smoothes steps near the upper surface of the element body and makes it possible to prevent a stress concentration on the steps even if the multi-layer ceramic electronic devices are thinned and to increase the bending strength of the multi-layer ceramic electronic devices.

As described above, there are no steps on the upper surface of the element body on which the upper electrode parts are formed. It is thereby easy to pick up the multi-layer ceramic devices by vacuum suction and to incorporate them in a substrate.

In the multi-layer ceramic electronic devices according to the fifth and sixth aspects of the present invention, the external surfaces of the end electrode parts may be covered with end cover layers.

When the external surfaces of the end electrode parts are covered with end cover layers, the multi-layer ceramic electronic devices can have a high humidity resistance. That is, even if the terminal electrodes are thinned by low profile of the multi-layer ceramic electronic devices, water can be prevented from entering the multi-layer ceramic electronic devices. Thus, even if manufacturing steps of the multi-layer ceramic electronic devices include a step using water or a wet step, it is possible to prevent water from entering the multi-layer ceramic electronic devices and to prevent decrease in insulation property.

In the multi-layer ceramic electronic devices according to the fifth and sixth aspects of the present invention, the lower surface of the element body may be a flat surface.

The multi-layer ceramic electronic devices according to the fifth and sixth aspects of the present invention may include the reinforcement layer covering the lower surface, and the external surface of the reinforcement layer covering the lower surface may be a flat surface.

When the lower surface or the external surface of the reinforcement layer covering the lower surface is a flat surface, for example, the multi-layer ceramic electronic devices according to the fifth and sixth aspects of the present invention is easily embedded into a substrate. When the flat surface (the lower surface or the external surface of the reinforcement layer covering the lower surface) is placed on a mount surface, the multi-layer ceramic electronic devices are attached on the mount surface and have an improved bending strength.

In the multi-layer ceramic electronic devices according to the fifth and sixth aspects of the present invention, the filler may have a particle size in the minor axis of 0.1 μm or larger and 3.0 μm or smaller, the filler may have a particle size in the major axis of 0.5 μm or larger and 15.0 μm or smaller, and the filler may have an aspect ratio of 0.7% or more and 60% or less, which is represented by (a particle size in the minor axis/a particle size in the major axis).

This makes it possible to increase the bending strength of the multi-layer ceramic electronic devices. When the multi-layer ceramic electronic devices have a reinforcement layer on the upper surface of the element body, it is possible to increase the adhesion between the reinforcement layer covering the upper surface and the upper electrode parts and is thereby possible to increase humidity resistance of the multi-layer ceramic electronic devices.

In the multi-layer ceramic electronic devices according to the fifth and sixth aspects of the present invention, the amount of the filler in the reinforcement layer may be 30 vol % or larger and 80 vol % or smaller.

This makes it possible to increase the bending strength of the multi-layer ceramic electronic devices. When the multi-layer ceramic electronic devices have a reinforcement layer on the upper surface of the element body, it is possible to increase the adhesion between the reinforcement layer covering the upper surface and the upper electrode parts and is thereby possible to increase humidity resistance of the multi-layer ceramic electronic devices.

In the multi-layer ceramic electronic devices according to the fifth and sixth aspects of the present invention, the substrate may be made of a glass whose main component is at least one of Si and Al.

This makes it possible to increase the bending strength of the multi-layer ceramic electronic devices. When the multi-layer ceramic electronic devices have a reinforcement layer on the upper surface of the element body, it is possible to increase the adhesion between the reinforcement layer covering the upper surface and the upper electrode parts and is thereby possible to increase humidity resistance of the multi-layer ceramic electronic devices.

In the multi-layer ceramic electronic devices according to the fifth and sixth aspects of the present invention, the filler may be made of a glass whose sub-component is at least one of alkali metal, alkaline earth metal, transition metal, and boron.

When the filler is made of a glass whose sub-component is at least one of alkali metal, alkaline earth metal, transition metal, and boron, the upper electrode parts are easily formed by plating on a part of the surface of the reinforcement layer covering the upper surface.

In the multi-layer ceramic electronic devices according to the fifth and sixth aspects of the present invention, the surfaces of the upper electrode parts may be covered with at least one of Ni plating, Sn plating, Au plating, and Cu plating.

The multi-layer ceramic electronic devices according to the first to sixth aspects of the present invention may be embedded into a substrate.

The multi-layer ceramic electronic devices according to the first to sixth aspects of the present invention have the upper electrode parts and are thereby electrically connectable via the upper electrode parts even if the multi-layer ceramic electronic devices are embedded into a substrate.

BRIEF DESCRIPTION OF DRAWINGS

FIG. 1A is a longitudinal cross-sectional view of a multilayer ceramic capacitor according to an embodiment of the present invention.

FIG. 2A1 is a transverse cross-sectional view of the multilayer ceramic capacitor along the IIA1-IIA1 line shown in FIG. 1A.

FIG. 2A2 is a transverse cross-sectional view of the multilayer ceramic capacitor along the IIA2-IIA2 line shown in FIG. 1A.

FIG. 2B is a transverse cross-sectional view of the multilayer ceramic capacitor along the IIB-IIB line shown in FIG. 1B.

FIG. 2C is a transverse cross-sectional view of the multilayer ceramic capacitor shown in FIG. 2B.

FIG. 3 is a plane view of the multilayer ceramic capacitor shown in FIG. 1A.

FIG. 8A1 is a transverse cross-sectional view of the multilayer ceramic capacitor along the XIIA1-XIIA1 line shown in FIG. 7A.

FIG. 8A2 is a transverse cross-sectional view of the multilayer ceramic capacitor along the XIIA2-XIIA2 line shown in FIG. 7A.

FIG. 8A3 is an enlarged cross-sectional view of XIIA3 shown in FIG. 7A.

FIG. 8B is a transverse cross-sectional view of the multilayer ceramic capacitor along the XIIB-IIB line shown in FIG. 7B.

FIG. 8C is a transverse cross-sectional view of a variation of the multi-layer ceramic capacitor shown in FIG. 8B.

FIG. 12 is a cross-sectional view of a main part of the multilayer ceramic capacitor shown in FIG. 7A illustrating a use example thereof.

FIG. 14A is a transverse cross-sectional view of the multilayer ceramic capacitor along the XXIIA-XXIIA line shown in FIG. 13A.

FIG. 14B is a transverse cross-sectional view of the multilayer ceramic capacitor along the XXIIB-XXIIB line shown in FIG. 13B.

FIG. 18 is a cross-sectional view of a main part of the multilayer ceramic capacitor shown in FIG. 13A illustrating the other use example thereof.

DETAILED DESCRIPTION OF INVENTION

Figure 1B:
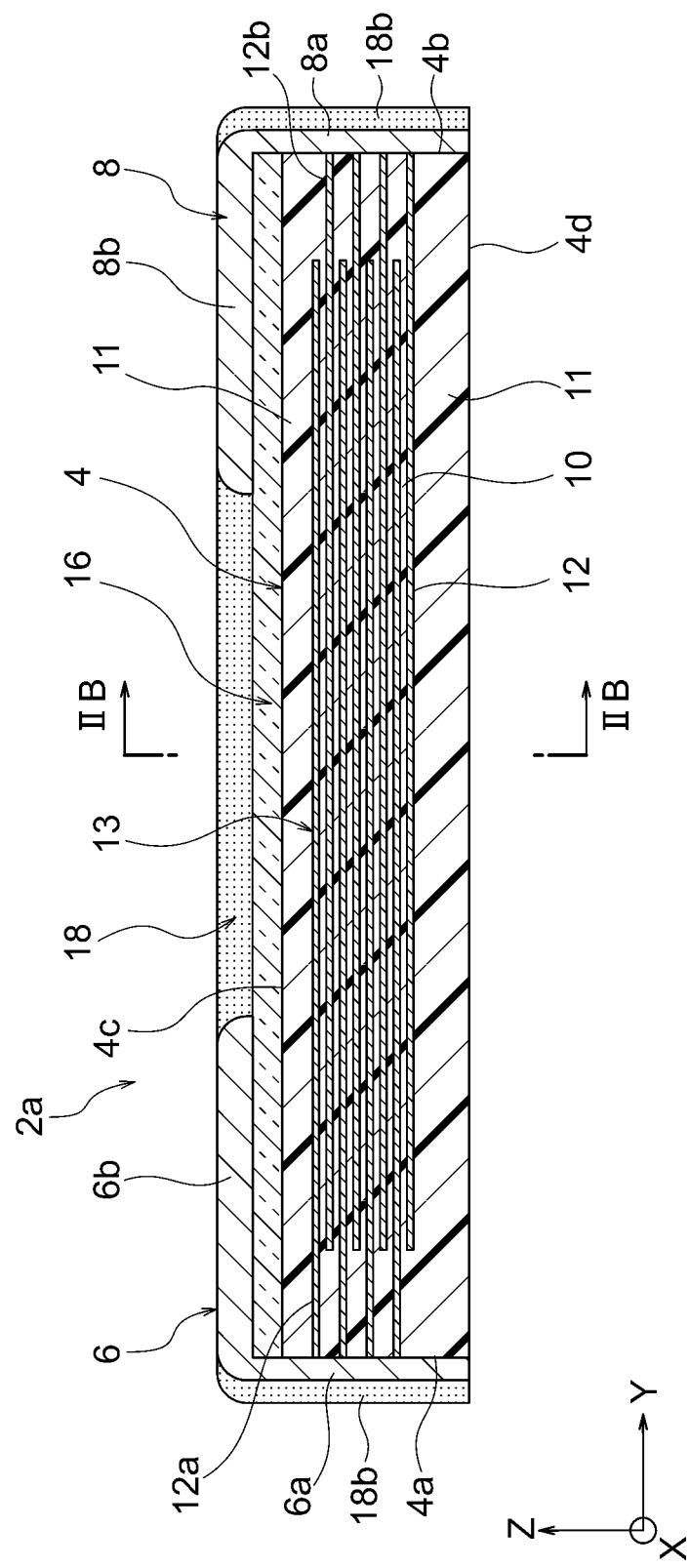
FIG. 1B is a longitudinal cross-sectional view of a multilayer ceramic capacitor according to another embodiment of the present invention.

Hereinafter, the present invention is described based on embodiments shown in the figures.

First Embodiment

As an embodiment of a multi-layer ceramic electronic device according to the present embodiment, a multilayer ceramic capacitor is described.

As shown in FIG. 1A, a multilayer ceramic capacitor 2 according to the present embodiment includes an element body 4, a first terminal electrode 6, and a second terminal electrode 8. The element body 4 includes inner dielectric layers (insulation layers) 10 and internal electrode layers 12 substantially parallel to a plane including the X-axis and the Y-axis. The internal electrode layers 12 are alternately laminated along the Z-axis direction between the inner dielectric layers 10. Here, "substantially parallel" means that most part is parallel, but that there may be a part that is not slightly parallel. The internal electrode layers 12 and the inner dielectric layers 10 may slightly be uneven or inclined.

An interior region 13 is a region where the inner dielectric layers 10 and the internal electrode layers 12 are alternately laminated. The element body 4 has exterior regions 11 on both end surfaces of the element body 4 in its lamination direction Z (Z-axis). The exterior regions 11 are formed by laminating a plurality of outer dielectric layers that are thicker than the inner dielectric layers 10 constituting the interior region 13. Preferably, the thickness of the interior region 13 in the Z-axis direction is 10 to 75% of a total thickness z0 of the multilayer ceramic capacitor 2. The total thickness of the two exterior regions 11 is a value obtained by subtracting the thickness of the interior region 13, the thickness of the terminal electrode 6 (8), and the thickness of the below-mentioned upper-surface reinforcement layer 16 from the total thickness z0.

Hereinafter, the "inner dielectric layers 10" and the "outer dielectric layers" may be referred to as the "dielectric layers" together.

The dielectric layers constituting the inner dielectric layers 10 and the exterior regions 11 may be made of the same material or different materials and are made of any material whose main component is a perovskite-type dielectric material, such as $ABO_3$.

In $ABO_3$, "A" is at least one of Ca, Ba, Sr, etc., and "B" is at least one of Ti, Zr, etc. The molar ratio of A/B is not limited and 0.980 to 1.020. In addition, the dielectric layers constituting the inner dielectric layers 10 and the exterior regions 11 may contain a sub-component of an oxide of rare earth element (at least one of Sc, Y, La, Ce, Pr, Nd, Pm, Sm, Eu, Gd, Tb, Dy, Ho, Er, Tm, Yb, and Lu), alkaline earth metal element (Mg and Mn), and transition metal element (at least one of V, W, and Mo), a mixture thereof, a composite oxide, a sintering agent containing $SiO_2$ as glass, and the like.

The internal electrode layers 12 alternately laminated on one side have leading parts 12a electrically connected with an inner side of the first terminal electrode 6 formed on the outer side of one end of the element body 4 in the Y-axis direction. The internal electrode layers 12 alternately laminated on the other side have leading parts 12b electrically connected with an inner side of the second terminal electrode 8 formed on the outer side of the other end of the element body 4 in the Y-axis direction.

In the figures, the X-axis, the Y-axis, and the Z-axis are perpendicular to each other. The Z-axis corresponds to the lamination direction of the inner dielectric layers 10 and the internal electrode layers 12, and the Y-axis corresponds to a direction where the leading parts 12a and 12b are led.

The interior region 13 has a capacitance region and leading regions. The capacitance region is a region where the internal electrode layers 12 sandwich the inner dielectric layers 10 and are laminated along the lamination direction. The leading regions are located between the leading parts 12a (12b) of the internal electrode layers 12 connected with the terminal electrode 6 (8). Moreover, side-gap regions 14 shown in FIG. 2A1 and FIG. 2A2 are located on both ends of the internal electrode layers 12 in the X-axis direction and protect the internal electrode layers 12. The side-gap regions 14 are normally made of a dielectric material similar to that of the inner dielectric layers 10 or the exterior regions 11, but may be made of a glass material to be an upper-surface cover layer 18 and end cover layers 18b mentioned below. The exterior regions 11 may also be made of a glass material.

A conductive material contained in the internal electrode layers 12 is any material, such as metal of Ni, Cu, Ag, Pd, Al, Pt, etc. and alloy of these metals. The Ni alloy is preferably an alloy of Ni and one or more elements of Mn, Cr, Co, and Al and preferably contains 95 mass % or more of Ni. Incidentally, Ni or the Ni alloy may contain about 0.1 mass % or less of various fine components, such as P.

The terminal electrodes 6 and 8 are made of any material, such as at least one of Ni, Pd, Ag, Au, Cu, Pt, Rh, Ru, Ir, etc. and alloy of these elements. The terminal electrodes 6 and 8 are normally made of Cu, Cu alloy, Ni, Ni alloy, Ag, Ag—Pd alloy, In—Ga alloy, or the like.

In the present embodiment, the first and second terminal electrodes 6 and 8 are attached on end surfaces 4a and 4b of the element body 4 in the Y-axis direction, respectively, and may be formed by a single layer or multiple layers. The terminal electrode 6 (8) has an end electrode part 6a (8a) covering the end surface 4a (4b), which is a leading end of the element body 4 where the leading parts 12a (12b) of the internal electrode layers 12 are led. Moreover, the terminal electrode 6 (8) has an upper electrode part 6b (8b) formed continuously to the end electrode part 6a (8a) on a part of the upper surface 4c of the element body 4 substantially perpendicular to the Z-axis.

Here, "substantially perpendicular" means roughly perpendicular, but also means that there may be a part that is not slightly perpendicular. The upper electrode part 6b (8b) may slightly be uneven or inclined.

As shown in FIG. 2A1, the terminal electrode 6 (8) has a lateral electrode part 6c (8c) formed continuously to the upper electrode part 6b (8b) and the end electrode part 6a (8a) (see FIG. 1A) on each of lateral surfaces 4e and 4e located on both sides of the element body 4 in the X-axis direction. As shown in FIG. 1A, the terminal electrodes 6 and 8 are insulated each other with a predetermined distance in the Y-axis direction on the exterior surface of the element body 4.

The thickness of the terminal electrode 6 (8) may be the same as or different from the upper electrode part 6b (8b), the end electrode part 6a (8a), and the lateral electrode part 6c (8c) and is, for example, 2 to 15 µm. In the present embodiment, the upper electrode part 6b (8b) and the lateral electrode part 6c (8c) are thicker than the end electrode part 6a (8a) by 100 to 750%.

In the present embodiment, the terminal electrodes 6 and 8 are not substantially formed on a lower surface 4d of the element body 4 located opposite to the upper surface 4c of the element body 4 in the Z-axis direction. That is, the lower surface 4d of the element body 4 is not covered with the terminal electrode 6 or the terminal electrode 8 and is entirely exposed outside. Moreover, the lower surface 4d of the element body 4 is a flat surface. Since the lower surface 4d of the element body 4 is not covered with the terminal electrode 6 or the terminal electrode 8, the lower surface 4d has no steps and is excellent in flatness.

In the present embodiment, the external surfaces of the end electrode parts 6a and 8a are covered with the end cover layers 18b and 18b. This makes it possible to increase humidity resistance of the multilayer ceramic capacitor 2. That is, even if the terminal electrodes 6 and 8 are thinned by low profile of the multilayer ceramic capacitor 2, water can be prevented from entering the multilayer ceramic capacitor 2. It is thereby possible to use the multilayer ceramic capacitor 2 in an environment containing water or a humid environment. Moreover, even if the manufacturing steps of the multilayer ceramic capacitor 2 include a step using water or a wet step, it is possible to prevent water from entering the multilayer ceramic capacitor 2 and to prevent decrease in insulation property.

Since the external surfaces of the end electrode parts 6a and 8a are covered with the end cover layers 18b and 18b, the multilayer ceramic capacitor 2 according to the present embodiment can be strengthened.

In the present embodiment, preferably, the end cover layers 18b have a cover rate of 96 to 100%, which is represented by (a cover area of the end cover layers 18b and 18b/an area of the external surfaces of the end electrode parts 6a and 8a)×100. This makes it possible to further increase humidity resistance of the multilayer ceramic capacitor 2 and to further strengthen it. From the above point of view, more preferably, the end cover layers 18b and 18b have a cover rate of 98 to 100%.

In the present embodiment, preferably, the end cover layers 18b have a relative thickness of 20 to 500%, which is represented by (an average thickness of the end cover layers 18b and 18b/an average thickness of the end electrode parts 6a and 8a)×100. This makes it possible to further increase humidity resistance of the multilayer ceramic capacitor 2 and to strengthen it and also makes it possible to prevent the multi-layer ceramic capacitor 2 from having a too large length in the Y-axis direction and to mount the multilayer ceramic capacitor 2 without any problem.

The end cover layers 18b are made of any material, such as glass, alumina based composite material, zirconia based composite material, polyimide resin, epoxy resin, aramid fiber, and fiber reinforced plastic, but are preferably made of a glass whose main component is Si or a film whose main component is resin. This makes it possible to further increase humidity resistance of the multilayer ceramic capacitor 2 and to strengthen it.

From the above point of view, such a glass whose main component is Si is a Si—B—Zn—O based glass, a Si—Al-M-O based glass (M is an alkaline earth metal), etc. In addition, a glass component of BaO and alkali metal may be contained.

In the Si—B—Zn—O based glass of the present embodiment, the glass component preferably contains 30 to 70 mass % of $SiO_2$, 1 to 20 mass % of $B_2O_3$, and 1 to 60 mass % of ZnO. This makes it possible to further increase humidity resistance of the multi-layer ceramic capacitor 2 and to strengthen it.

In the Si—B—Zn—O based glass of the present embodiment, the glass component preferably contains 70 to 100 mass % of $SiO_2$, $B_2O_3$, and ZnO in total. This makes it possible to further increase humidity resistance of the multilayer ceramic capacitor 2 and to strengthen it.

In the Si—Al-M-O based glass of the present embodiment, the glass component preferably contains 30 to 70 mass % of $SiO_2$, 2 to 20 mass % of $Al_2O_3$, and 5 to 20 mass % of MO. This makes it possible to further increase humidity resistance of the multilayer ceramic capacitor 2 and to strengthen it. Incidentally, M is preferably Ca or Sr.

In the Si—Al-M-O based glass of the present embodiment, the glass component preferably contains 70 to 100 mass % of $SiO_2$, $Al_2O_3$, and MO in total. This makes it possible to further increase humidity resistance of the multilayer ceramic capacitor 2 and to strengthen it.

The end cover layers 18b of the present embodiment can be a glass whose softening point is 600° C. or higher and 850° C. or lower. This increases the adhesion with the end electrode part 6a (8a) and humidity resistance and also makes it possible to improve the bending strength. From the above point of view, more preferably, the glass used for the end cover layers 18b has a softening point of 600° C. or higher and 850° C. or lower.

Preferably, the end cover layers 18b of the present embodiment are made of a material whose elasticity is lower than that of the dielectric layers. This reduces stress impact from outside and thereby makes it possible to prevent cracks in the following steps.

Moreover, the end cover layers 18b of the present embodiment are preferably made of a material whose linear thermal expansion coefficient is lower than that of the dielectric layers. This makes it possible to improve the strength by stress adjustment using the difference in linear thermal expansion coefficient.

In the present embodiment, the upper-surface cover layer 18 covering the upper surface 4c of the element body 4 located between the pair of upper electrode parts 6b and 8b is formed to have an upper surface that is substantially flush with the surfaces of the upper electrode parts 6b and 8b.

Here, "substantially flush" means roughly flush, but also means that there may be a few steps. For example, the upper-surface cover layer 18 has a relative thickness of 70 to 110%, which is obtained from the formula of (an average thickness of the upper-surface cover layer 18/an average thickness of the upper electrode parts 6b and 8b)×100. This smoothes steps near the upper surface 4c of the element body 4 and makes it possible to prevent a stress concentration on the steps even if the multi-layer ceramic capacitor 2 is thinned and to increase the bending strength of the multi-layer ceramic capacitor 2. In addition, the multilayer ceramic capacitor 2 is easily picked up by vacuum suction.

The upper-surface cover layer 18 is made of any material, such as glass, alumina based composite material, zirconia based composite material, polyimide resin, epoxy resin, aramid fiber, and fiber reinforced plastic, but is preferably made of a glass whose softening point is 600° C. or higher and 850° C. or lower in view of improving the bending strength by strengthening the adhesion between the exterior region 11 and the upper electrode parts 6b and 8b.

From the above point of view, it is more preferred that the glass used for the upper-surface cover layer 18 has a softening point of 600° C. or higher and 850° C. or lower. Such a glass is a Si—B—Zn—O based glass, a Si—Ba—Al—O, or the like. In addition, a glass component of BaO, $Al_2O_3$, alkali metal, CaO, and SrO may be contained.

Preferably, the glass component constituting the upper-surface cover layer 18 contains 30 to 70 mass % of $SiO_2$, 1 to 20 mass % of $B_2O_3$, and 1 to 60 mass % of ZnO. This makes it easier to appropriately control the softening point of the glass.

Preferably, 70 to 100 mass % of $SiO_2$, $B_2O_3$, and ZnO are contained in the glass component constituting the upper-surface cover layer 18 of the present embodiment. This makes it easier to appropriately control the softening point of glass.

As with the end cover layers 18b, the upper-surface cover layer 18 is preferably made of a material whose elasticity is lower than that of the dielectric layers. This reduces stress impact from outside and thereby makes it possible to prevent cracks in the following steps.

Moreover, as with the end cover layers 18b, the upper-surface cover layer 18 is preferably made of a material whose linear thermal expansion coefficient is lower than that of the dielectric layers. This makes it possible to increase the strength by stress adjustment using the difference in linear thermal expansion coefficient.

Incidentally, the end cover layers 18b and the upper-surface cover layer 18 may be made of the same material as or different materials. As mentioned above, however, the materials of the end cover layers 18b are determined with emphasis on improvement in humidity resistance, but the material of the upper-surface cover layer 18 is determined with emphasis on adhesion with the upper electrode parts 6b and 8b and the exterior region 11 in view of smoothing steps near the upper surface 4c. From such a point of view, the upper-surface cover layer 18 and the end cover layers 18b are preferably made of different materials.

Preferably, when the end cover layers 18b and the upper-surface cover layer 18 are made of different materials, their characteristics are not very different from each other. Specifically, when the end cover layers 18b and the upper-surface cover layer 18 are made of a film whose main component is resin, it is preferred that the difference in elasticity between the end cover layers 18b and the upper-surface cover layer 18 is $20\times10^{-6}$ Pa or less. Moreover, when the end cover layers 18b and the upper-surface cover layer 18 are made of a glass whose main component is Si, it is preferred that the difference in thermal expansion coefficient between the end cover layers 18b and the upper-surface cover layer 18 is $20\times10^{-6}$/K or less. This makes it easier to manufacture the multilayer ceramic capacitor 2 and generates fewer failures of the multi-layer ceramic capacitor 2.

The multilayer ceramic capacitor 2 has a shape and a size appropriately determined based on purpose and use. In the present embodiment, the multi-layer ceramic capacitor 2 can have a small total thickness z0 in the Z-axis direction (e.g., 100 μm or less, preferably 90 μm or less, more preferably 80 μm or less, and still more preferably 60 μm or less). This contributes to a low profile of the multilayer ceramic capacitor 2.

In the present embodiment, the length y0 of the capacitor 2 in the Y-axis direction (longitudinal length) can be three times or larger than the thickness z0 (preferably 300 μm or larger, more preferably 400 to 1200 m), and the width x0 of the capacitor 2 in the X-axis direction can be twice or larger than the thickness z0 (preferably 200 μm or larger, more preferably 200 to 600 μm).

Figure 5:
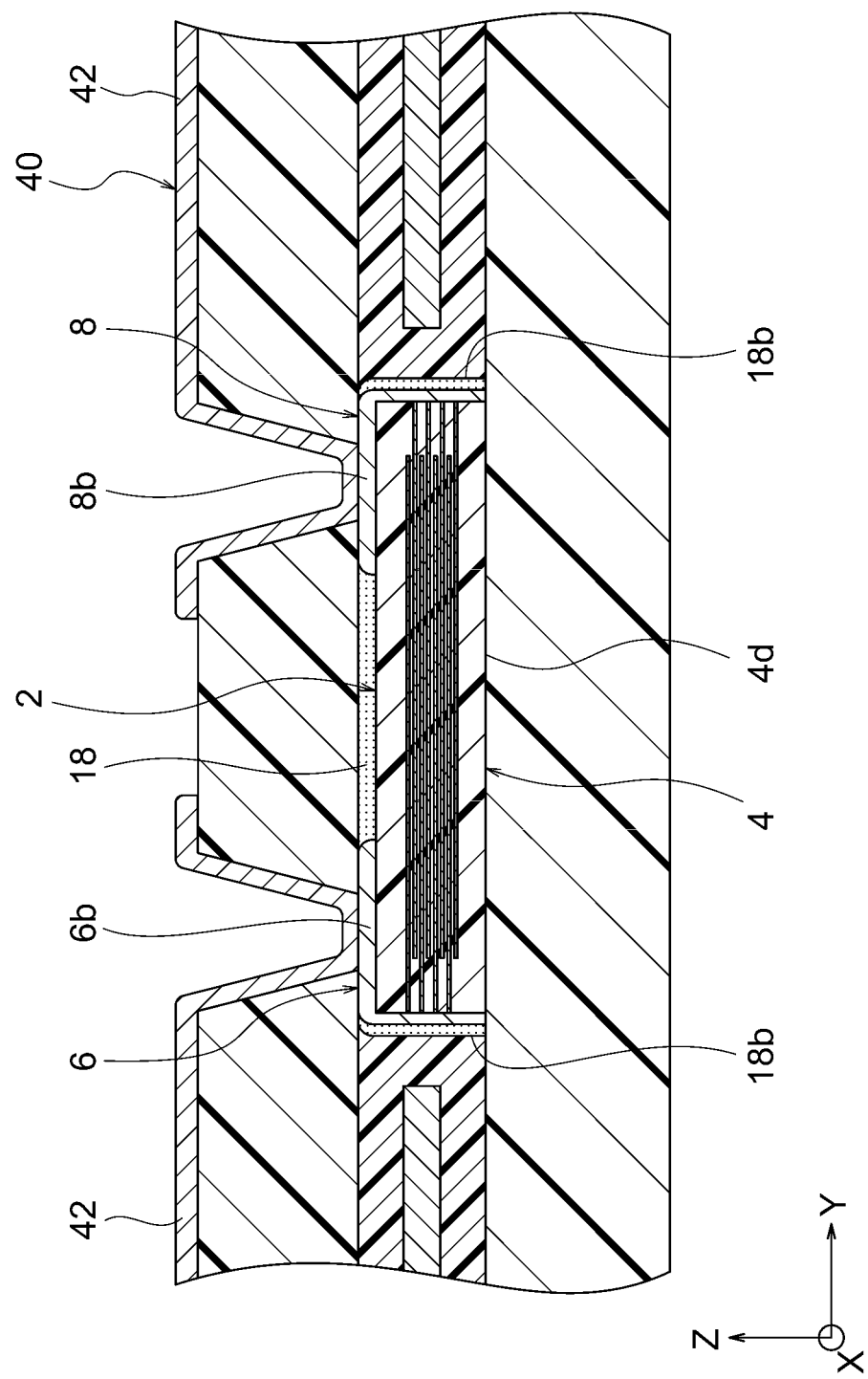
FIG. 5 is a cross-sectional view of a main part of the multilayer ceramic capacitor shown in FIG. 1A illustrating a use example thereof.

In the present embodiment, since the lower surface 4d of the element body 4 is a flat surface, the multilayer ceramic capacitor 2 is easily embedded into a multi-layer substrate 40 as shown in, for example, FIG. 5. In FIG. 5, a wiring pattern 42 formed on the multilayer substrate 40 is connected with the upper electrode part 6b (8b) of the terminal electrode 6 (8) of the multilayer ceramic capacitor 2 via a through hole electrode or so. In the present embodiment, when the flat surface (the lower surface 4d of the element body 4) is placed on a mount surface, the element body 4 is attached on the mount surface, and the multilayer ceramic capacitor 2 has an improved bending strength.

In the present embodiment, the exterior regions 11 forming the upper surface 4c and the lower surface 4d of the element body 4 may be made of a dielectric material that is stronger than the inner dielectric layers 10. This structure further improves the bending strength of the multilayer ceramic capacitor 2. When the multilayer ceramic capacitor 2 is strengthened, it becomes easy for the element body 4 to have a large length y0 in the longitudinal direction or a large width x0, a facing area between the internal electrode layers 12 in the element body 4 is large, and characteristics (e.g., capacitance) are improved. Moreover, the side-gap regions 14 shown in FIG. 2A1 and FIG. 2A2 may be made of a dielectric material that is stronger than the inner dielectric layers 10.

Next, specifically described is a method of manufacturing the multi-layer ceramic capacitor 2 as an embodiment of the present invention.

To manufacture inner green sheets that will be constituting the inner dielectric layers 10 shown in FIG. 1A after firing and outer green sheets that will be constituting the exterior regions 11 after firing, a paste for the inner green sheets and a paste for the outer green sheets are initially prepared. The paste for the inner green sheets and the paste for the outer green sheets are made of an aqueous paste or an organic-solvent-based paste obtained by kneading a ceramic powder with an organic vehicle.

A raw material of the ceramic powder may appropriately be selected from various compounds to be a composite oxide or an oxide, such as carbonate, nitrate, hydroxide, and organometallic compound, and these various compounds can be mixed for use. In the present embodiment, the raw material of the ceramic powder is preferably used as a powder having an average grain size of 0.45 µm or less (preferably, about 0.1 to 0.3 µm). To obtain extremely thin inner green sheets, it is preferable to use a powder that is finer than the thickness of the green sheets.

The organic vehicle is an organic solvent in which a binder is dissolved. The binder used for the organic vehicle may be any binder selected appropriately from normally used various binders, such as ethyl cellulose and polyvinyl butyral. The organic solvent to be used may also be any solvent appropriately selected from various organic solvents, such as acetone and methyl ethyl ketone.

If necessary, the pastes for the green sheets may be added with an additive selected from various dispersants, plasticizers, dielectrics, sub-component chemical compound, glass frit, insulators, and the like.

Examples of the plasticizers include phthalic acid esters (e.g., dioctyl phthalate and benzylbutyl phthalate), adipic acid, phosphoric esters, and glycols.

To manufacture internal electrode pattern layers that will be constituting the internal electrode layers 12 shown in FIG. 1A after firing, a paste for the internal electrode layers is subsequently prepared. The paste for the internal electrode layers is prepared by kneading a conductive material made of the above-described various conductive metals or alloys with the above-described organic vehicle.

A paste for the terminal electrodes that will be constituting the terminal electrodes 6 and 8 shown in FIG. 1A after firing is prepared similarly to the above-mentioned paste for the internal electrode layers.

An internal multilayer body is manufactured by alternately laminating the inner green sheets and the internal electrode pattern layers using the paste for the inner green sheets and the paste for the internal electrode layers prepared in the above-mentioned manner. After the internal multilayer body is manufactured, a green multilayer body is obtained by forming outer green sheets using the paste for the outer green sheets and pressing them in the lamination direction.

Instead of the above-mentioned method, the green multilayer body may be obtained by alternately directly laminating a predetermined number of the inner green sheets and the internal electrode pattern layers on the outer green sheets and pressing them in the lamination direction.

Specifically, the inner green sheets are formed on carrier sheets (e.g. PET films) as support members by a doctor blade method or so. The inner green sheets are formed on the carrier sheets and are thereafter dried.

Next, the inner green sheets with the internal electrode pattern layers are obtained by forming the internal electrode pattern layers on the surfaces of the inner green sheets using the paste for the internal electrode layers. After the internal multilayer body is manufactured by laminating the multiple inner green sheets with the internal electrode pattern layers, a green multilayer body is subsequently obtained by forming an appropriate number of the outer green sheets on the top and bottom of the internal multilayer body using the paste for the outer green sheets and pressing them in the lamination direction.

Next, green chips are obtained by cutting the green multilayer body into pieces. Incidentally, the internal electrode pattern layers are formed by any method for forming thin films, such as printing method, transfer method, vapor deposition, and sputtering.

The green chips are solidified by removing the plasticizer based on solidification and dry. The element body 4 is obtained by subjecting the green chips after the solidification and dry to a debinding step, a firing step, and if necessary, an annealing step. The debinding step, the firing step, and the annealing step may be carried out continuously or independently.

Figure 4:
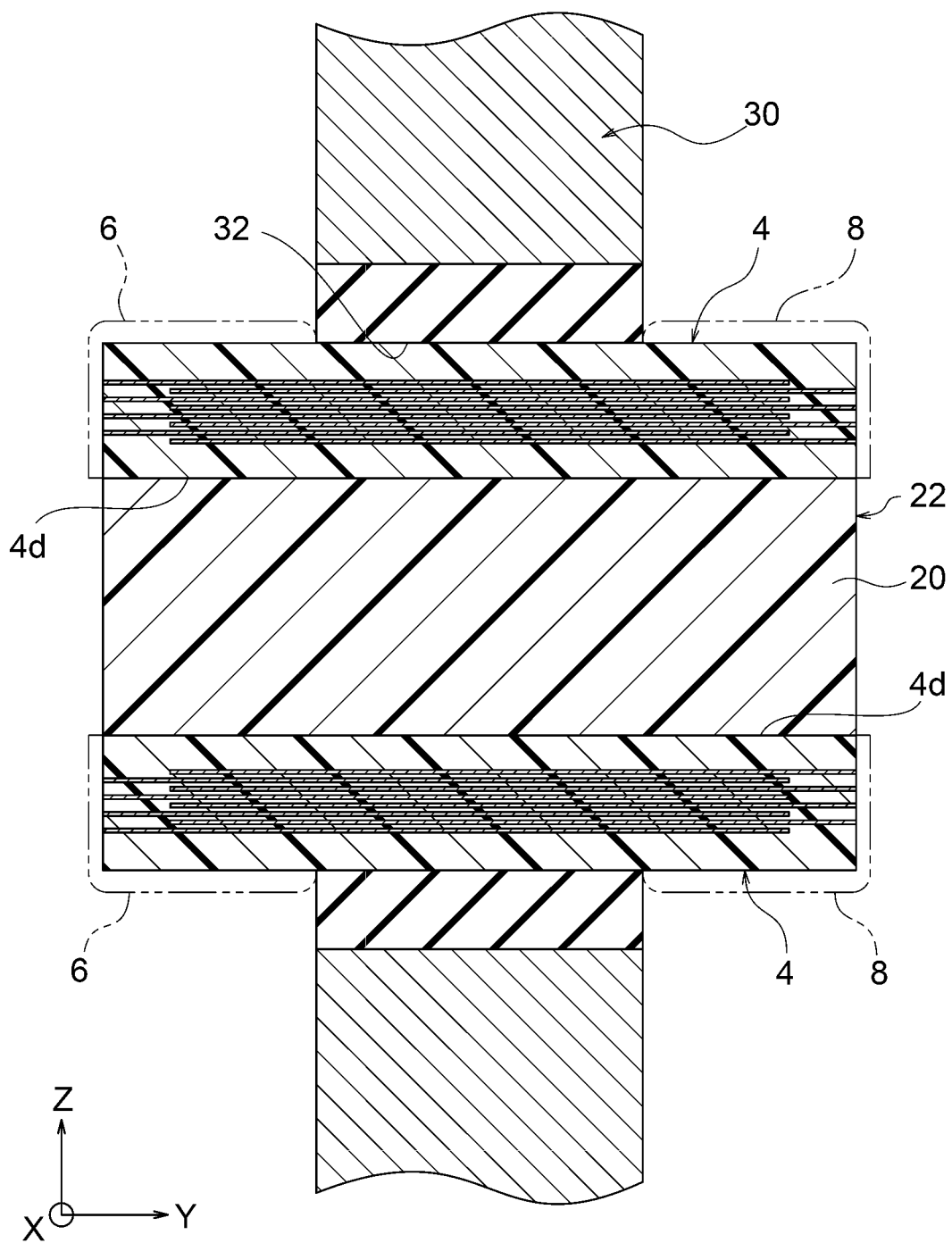
FIG. 4 is a cross-sectional view of a main part of the multilayer ceramic capacitor shown in FIG. 1A illustrating a manufacturing step thereof.

Next, the paste for the terminal electrodes is applied on both end surfaces of the element body 4 in the Y-axis direction and is fired to form the terminal electrodes 6 and 8. For example, as shown in FIG. 4, when the terminal electrodes 6 and 8 are formed, a dummy block 20 is temporarily attached between the lower surfaces 4d and 4d of two element bodies 4 and 4, and these are initially integrated to form a work 22.

The dummy block 20 is preferably made of a material that is removable in the following steps and is preferably hard to be attached with the paste for the terminal electrodes. The dummy block 20 is made of silicon rubber, nitrile rubber, polyurethane, fluorine resin, PET resin, PEN resin, etc. Preferably, the width in the X-axis direction and the width in the Y-axis direction of the dummy block 20 are approximately the same as those of the element body 4, respectively. The thickness of the dummy block 20 in the Z-axis direction may be equal to or smaller or larger than the thickness of the element body 4 in the Z-axis direction.

Incidentally, without forming the dummy block 20, the work 22 may be formed by directly attaching the lower surfaces 4d and 4d of the two element bodies 4 and 4 with an adhesive agent that is removable in the following steps. Preferably, the adhesive agent is modified silicone polymer, PVA aqueous solution glue, water-soluble acrylic resin aqueous solution glue, modified polyurethane, two-component aqueous material of modified silicone and epoxy resin, starch glue, etc. Instead of the dummy block 20, the work 22 may be formed by attaching one or more element bodies 4 between the two element bodies 4 and 4.

Since the two or more element bodies 4 and 4 are combined, the work 22 has a thickness that is sufficiently easily handled even if the element bodies 4 and 4 are thin in the Z-axis direction, and the terminal electrodes 6 and 8 can be formed as before by attaching the work 22 into a through hole 32 of a holding plate 30. Incidentally, the terminal electrodes 6 and 8 are also formed by any appropriate method, such as coating and firing, plating, vapor deposition, and sputtering of the paste for the terminal electrodes. If necessary, a cover layer is formed on the surface of the terminal electrode 6 (8) by plating. The cover layer is Ni plating, Sn plating, Au plating, Cu plating, etc.

After the terminal electrodes 6 and 8 are formed, the dummy block 20 is removed to divide the two element bodies 4 and 4, and the multi-layer ceramic electronic device 2 shown in FIG. 1A is thereby obtained. In the multi-layer ceramic electronic device 2, the terminal electrodes 6 and 8 are not substantially formed on the lower surface 4d of the element body 4, and the lower surface 4d of the element body 4 is entirely exposed outside.

Next, the end cover layers 18b are formed on the exterior surfaces of the end electrode parts 6a and 8b of the terminal electrodes 6 and 8, and the upper-surface cover layer 18 is formed on the upper surface 4c of the element body 4 perpendicular to the Z-axis direction. The upper-surface cover layer 18 and the end cover layers 18b are formed by any method, such as dipping, printing, coating, vapor deposition, and sputtering.

For example, when the upper-surface cover layer 18 and the end cover layers 18b are formed by coating, the end cover layers 18b are formed by applying a paste for the cover layers onto the exterior surfaces of the end electrode parts 6a and 8b and firing it, and the upper-surface cover layer 18 can thereafter be formed by applying the paste for the cover layers onto the upper surface 4c of the element body 4 and firing it. The element body 4 applied with the paste for the cover layers is fired with any conditions and is fired, for example, while being retained at 600 to 1000° C. for 0.1 to 3 hours in a humidified $N_2$ or dry $N_2$ atmosphere.

Next, the upper electrode parts 6b and 8b, the upper-surface cover layer 18, and the ends of the end cover layers 18b in the Z-axis direction are polished to be flush with each other. Incidentally, when a plating film is formed on the surfaces of the upper electrode parts 6b and 8b, the plating film and the upper-surface cover layer 18 may be polished to be flush with each other.

The multilayer ceramic capacitor 2 of the present embodiment manufactured in such a manner is mounted on a printed board or so by soldering etc. and is used for various electronic devices. Instead, as shown in FIG. 5, the multilayer ceramic capacitor 2 of the present embodiment is used by being embedded into the multilayer substrate 40. The multilayer ceramic capacitor 2 of the present embodiment is preferably specifically used for decoupling capacitors, but is also used for high voltage capacitors, low ESL capacitors, large capacity capacitors, etc.

The multilayer ceramic capacitor 2 of the present embodiment is as thin as, for example, half or less compared to conventional ones by dividing the element bodies 4 after the terminal electrodes 6 and 8 are formed.

In the multilayer ceramic capacitor 2 to be obtained, the terminal electrodes 6 and 8 are not substantially formed on the lower surface 4d of the element body 4, or the lower surface 4d of the element body 4 is entirely exposed. Then, the multilayer ceramic capacitor 2 can have a small total thickness z0 of 100 µm or smaller (preferably 90 µm or smaller, more preferably 80 µm or smaller, and still more preferably 60 µm or smaller). That is, this contributes to a low profile of the multilayer ceramic capacitor 2.

In the present embodiment, the lower surface 4d of the element body 4 is a flat surface. Since the lower surface 4d of the element body 4 is a flat surface, the multi-layer ceramic capacitor 2 is easily embedded into a multilayer substrate 40 as shown in, for example, FIG. 5. When the flat surface (the surface of the lower surface 4d of the element body 4) is placed on a mount surface, the element body 4 is tightly mounted on the mount surface, and the multilayer ceramic capacitor 2 has an improved bending strength.

Second Embodiment

Except for the following matters, as shown in FIG. 2A2, a multilayer ceramic capacitor 2 according to the present embodiment is similar to the multilayer ceramic capacitor 2 according to First Embodiment. The multilayer ceramic capacitor 2 according to the present embodiment includes lateral cover layers 18a continuing to the upper-surface cover layer 18 according to First Embodiment and formed on the lateral surfaces 4e of the element body 4 facing each other in the X-axis direction. In this structure, the multilayer ceramic capacitor 2 according to the present embodiment is further strengthened.

The lateral cover layers 18a are made of any material and may be made of the same material as or a different material from that of the upper-surface cover layer 18. The lateral cover layer 18a has any thickness and may have the same thickness as or a different thickness from that of the upper-surface cover layer 18.

The lateral cover layers 18a are formed by any method and are formed by, for example, a method similar to that of the upper-surface cover layer 18.

Third Embodiment

Except for the following matters, as shown in FIG. 1B and FIG. 2B, a multilayer ceramic capacitor 2a according to the present embodiment is similar to the multilayer ceramic capacitor 2 according to First Embodiment. In the multilayer ceramic capacitor 2a according to the present embodiment, the upper surface 4c (or the lower surface 4d) of the element body 4 includes an upper-surface reinforcement layer 16 made of a material that is stronger than the inner dielectric layers 10.

After the element body 4 is formed similarly to First Embodiment, the upper-surface reinforcement layer 16 is formed on the upper surface 4c of the element body 4 before the terminal electrodes 6 and 8 are formed. The upper-surface reinforcement layer 16 is made of any material, such as glass, alumina based composite material, zirconia based composite material, polyimide resin, epoxy resin, aramid fiber, fiber reinforced plastic, or the like. The upper-surface reinforcement layer 16 may be made of the same material or a different material from that of the upper-surface cover layer 18.

This structure further improves the bending strength of the multilayer ceramic capacitor 2a. Since the multilayer ceramic capacitor 2a is strengthened, even if the element body 4 is thinned, the element body easily has a large length y0 in the longitudinal direction (see FIG. 1A) or a large width x0 (see FIG. 2A1 and FIG. 2A2), a facing area between the internal electrode layers 12 in the element body 4 is large, and characteristics (e.g., capacitance) of the multilayer ceramic capacitor 2a are further improved.

From the above point of view, the upper-surface reinforcement layer 16 preferably has a relative thickness of 20 to 133%, which is obtained from the formula of (an average thickness of the upper-surface reinforcement layer 16/an average thickness of the upper electrode parts 6b and 8b)×100.

Incidentally, the upper-surface reinforcement layer 16 is formed of any glass component. Preferably, the glass contained in the upper-surface reinforcement layer 16 of the present embodiment has a main component of at least one of Si and Al. Incidentally, the main component is a component that is contained in the glass by 30 mass % to 70 mass %. More preferably, the glass contained in the upper-surface reinforcement layer 16 of the present embodiment has a main component of Si and Al.

Preferably, the glass contained in the upper-surface reinforcement layer 16 of the present embodiment contains 30 mass % to 70 mass % of $SiO_2$. When $SiO_2$ is contained in this range, a sufficient amount of network-former oxide is obtained, and plating resistance becomes favorable, compared to when less amount of $SiO_2$ is contained. When $SiO_2$ is contained in the above range, a softening point is prevented from being too high, and an operation temperature is prevented from being too high, compared to when more amount of $SiO_2$ is contained.

Preferably, the glass contained in the upper-surface reinforcement layer 16 of the present embodiment contains 1 mass % to 15 mass % of $Al_2O_3$. When $Al_2O_3$ is contained in this range, plating resistance becomes favorable compared to when less amount of $Al_2O_3$ is contained. When $Al_2O_3$ is contained in the above range, a softening point is prevented from being too high compared to when more amount of $Al_2O_3$ is contained.

Preferably, the glass contained in the upper-surface reinforcement layer 16 of the present embodiment includes a sub-component of at least one of alkali metal, alkaline earth metal, transition metal, and boron.

When the glass contained in the upper-surface reinforcement layer 16 of the present embodiment includes a sub-component of at least one of alkali metal, alkaline earth metal, transition metal, and boron, the upper electrode parts 6b and 8b are easily formed by plating on a part of the surface of the upper-surface reinforcement layer 16 covering the upper surface 4c.

When the glass contained in the upper-surface reinforcement layer 16 of the present embodiment contains alkali metal, transition metal, and boron, the glass can have a lower softening point.

When the glass contained in the upper-surface reinforcement layer 16 of the present embodiment contains alkali metal, plating resistance becomes favorable. The alkali metal of the present embodiment is not limited and is Li, Na, K, etc. As the alkali metal used in the present embodiment, one kind may solely be used, or two or more kinds may be used at the same time. When the glass contained in the upper-surface reinforcement layer 16 of the present embodiment contains Li, the glass can densely be fired, and cracks are thereby hard to be generated. When the glass contained in the upper-surface reinforcement layer 16 of the present embodiment contains Na or K, thermal expansion coefficient is high, and cracks can thereby be hard to be generated.

Preferably, the glass contained in the upper-surface reinforcement layer 16 of the present embodiment contains 0.1 mass % to 15 mass % of alkali metal.

When the glass contained in the upper-surface reinforcement layer 16 of the present embodiment contains alkaline earth metal, the adhesion between the dielectric layers and the glass contained in the upper-surface reinforcement layer 16 becomes favorable, delamination is thereby hard to be generated, thermal expansion coefficient is prevented from being too small, and cracks are hard to be generated. When the alkaline earth metal is Ba and the dielectric layers are $BaTiO_3$, Ba is prevented from eluting to the glass component, and HALT reliability is prevented from being worse. When BaO is contained in the above range, vitrification and plating resistance are favorable, compared to when more amount of BaO is contained.

The alkaline earth metal constituting the glass contained in the upper-surface reinforcement layer 16 of the present embodiment is not limited and is Mg, Ba, Ca, Sr, etc. The alkaline earth metals may be one kind or two or more kinds. In the present embodiment, the alkaline earth metal is preferably Ba or Ca.

Preferably, the glass contained in the upper-surface reinforcement layer 16 of the present embodiment contains 20 mass % to 60 mass % of BaO.

Preferably, the glass contained in the upper-surface reinforcement layer 16 of the present embodiment contains 70 mass % to 100 mass % of $SiO_2$, BaO, and $Al_2O_3$ in total.

This makes it easier to form a Ba—Ti—Si—O phase in an interface between the dielectric layers and the upper-surface reinforcement layer 16.

Preferably, the glass contained in the upper-surface reinforcement layer 16 of the present embodiment contains 0 mass % to 15 mass % of CaO. This makes it possible to increase thermal expansion coefficient.

Preferably, the glass contained in the upper-surface reinforcement layer 16 of the present embodiment contains 0 mass % to 20 mass % of SrO. This makes it possible to increase thermal expansion coefficient. When SrO is contained in the above range, compared to when more amount of SrO is contained, SrO is prevented from reacting with $BaTiO_3$, and insulation property and reliability of chips can be improved.

The transition metal used for the glass contained in the upper-surface reinforcement layer 16 of the present embodiment is any element, such as V, Zn, W, and Mo, but is preferably V or Zn. This makes it easier to form plating as the upper electrode parts 6b and 8b. The transition metal of the present embodiment may be one kind or two or more kinds.

Preferably, the glass contained in the upper-surface reinforcement layer 16 of the present embodiment contains 0 mass % to 20 mass % of the transition metal.

Preferably, the glass contained in the upper-surface reinforcement layer 16 of the present embodiment contains 0 mass % to 10 mass % of $B_2O_3$. This demonstrates the effect of the glass as a network-former oxide. When $B_2O_3$ is contained in the above range, plating resistance can be favorable compared to when more amount of $B_2O_3$ is contained.

In the present embodiment, the upper-surface reinforcement layer 16 constitutes only a part of the exterior region 11 near its exterior surface, but may constitute most or the whole of the exterior region 11. The upper-surface reinforcement layer 16 can be formed by applying a paste for the reinforcement layer onto the upper surface 4c or the lower surface 4d of the element body 4 and firing it.

The paste for the reinforcement layer can be obtained by, for example, kneading the above-mentioned glass raw material, a binder whose main component is ethyl cellulose, and terpineol and acetone (dispersion media) using a mixer. The paste for the reinforcement layer is applied onto the element body 4 by any method, such as dipping, printing, coating, vapor deposition, and spraying.

The element body 4 applied with the paste for the reinforcement layer is fired with any conditions and is fired, for example, while being retained at 700 to 1300° C. for 0.1 to 3 hours in a humidified $N_2$ or dry $N_2$ atmosphere.

Fourth Embodiment

Except for the following matters, as shown in FIG. 2C, a multilayer ceramic capacitor 2b according to the present embodiment is similar to the multilayer ceramic capacitor 2a according to Third Embodiment. The multilayer ceramic capacitor 2b includes lateral reinforcement layers 16a continuing to the upper-surface reinforcement layer 16 according to Third Embodiment and formed on the lateral surfaces 4e of the element body 4 facing each other in the X-axis direction. In this structure, the multi-layer ceramic capacitor 2b according to the present embodiment is further strengthened.

Incidentally, FIG. 2C shows that the lateral reinforcement layers 16a constitute only a part of the side-gap regions 14 near the lateral surfaces 4e, but may constitute the whole of the side-gap regions 14. That is, the lateral reinforcement layers 16a may be contacted with the ends of the internal electrode layers 12 in the X-axis direction.

The lateral reinforcement layers 16a are made of any material and may be made of the same as or a different material from that of the upper-surface reinforcement layer 16. The lateral cover layer 16a (16a) has any thickness and may have the same thickness as or a different thickness from that of the upper-surface reinforcement layer 16.

The lateral cover layers 16a are formed by any method and are formed by, for example, a method similar to that of the upper-surface reinforcement layer 16.

Seventh Embodiment

Figure 7A:
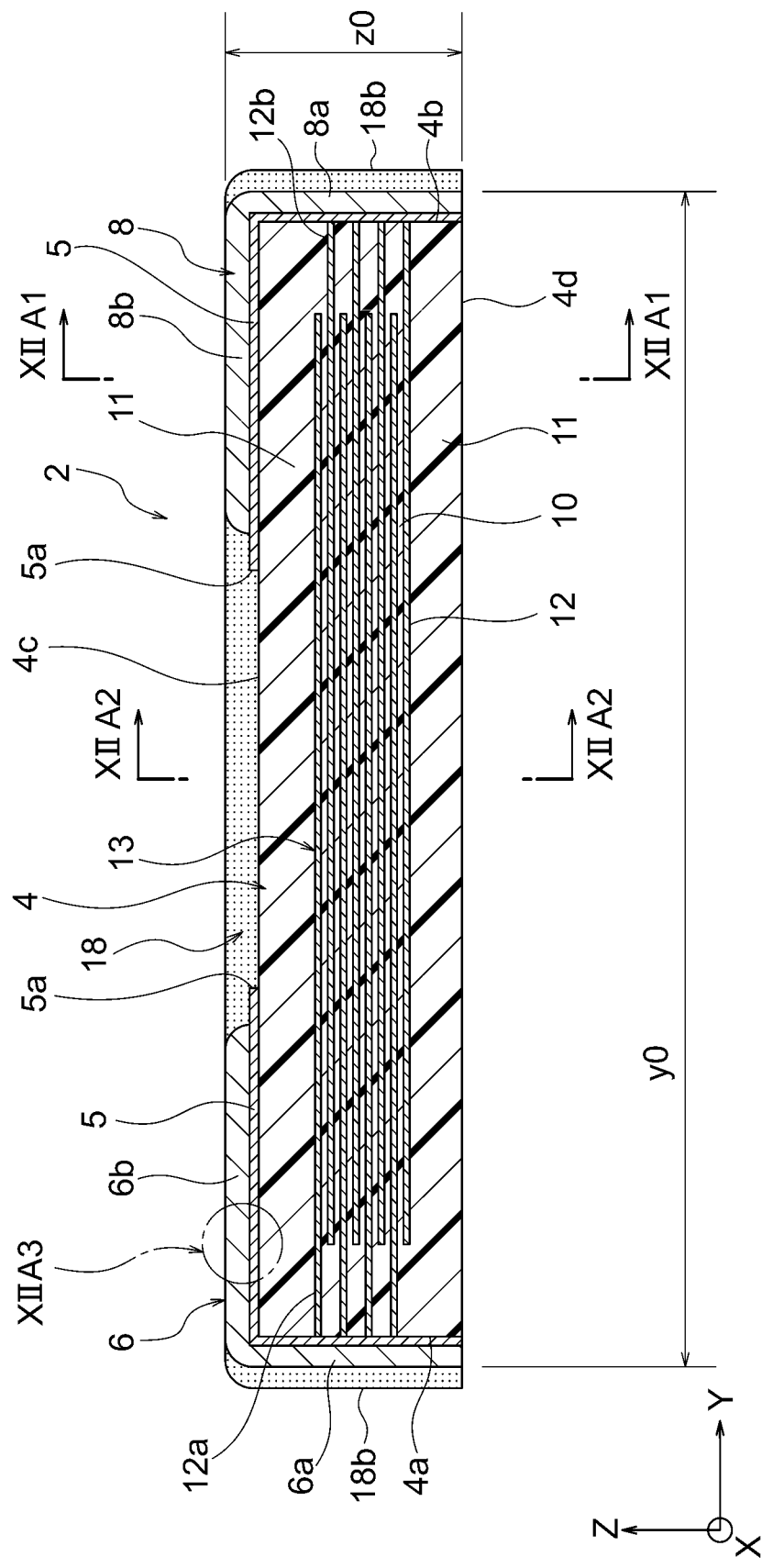
FIG. 7A is a longitudinal cross-sectional view of a multilayer ceramic capacitor according to an embodiment of the present invention.

Except for the following matters, as shown in FIG. 7A, a multilayer ceramic capacitor 2 according to the present embodiment is similar to the multilayer ceramic capacitor 2 according to First Embodiment. In the present embodiment, as shown in FIG. 7A, conductive metal films 5 are formed in interfaces between the element body 4 and the terminal electrodes 6 and 8. In response to the terminal electrodes 6 and 8, each of the conductive metal films 5 includes an upper metal film part formed on the upper surface 4c of the element body 4, an end metal film part formed on the end surface 4a (4b) of the element body 4, and a lateral metal film part formed on the lateral surface 4e of the element body 4 (see FIG. 8A1). In each of the conductive metal films 5, the upper metal film part, the end metal film part, and the lateral metal film part are formed continuously.

As shown in FIG. 7A, it is preferred that inner ends 5a of the pair of conductive metal films 5 in the Y-axis direction protrude toward the center of the element body 4 in the Y-axis direction by a predetermined length from the inner ends of the upper electrode parts 6b and 8b of the terminal electrodes 6 and 8. Incidentally, the predetermined protrusion length of the inner ends 5a is not limited, but is preferably 0 to 30 μm. However, the predetermined protrusion length is determined so that the inner ends 5a of the metal films 5 are not electrically connected with each other and are not short-circuited.

The conductive metal films contain at least any one of Pt, Rh, Ru, Re, Ir, and Pd. Since the conductive metal films made of such metals are formed on the surface of the element body, the adhesion between the terminal electrodes and the element body is further strengthened.

As shown in FIG. 8A3, the surface of the element body 4 is a surface of a ceramic sintered body and has unevenness of repeated concaves and convexes in micro observation. In terms of the unevenness formed on the surface of the element body 4, for example, the surface roughness represented by JIS B 0601 is 2 to 4 μm.

In the present embodiment, a coverage area ratio of uneven surfaces formed on the surface of the element body and covered by the conductive metal films 5 is preferably 20 to 70% (more preferably, 50 to 70%). When the coverage area ratio of the surface of the element body 4 by the conductive metal films 5 is too small or too large, an improvement effect on the adhesion between the terminal electrodes 6 and 8 and the element body 4 is small. When the coverage area ratio of the surface of the element body 4 by the conductive metal films 5 is within a predetermined range, the improvement effect is large.

From such a point of view, the thickness t of the conductive metal films 5 is not limited, but is preferably smaller than the size of the unevenness formed on the surface of the element body 4 (a Z-axis distance between a convex and a concave next to each other) and is preferably about 100 to 500 nm. Preferably, the conductive metal films 5 are metal thin films formed by a thin film method, such as sputtering, ion plating, plasma CVD, thermal CVD, molecular beam epitaxy, and spin coating. The terminal electrodes 6 and 8 are formed on the conductive metal films 5.

Incidentally, FIG. 8A3 shows the conductive metal films 5 and the terminal electrodes 6 and 8 formed on the upper surface 4c of the element body 4, but this is also the case with the conductive metal films 5 and the terminal electrodes 6 and 8 formed on the end surfaces 4a and 4b of the element body 4 shown in FIG. 7A and the lateral surfaces 4e shown in FIG. 8A1.

In the multilayer ceramic capacitor 2 according to the present embodiment, the conductive metal films 5 are formed in interfaces between the element body 4 and the terminal electrodes 6 and 8. This structure makes it possible to increase the adhesion between the terminal electrodes 6 and 8 and the element body 4. It is thereby possible to achieve improvement in the adhesion between the element body 4 and the terminal electrodes 6 and 8 and to strengthen the humidity resistance.

In the present embodiment, the coverage area ratio of the metal films 5 can be defined as an area ratio of the metal films 5 filling concaves of the unevenness on the surface of the element body 4. The coverage area ratio is measured by polishing the surfaces of the terminal electrodes 6 and 8 on a cross section of the element body 4, for example, shown in FIG. 8A3 and observing the surface of the element body 4 in the Z-axis direction (the terminal electrodes 6 and 8 are polished and completely removed) as a SEM image taken from the Z-axis direction. The area ratio is obtained by measuring an area of the metal films 5 within a surface observation image (e.g., 50 μm×50 μm). The coverage area ratio of the metal films 5 is obtained by, for example, averaging areas of five surface observation images having different X-Y positions.

In the present embodiment, the terminal electrodes 6 and 8 are not substantially formed on the lower surface 4d of the element body 4 located opposite to the upper surface 4c of the element body 4 in the Z-axis direction. That is, the lower surface 4d of the element body 4 is not covered with the terminal electrode 6 or the terminal electrode 8 and is entirely exposed outside. Moreover, the lower surface 4d of the element body 4 is a flat surface. Since the lower surface 4d of the element body 4 is not covered with the terminal electrode 6 or the terminal electrode 8, the lower surface 4d has no steps and is excellent in flatness.

In the present embodiment, the external surfaces of the end electrode parts 6a and 8a are covered with the end cover layers 18b and 18b. This makes it possible to further increase humidity resistance of the multilayer ceramic capacitor 2. That is, even if the terminal electrodes 6 and 8 are thinned by low profile of the multilayer ceramic capacitor 2, water can be prevented from entering the multilayer ceramic capacitor 2. It is thereby possible to use the multilayer ceramic capacitor 2 in an environment containing water or a humid environment. Moreover, even if the manufacturing steps of the multilayer ceramic capacitor 2 include a step using water or a wet step, it is possible to prevent water from entering the multilayer ceramic capacitor 2 and to prevent decrease in insulation property.

Since the external surfaces of the end electrode parts 6a and 8a are covered with the end cover layers 18b and 18b, the multilayer ceramic capacitor 2 according to the present embodiment can be strengthened. The end cover layers 18b and 18b according to the present embodiment are similar to the end cover layers 18b and 18b according to First Embodiment.

In the present embodiment, the upper-surface cover layer 18 covering the upper surface 4c of the element body 4 located between the pair of upper electrode parts 6b and 8b is formed to have an upper surface that is substantially flush with the surfaces of the upper electrode parts 6b and 8b. The upper-surface cover layer 18 covers the upper surface 4c of the element body 4 and also covers the surfaces of the inner ends 5a of the conductive metal films 5 protruding from the inner ends of the terminal electrodes 6 and 8. The upper-surface cover layer 18 according to the present embodiment is similar to the upper-surface cover layer 18 according to First Embodiment.

Next, specifically described is a method of manufacturing the multi-layer ceramic capacitor 2 as an embodiment of the present invention.

As with First Embodiment, the element body 4 is initially obtained. Next, green chips are obtained by cutting the green multilayer body into pieces. Incidentally, the internal electrode pattern layers are formed by any method for forming thin films, such as printing method, transfer method, vapor deposition, and sputtering.

The green chips are solidified by removing the plasticizer based on solidification and dry. The element body 4 is obtained by subjecting the green chips after the solidification and dry to a debinding step, a firing step, and if necessary, an annealing step. The debinding step, the firing step, and the annealing step may be carried out continuously or independently.

Figure 10A:
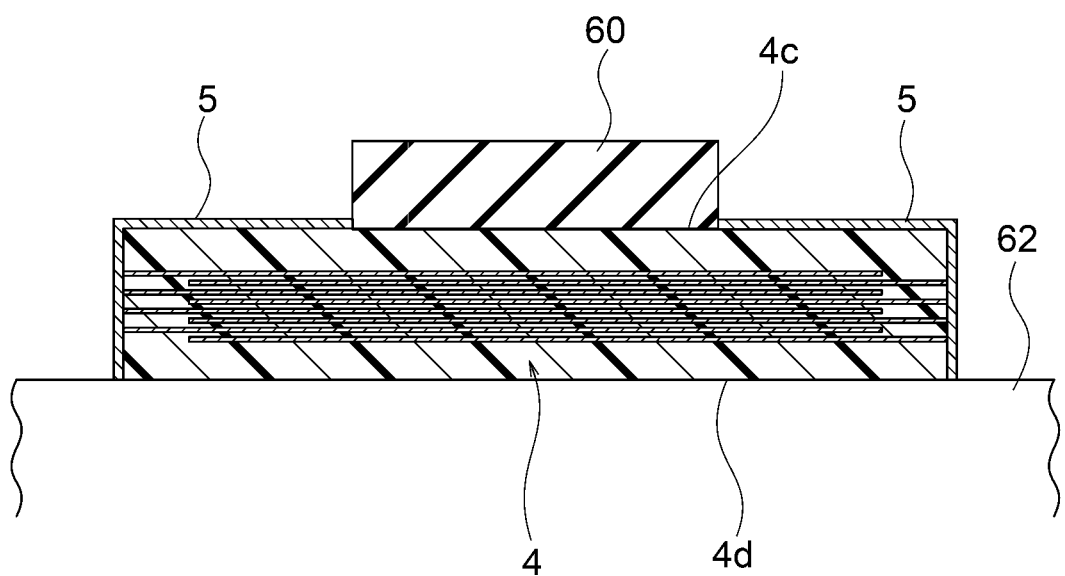
FIG. 10A is a cross-sectional view of a main part of the multilayer ceramic capacitor shown in FIG. 7A illustrating a manufacturing step thereof.

As shown in FIG. 10A, a resist film 60 is thereafter formed in a predetermined pattern on the central part of the upper surface 4c of the element body 4 in the Y-axis direction, the element body 4 is fixed on an installation stand 62 of a sputtering apparatus, and the conductive metal films 5 are formed by sputtering method. The conductive metal films 5 are not formed on the upper surface and the lateral surfaces of the element body 4 covered with the resist film 60. Since the lower surface 4d of the element body 4 is contacted with the installation stand 62, the conductive metal films 5 are not formed on the lower surface 4d. The resist film 60 and the conductive metal films 5 may be formed before the green laminated body is cut.

Figure 10B:
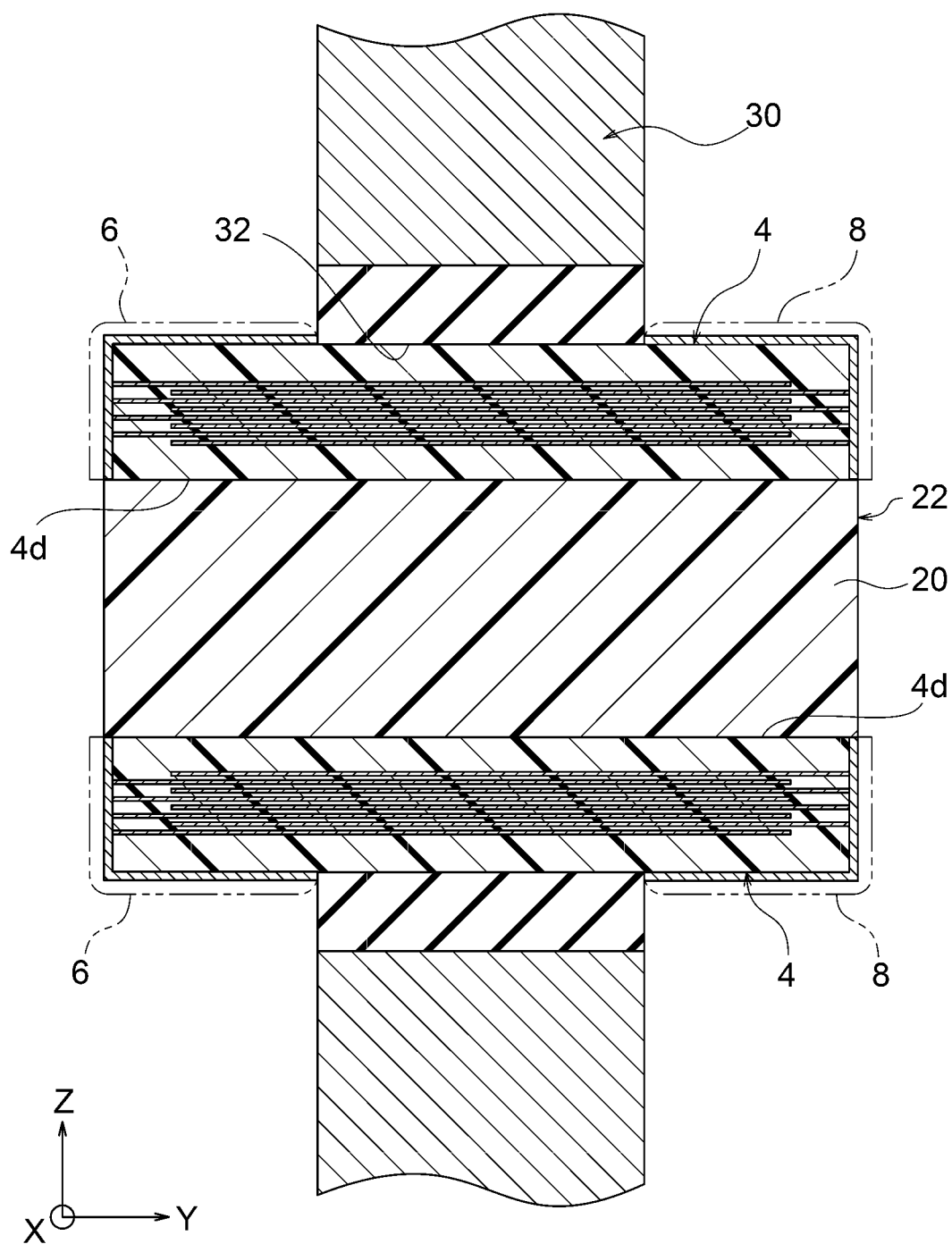
FIG. 10B is a cross-sectional view of a main part of the multilayer ceramic capacitor shown in FIG. 7A illustrating the next manufacturing step of FIG. 10A.
Figure 11:
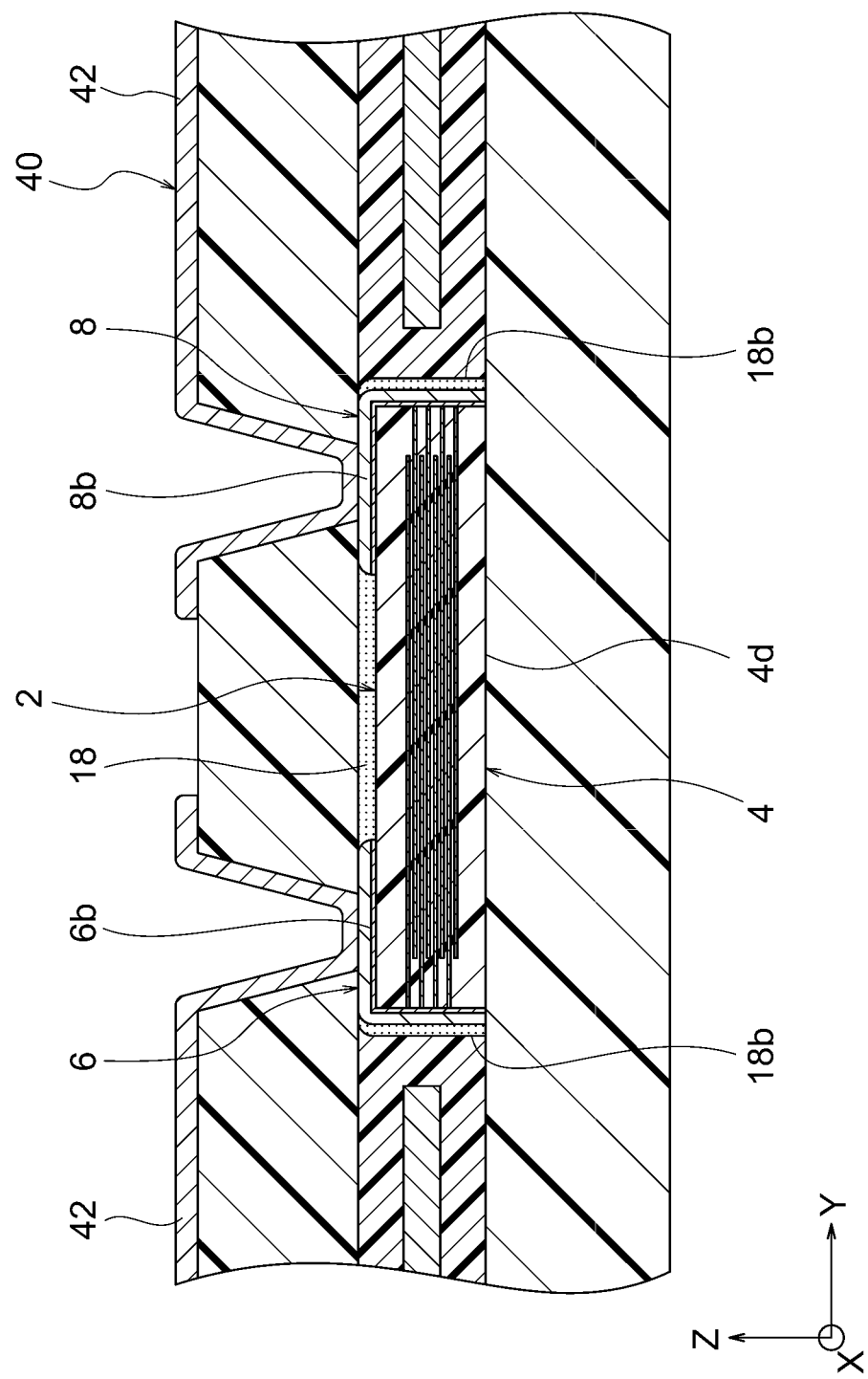
FIG. 11 is a cross-sectional view of a main part of the multilayer ceramic capacitor shown in FIG. 7A illustrating a use example thereof.

Next, the resist film 60 is removed, and the terminal electrodes 6 and 8 are formed by applying a paste for terminal electrodes onto both end surfaces of the element body 4 in the Y-axis direction (the surfaces of the conductive metal films 5) with the pair of conductive metal films 5 and firing it. For example, as shown in FIG. 10B, when the terminal electrodes 6 and 8 are formed, a dummy block 20 is temporarily attached between the lower surfaces 4d and 4d of two element bodies 4 and 4, and these are initially integrated to form a work 22.

Since the two or more element bodies 4 and 4 are combined, the work 22 has a thickness that is sufficiently easily handled even if the element bodies 4 and 4 are thin in the Z-axis direction, and the terminal electrodes 6 and 8 can be formed as before by attaching the work 22 into a through hole 32 of a holding plate 30.

After the terminal electrodes 6 and 8 are formed, the dummy block 20 is removed to divide the two element bodies 4 and 4, and the multi-layer ceramic electronic device 2 shown in FIG. 7A is thereby obtained. In the multi-layer ceramic electronic device 2 shown in FIG. 7A, the terminal electrodes 6 and 8 are not substantially formed on the lower surface 4d of the element body 4, and the lower surface 4d of the element body 4 is entirely exposed outside.

Next, the end cover layers 18b and 18b are formed on the exterior surfaces of the end electrode parts 6a and 8a of the terminal electrodes 6 and 8, and the upper-surface cover layer 18 is formed on the upper surface 4c of the element body 4 perpendicular to the Z-axis.

Next, the surfaces of the upper electrode parts 6b and 8b, the surface of the upper-surface cover layer 18, and the ends of the end cover layers 18b in the Z-axis direction are polished to be flush with each other. Incidentally, when a plating film is formed on the surfaces of the upper electrode parts 6b and 8b, the surfaces of the plating film and the upper-surface cover layer 18 may be polished to be flush with each other.

In the multilayer ceramic capacitor 2 according to the present embodiment, the conductive metal films 5 are formed in interfaces between the element body 4 and the terminal electrodes 6 and 8. This structure makes it possible to increase the adhesion between the terminal electrodes 6 and 8 and the element body 4. It is thereby possible to achieve improvement in the adhesion between the element body 4 and the terminal electrodes 6 and 8 and to strengthen the humidity resistance.

Eighth Embodiment

Except for the following matters, as shown in FIG. 8A2, a multilayer ceramic capacitor 2 according to the present embodiment is similar to the multilayer ceramic capacitor 2 according to Seventh Embodiment. The multilayer ceramic capacitor 2 according to the present embodiment includes lateral cover layers 18a continuing to the upper-surface cover layer 18 according to Seventh Embodiment and formed on the lateral surfaces 4e of the element body 4 facing each other in the X-axis direction. This structure further strengthens the multilayer ceramic capacitor 2 according to the present embodiment. The lateral cover layers 18a of the present embodiment are similar to the lateral cover layers 18a of Second Embodiment.

Ninth Embodiment

Figure 7B:
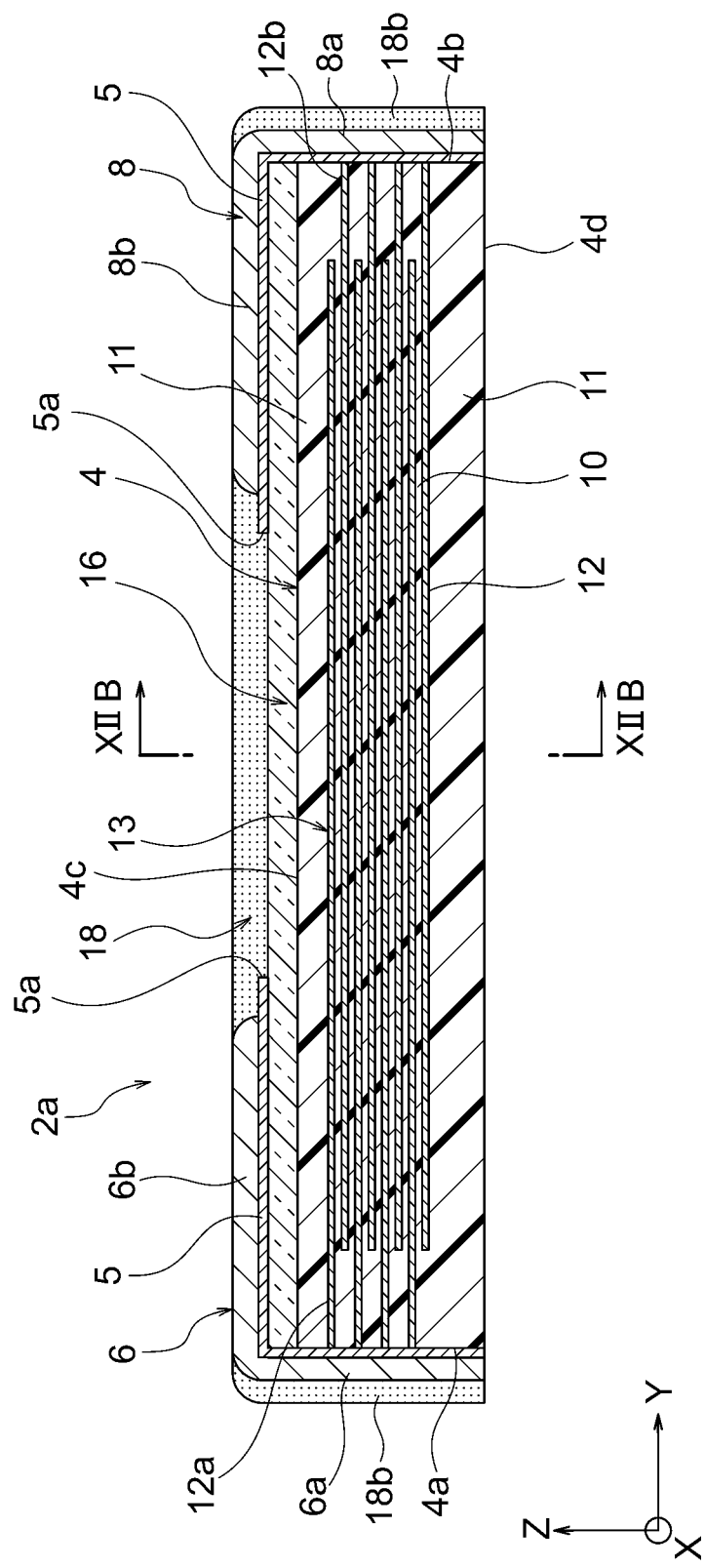
FIG. 7B is a longitudinal cross-sectional view of a multilayer ceramic capacitor according to another embodiment of the present invention.

Except for the following matters, as shown in FIG. 7B and FIG. 8B, a multilayer ceramic capacitor 2a according to the present embodiment is similar to the multilayer ceramic capacitor 2 according to Seventh Embodiment. In the multilayer ceramic capacitor 2a according to the present embodiment, an upper-surface reinforcement layer 16, which is stronger than the inner dielectric layers 10, is formed on the upper surface 4c of the element body 4. The upper-surface reinforcement layer 16 according to the present embodiment is similar to the upper-surface reinforcement layer 16 according to Third Embodiment.

Tenth Embodiment

Except for the following matters, as shown in FIG. 8C, a multilayer ceramic capacitor 2b according to the present embodiment is similar to the multilayer ceramic capacitor 2a according to Eighth Embodiment. The multilayer ceramic capacitor 2b includes lateral reinforcement layers 16a continuing to the upper-surface reinforcement layer 16 according to Eighth Embodiment and formed on the lateral surfaces 4e of the element body 4 facing each other in the X-axis direction. This structure further strengthens the multilayer ceramic capacitor 2b. The lateral reinforcement layers 16a according to the present embodiment are similar to the lateral reinforcement layers 16a of Fourth Embodiment.

Eleventh Embodiment

Figure 7C:
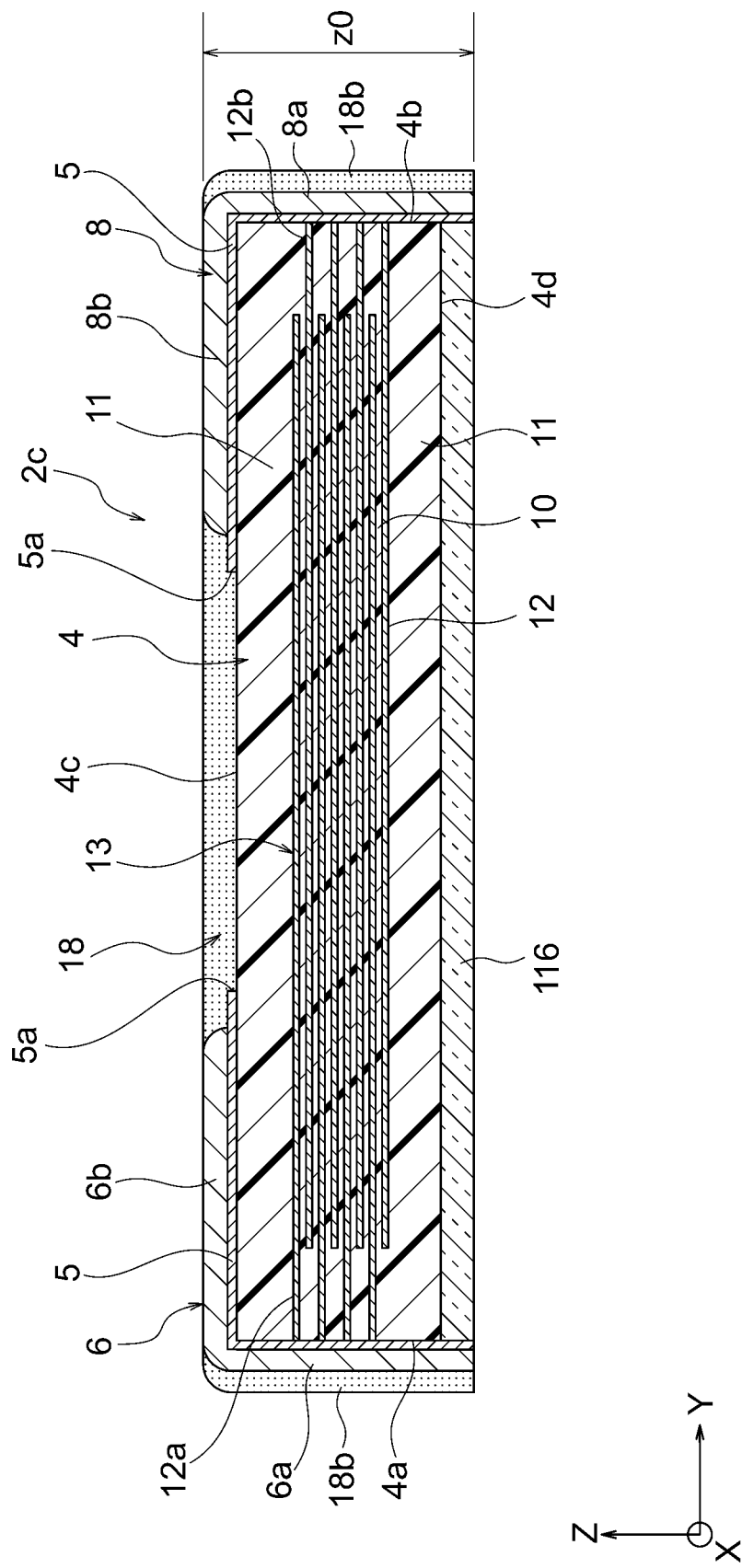
FIG. 7C is a longitudinal cross-sectional view of a multilayer ceramic capacitor according to further another embodiment of the present invention.
Figure 9:
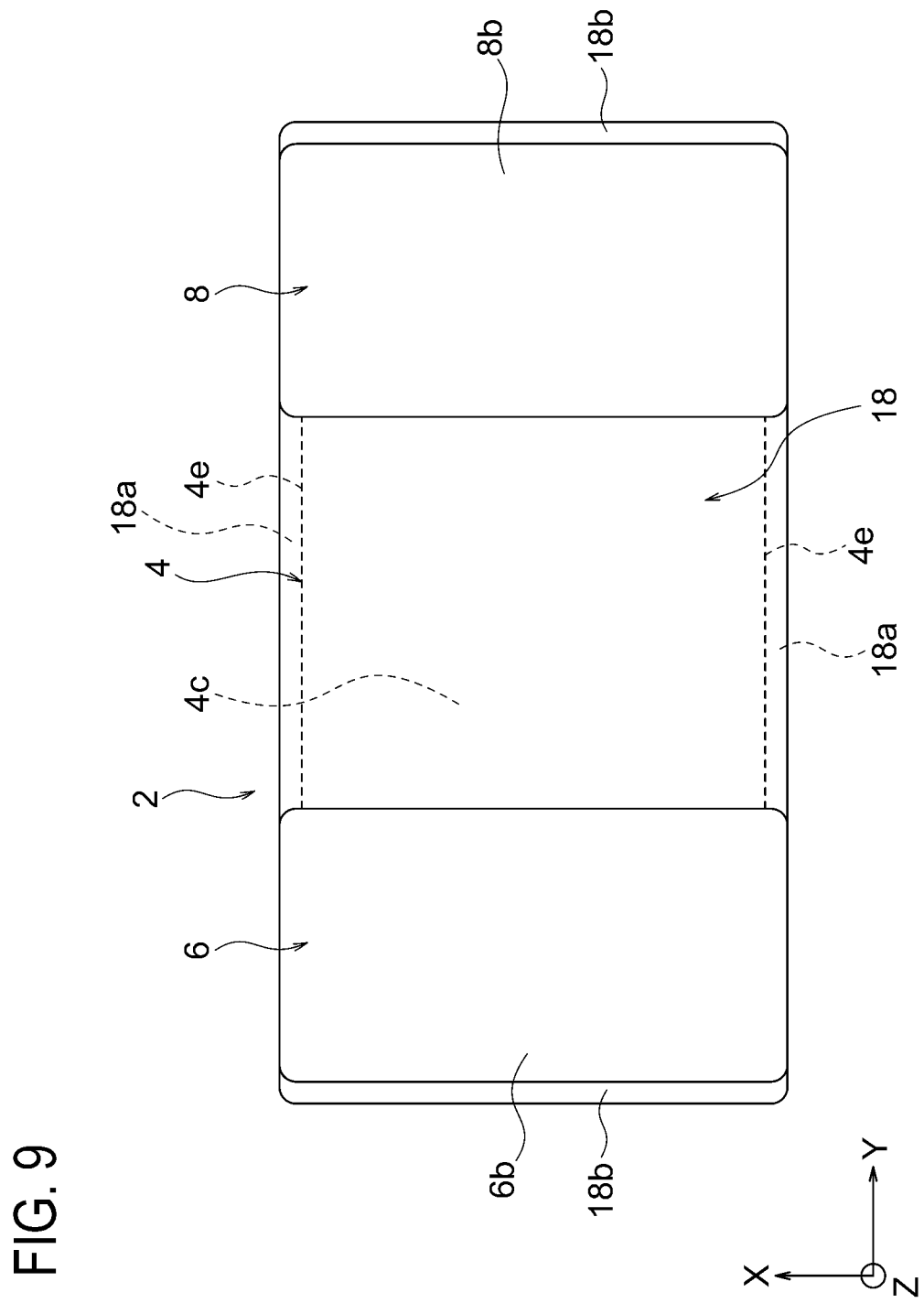
FIG. 9 is a plane view of the multilayer ceramic capacitor shown in FIG. 7A.

Except for the following matters, as shown in FIG. 7C, a multilayer ceramic capacitor 2c according to the present embodiment is similar to the multilayer ceramic capacitor 2a according to the embodiment shown in FIG. 7B. In the multilayer ceramic capacitor 2c, a reinforcement layer 116 similar to the upper-surface reinforcement layer 16 formed on the upper surface 4c of the element body 4 shown in FIG. 7B is formed on the lower surface 4d of the element body 4.

The reinforcement layer 116 covering the lower surface 4d is formed by any method and is formed by, for example, applying the paste for the reinforcement layer onto the lower surface 4d of the element body 4 and firing it. After that, the conductive metal films 5 and the terminal electrodes 6 and 8 are formed. Instead, the reinforcement layer 116 covering the lower surface 4d may be formed by applying the paste for the reinforcement layer onto the lower surface 4d of the element body 4 with the conductive metal films 5 and the terminal electrodes 6 and 8 and firing it. After the firing, the exterior surface of the reinforcement layer 116 covering the lower surface 4d may be polished to be flat. Other configurations and effects are similar to those of the above-mentioned embodiments.

Twelfth Embodiment

Figure 13A:
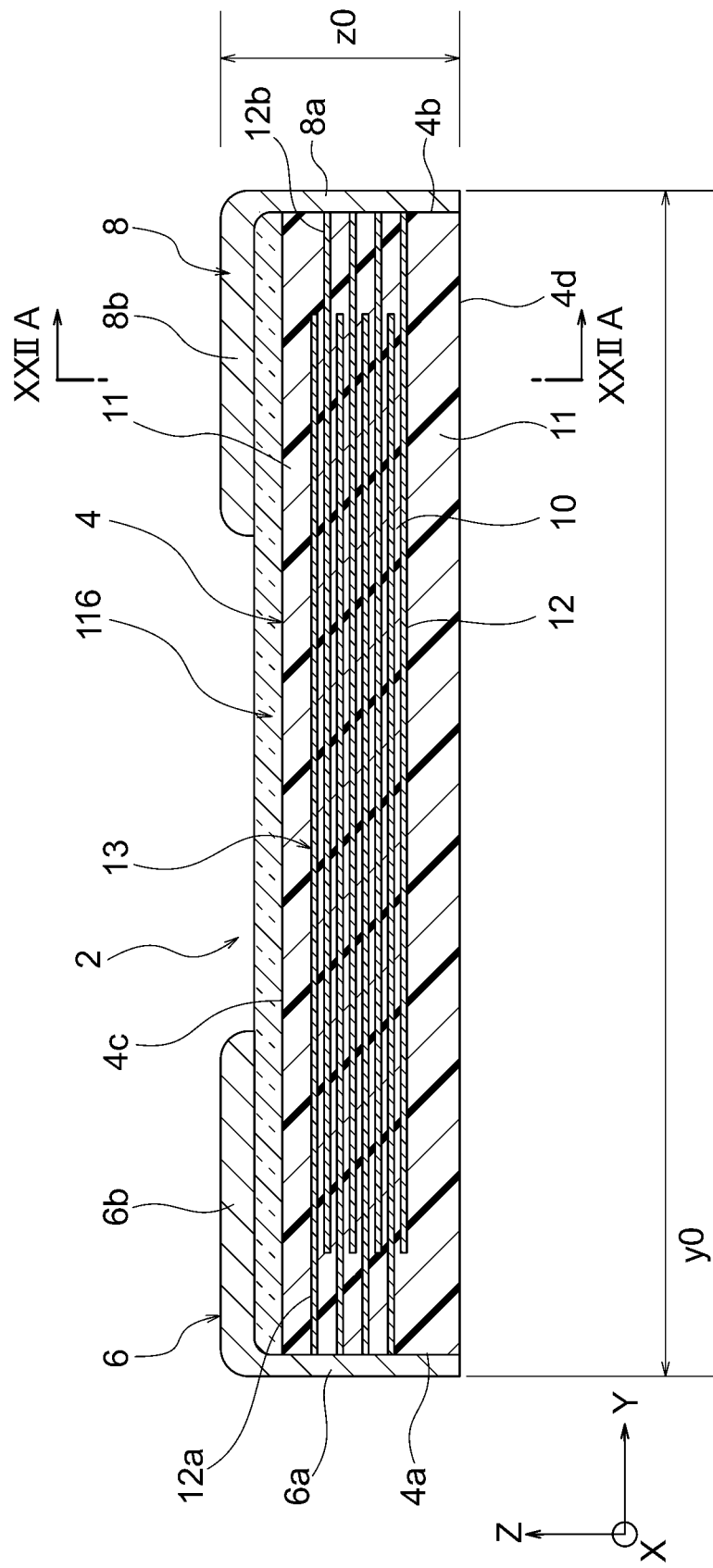
FIG. 13A is a longitudinal cross-sectional view of a multilayer ceramic capacitor according to an embodiment of the present invention.

Except for the following matters, as shown in FIG. 13A, a multilayer ceramic capacitor 2 according to the present embodiment is similar to the multilayer ceramic capacitor 2 according to First Embodiment.

As shown in FIG. 13A, the multilayer ceramic capacitor 2 according to the present embodiment includes a reinforcement layer 116 continuously covering the upper surface 4c of the element body 4 from the lateral surfaces 4e and 4e of the element body 4 facing each other in the X-axis direction. This makes it possible to improve the bending strength of the element body 4 and to prevent the multilayer ceramic capacitor 2 from being broken.

FIG. 14A is a cross-sectional view along the IIA-IIA line of FIG. 13A. As shown in FIG. 14A, the reinforcement layer 116 covering the lateral surfaces 4e and 4e of the element body 4 may be contacted with the ends of the internal electrode layers 12 in the X-axis direction.

After the element body 4 is formed and before the terminal electrodes 6 and 8 are formed, the reinforcement layer 116 covering the upper surface 4c and the reinforcement layer 116 covering the lateral surfaces 4e and 4e are formed on the upper surface 4c and the lateral surfaces 4e and 4e of the element body 4.

The reinforcement layer 116 according to the present embodiment contains a filler and a substrate.

In the present embodiment, the filler of the reinforcement layer 116 has a needle-like shape, a column-like shape, or a plate-like shape. In the present embodiment, the filler preferably has a needle-like shape. This allows the reinforcement layer 116 to be stronger.

In the present embodiment, the filler has any particle size in the minor axis. In the present embodiment, the filler preferably has a particle size in the minor axis of 0.1 μm or larger and 3.0 μm or smaller.

In the present embodiment, when the filler has a particle size in the minor axis within the above range, the multilayer ceramic capacitor 2 according to the present embodiment can have a high bending strength. In addition, it is possible to increase the adhesion between the reinforcement layer 116 covering the upper surface 4c and the upper electrode parts 6b and 8b and is thereby possible to increase humidity resistance of the multilayer ceramic capacitor 2. In the present embodiment, it is more preferred that the filler has a particle size in the minor axis of 0.5 μm or larger and 3.0 μm or smaller.

In the present embodiment, the filler has any particle size in the major axis. In the present embodiment, however, the filler preferably has a particle size in the major axis of 0.5 μm or larger and 15.0 μm or smaller.

In the present embodiment, when the filler has a particle size in the major axis within the above range, the multilayer ceramic capacitor 2 can have a high bending strength. In addition, it is possible to increase the adhesion between the reinforcement layer 116 covering the upper surface 4c and the upper electrode parts 6b and 8b and is thereby possible to increase humidity resistance of the multilayer ceramic capacitor 2.

In the present embodiment, it is more preferred that the filler has a particle size in the major axis of 3.0 μm or larger and 15.0 μm or smaller.

In the present embodiment, the filler has any aspect ratio, which is represented by (a particle size in the minor axis/a particle size in the major axis). In the present embodiment, the filler preferably has an aspect ratio of 0.7% or more and 60% or less.

In the present embodiment, when the filler has an aspect ratio within the above range, the multilayer ceramic capacitor 2 can have a high bending strength. In addition, it is possible to increase the adhesion between the reinforcement layer 116 covering the upper surface 4c and the upper electrode parts 6b and 8b and is thereby possible to increase humidity resistance of the multilayer ceramic capacitor 2. In the present embodiment, it is more preferred that the filler has an aspect ratio of 0.7% or more and 30% or less.

In the present embodiment, the filler has the above-mentioned shape and size by any method. For example, there is a mixing-type method in which the filler previously having the above-mentioned shape and size is added to a paste for the reinforcement layer 116. In addition, when the filler is a glass, there is a depositing-type method in which a paste for the reinforcement layer 116 contains a predetermined glass raw material and is fired by configuring at a firing temperature or a firing time within a predetermined range.

In the present embodiment, it is preferred that the filler has the above-mentioned shape and size by the depositing-type method. In the present embodiment, it is preferred that the firing temperature of the depositing-type method is higher than a softening point of the "glass contained in the reinforcement layer 116" mentioned below by 50° C. or higher. When the firing temperature is high, the glass tends to be sintered densely. In the present embodiment, it is more preferred that the firing temperature of the depositing-type method is higher than a softening point of the "glass contained in the reinforcement layer 116" mentioned below by 50° C. to 80° C.

In the present embodiment, it is preferred that the firing time of the depositing-type method is 0.1 hours to 2 hours. When the firing time is long, the glass tends to be sintered densely. In the present embodiment, the firing time of the depositing-type method is preferably 0.1 hours to 1 hour.

In the present embodiment, the amount of the filler in the reinforcement layer 116 is not limited, but is preferably 30 vol % or larger and 80 vol % or smaller, more preferably 45 vol % or larger and 80 vol % or smaller.

In the present embodiment, when the amount of the filler in the reinforcement layer 116 is within the above range, the multilayer ceramic capacitor 2 can have a high bending strength. In addition, it is possible to increase the adhesion between the reinforcement layer 116 covering the upper surface 4c and the upper electrode parts 6b and 8b and is thereby possible to increase humidity resistance of the multilayer ceramic capacitor 2. In the present embodiment, it is still more preferred that the amount of the filler in the reinforcement layer 116 is 55 vol % or larger and 80 vol % or smaller.

In the present embodiment, the filler constituting the reinforcement layer 116 is made of any material, but is preferably made of glass or alumina. This makes it possible to increase the bending strength of the multilayer ceramic capacitor 2. In addition, it is possible to increase the adhesion between the reinforcement layer 116 covering the upper surface 4c and the upper electrode parts 6b and 8b and is thereby possible to increase humidity resistance of the multilayer ceramic capacitor 2.

In the present embodiment, the filler is preferably made of a glass whose main component is at least one of Si and Al. Incidentally, the main component is a component contained in the glass by 30 mass % to 70 mass %. In the present embodiment, it is more preferred that the filler is made of a glass whose main component is Si and Al.

In the present embodiment, the filler is preferably made of a glass whose sub-component is alkali metal, alkaline earth metal, transition metal, and boron.

When the filler is made of a glass whose sub-component is one or more of alkali metal, alkaline earth metal, transition metal, and boron, the upper electrode parts 6b and 8b are easily formed by plating on a part of the surface of the reinforcement layer 116 covering the upper surface 4c.

In the present embodiment, the alkali metal contained as a sub-component of the glass (the material of the filler) is not limited and is Li, Na, K, etc.

In the present embodiment, the alkaline earth metal contained as a sub-component of the glass (the material of the filler) is Ba, Ca, Sr, etc.

In the present embodiment, the substrate constituting the reinforcement layer 116 is made of any material, but is preferably made of at least one of glass and resin (more preferably, glass).

For example, when the substrate contains glass and resin, it is preferred that the reinforcement layer 116 contains 10 parts by weight to 40 parts by weight of resin to 100 parts by weight of glass.

In the present embodiment, it is more preferred that the reinforcement layer 116 contains 15 parts by weight to 30 parts by weight of resin to 100 parts by weight of glass.

In the present embodiment, the reinforcement layer 116 is formed by the paste for the reinforcement layer, and the paste for the reinforcement layer contains a resin whose main component is ethyl cellulose or so for viscosity. When the substrate contains glass and a debinding treatment is carried out during manufacturing, the resin whose main component is ethyl cellulose or so in the paste for the reinforcement layer is burned down and is not thereby contained upon product completion.

In the present embodiment, it is more preferred that the substrate is made of a glass whose main component is at least one of Si and Al. Incidentally, the main component is a component contained in the glass by 30 mass % to 70 mass %. In the present embodiment, it is more preferred that the substrate is made of a glass whose main component is Si and Al.

In the present embodiment, the substrate is preferably made of a glass whose sub-component is alkali metal, alkaline earth metal, transition metal, and boron.

In the present embodiment, the alkali metal contained as a sub-component of the glass (the material of the substrate) is not limited and is Li, Na, K, etc.

In the present embodiment, the alkaline earth metal contained as a sub-component of the glass (the material of the substrate) is Ba, Ca, Sr, etc.

In the present embodiment, the substrate is made of any resin, but is preferably made of polyimide resin or epoxy resin (more preferably, polyimide resin). In the present embodiment, the resin (the material of the substrate) may be one kind or two or more kinds.

In the present embodiment, when both the filler and the substrate of the reinforcement layer 116 are glass, when only the filler of the reinforcement layer 116 is glass, or when only the substrate of the reinforcement layer 116 is glass, each glass has any composition, but preferably has the following compositions. Hereinafter, the glasses are referred to as a "glass contained in the reinforcement layer 116" together. Incidentally, when both the filler and the substrate of the reinforcement layer 116 are glass, the composition of the glass is an entire composition of the filler and the substrate in which elements contained in the filler and elements contained in the substrate are summed up.

The glass contained in the reinforcement layer 116 according to the present embodiment is similar to the glass component constituting the upper-surface reinforcement layer 16 according to Third Embodiment.

Incidentally, when the glass contained in the reinforcement layer 116 according to the present embodiment contains alkali metal, transition metal, and boron, the glass can have a lower softening point, and it becomes easier to deposit the filler constituting the reinforcement layer 116.

Preferably, the transition metals used for the reinforcement layer 116 according to the present embodiment is V or Zn. This makes it easier to form the upper electrode parts 6b and 8b by plating and to deposit the filler constituting the reinforcement layer 116.

Incidentally, the composition of the glass contained in the reinforcement layer 116 according to the present embodiment may be the same as or different from that of the glass constituting the upper-surface cover layer 18 or the end cover layers 18b mentioned below.

When the glass contained in the reinforcement layer 116 according to the present embodiment has the above-mentioned structure, a predetermined filler can be deposited. As a result, the reinforcement layer 116 becomes stronger than the inner dielectric layers 10. Thus, the multilayer ceramic capacitor 2 according to the present embodiment has a further improved bending strength. Since the multilayer ceramic capacitor 2 according to the present embodiment is strengthened, even if the element body 4 is thinned, it easily has a large length y0 in the longitudinal direction (see FIG. 13A) or a large width x0 (see FIG. 14A), a facing area between the internal electrode layers 12 in the element body 4 is large, and characteristics (e.g., capacitance) of the multilayer ceramic capacitor 2 according to the present embodiment are further improved.

From the above point of view, the reinforcement layer 116 has a relative thickness of preferably 20 to 133% (more preferably 50 to 100%), which is obtained from the formula of (an average thickness of the reinforcement layer 116/an average thickness of the upper electrode parts 6b and 8b)×100.

Next, specifically explained is a method of manufacturing the multi-layer ceramic capacitor 2 as an embodiment of the present invention.

Figure 16:
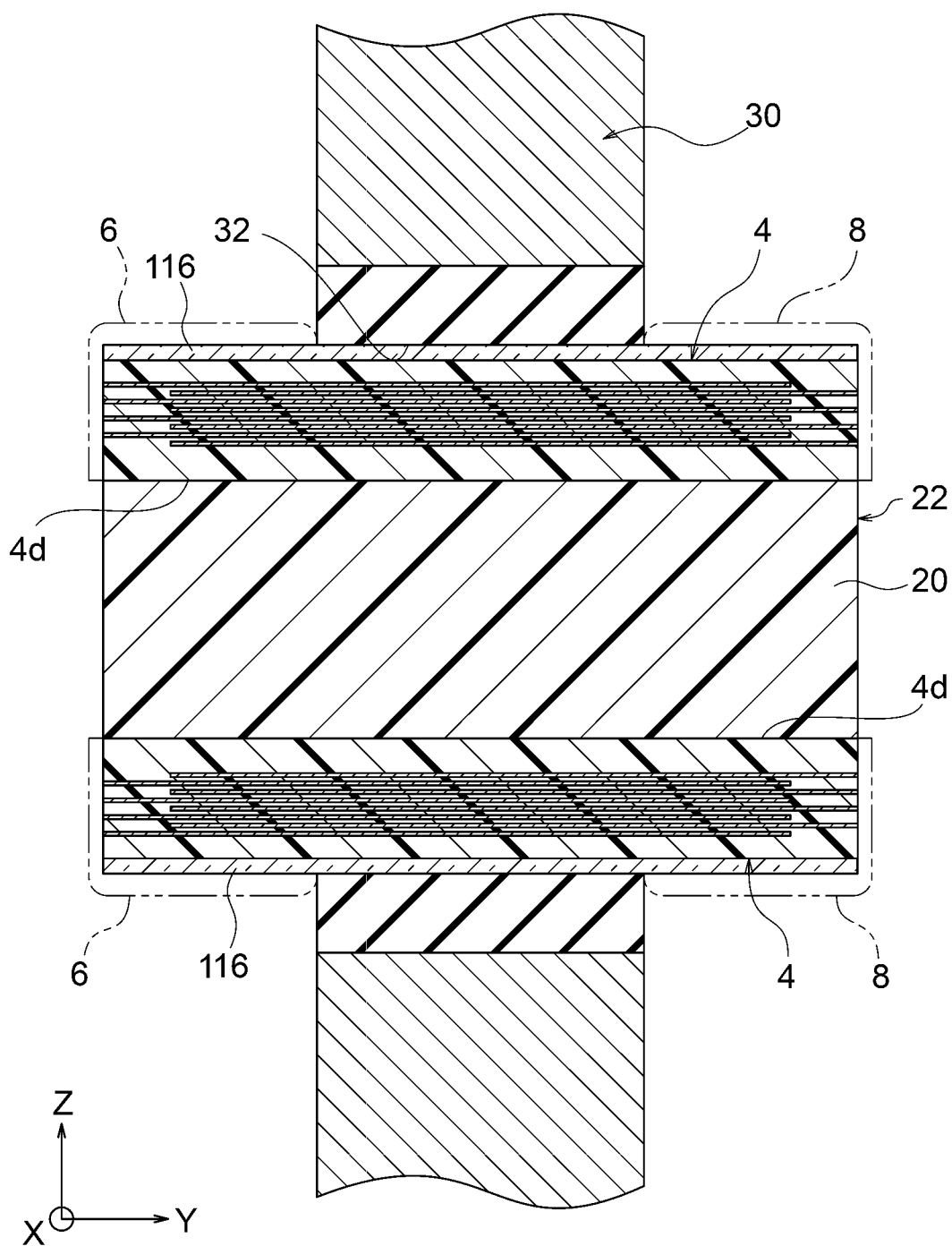
FIG. 16 is a cross-sectional view of a main part of the multilayer ceramic capacitor shown in FIG. 13A illustrating a manufacturing step thereof.
Figure 17:
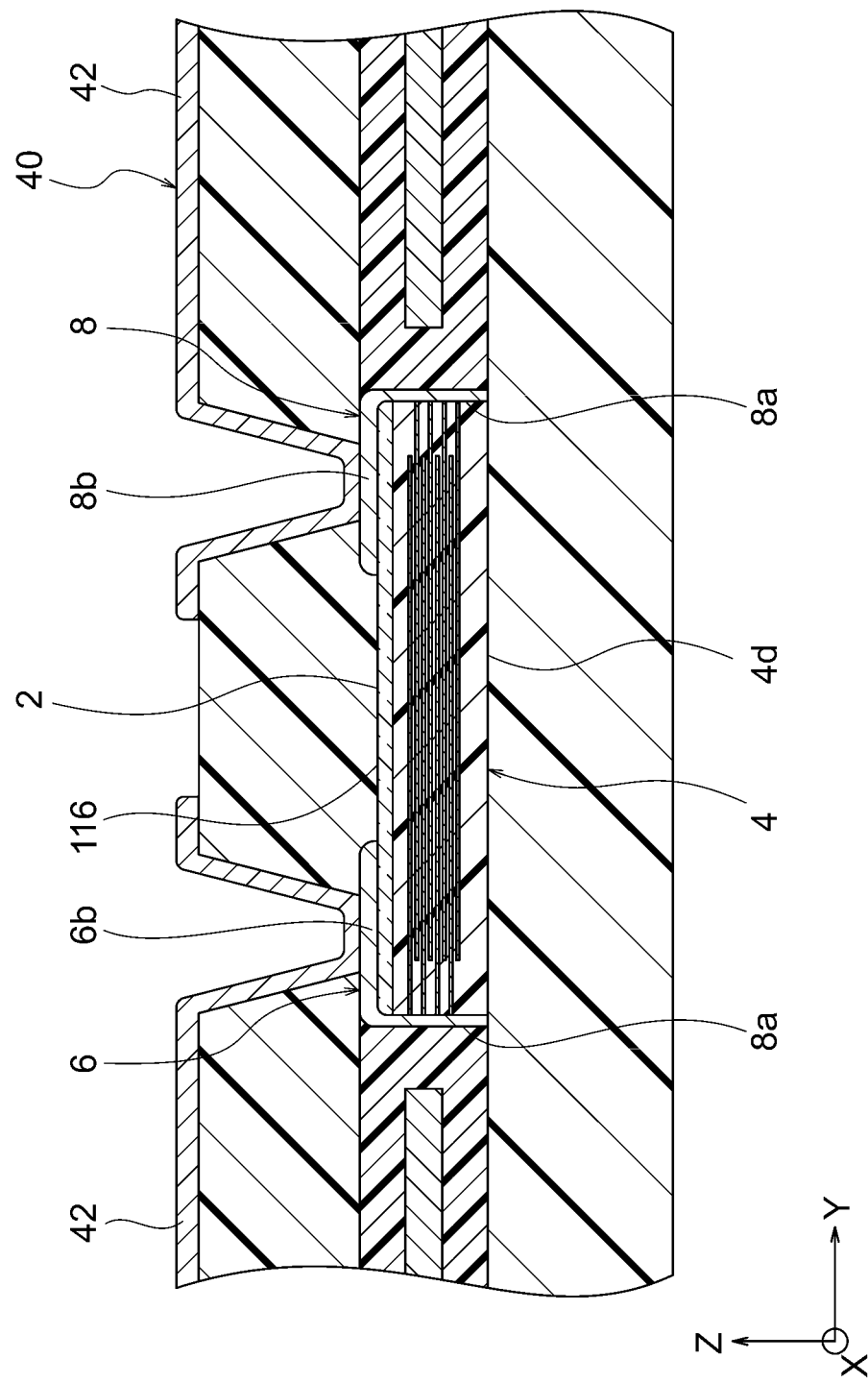
FIG. 17 is a cross-sectional view of a main part of the multilayer ceramic capacitor shown in FIG. 13A illustrating a use example thereof.

The element body 4 is initially obtained in a similar manner to First Embodiment. Next, for example, as shown in FIG. 16, a dummy block 20 is temporarily attached between the lower surfaces 4d and 4d of two element bodies 4 and 4, and these are initially integrated to form a work 22. At the time of forming the work 22, the paste for the reinforcement layers is applied onto the lateral surfaces 4e to the upper surface 4c of the element body 4 and is fired to form the reinforcement layers 116.

When the filler is glass and the substrate is glass, the paste for the reinforcement layers is obtained by, for example, kneading the glass raw material containing the above-mentioned component constituting the reinforcement layers 116, a binder whose main component is ethyl cellulose, and terpineol and acetone (dispersion media) using a mixer.

When the filler is glass and the substrate is resin, the paste for the reinforcement layers is obtained by, for example, kneading the glass containing the component constituting the filler, a predetermined resin, and terpineol and acetone (dispersion media) using a mixer.

The paste for the reinforcement layers is applied to the element body 4 by any method, such as dipping, printing, coating, vapor deposition, and spraying. In the present embodiment, the paste for the reinforcement layers is preferably applied to the element body 4 in a multilayer manner. Specifically, one layer of the paste for the reinforcement layers is applied and dried, and the paste for the reinforcement layers is further applied thereonto and dried. This step is repeated. Preferably, two layers to 10 layers of the paste for the reinforcement layers are laminated. This makes it possible to increase the density of the reinforcement layers 116 and to reduce the number of holes (voids) in the reinforcement layers 116. As a result, the reinforcement layers 116 can be stronger.

In the reinforcement layers 116 obtained in the above-mentioned manner, the adhesion between the reinforcement layer 116 covering the upper surface 4c and the upper electrode parts 6b and 8b is high, and the humidity resistance from the upper surface 4c is excellent.

In the present embodiment, the element bodies 4 applied with the paste for the reinforcement layers are fired with any conditions and is fired, for example, in a humidified $N_2$ or dry $N_2$ atmosphere.

In the present embodiment, when the filler is glass, the filler having a needle-like shape, a column-like shape, or a plate-like shape can be obtained by firing at a temperature that is higher than a softening point of the glass constituting the filler by 50° C. or higher. In the present embodiment, the firing is preferably carried out at a temperature that is higher than a softening point of the glass constituting the filler by 50° C. to 80° C.

Specifically, the glass constituting the filler preferably has a softening point of 600° C. to 850° C., the firing temperature is preferably 650° C. to 930° C., and the firing time is preferably 0.1 hours to 2 hours.

Next, the work 22 is attached into the through hole 32 of the holding plate 30 to form the terminal electrodes 6 and 8.

After the terminal electrodes 6 and 8 are formed, the dummy block 20 is removed to divide the two element bodies 4 and 4, and the multi-layer ceramic electronic device 2 shown in FIG. 13A is thereby obtained. In the multi-layer ceramic electronic device 2 shown in FIG. 13A, the terminal electrodes 6 and 8 are not substantially formed on the lower surfaces 4d of the element bodies 4.

Thirteenth Embodiment

Figure 13B:
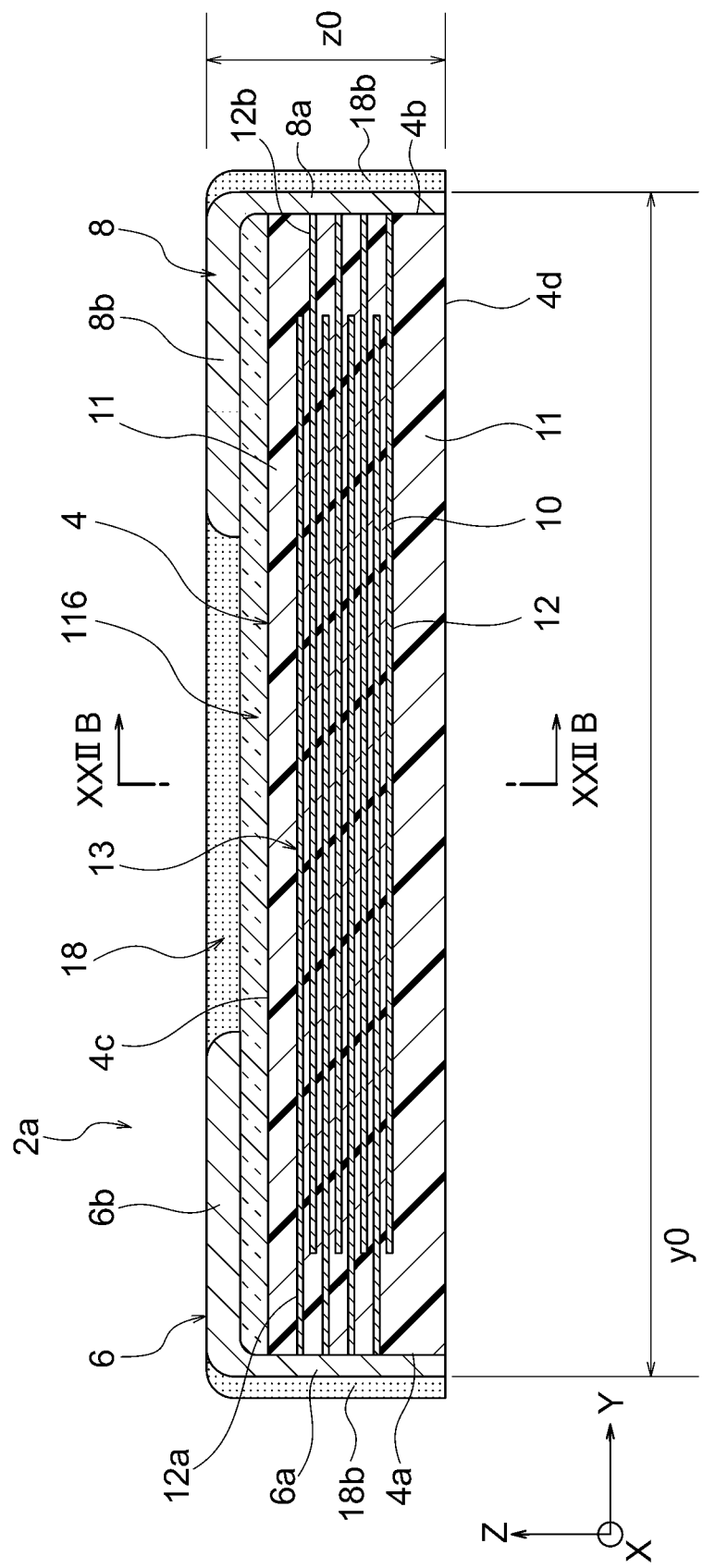
FIG. 13B is a longitudinal cross-sectional view of a multilayer ceramic capacitor according to another embodiment of the present invention.

Except for the following matters, as shown in FIG. 13B, a multilayer ceramic capacitor 2a according to the present embodiment is similar to the multilayer ceramic capacitor 2 according to Twelfth Embodiment. In the present embodiment, the upper-surface cover layer 18 covering the upper surface 4c of the element body 4 located between the pair of upper electrode parts 6b and 8b is formed to be substantially flush with the upper electrode parts 6b and 8b. The upper-surface cover layer 18 according to the present embodiment is similar to the upper-surface cover layer 18 according to the First Embodiment.

In the present embodiment, the exterior surface of the end electrode part 6a (8a) is covered with an end cover layer 18b (18b). The end cover layer 18b (18b) according to the present embodiment is similar to the end cover layer 18b (18b) according to First Embodiment.

Fourteenth Embodiment

Figure 13C:
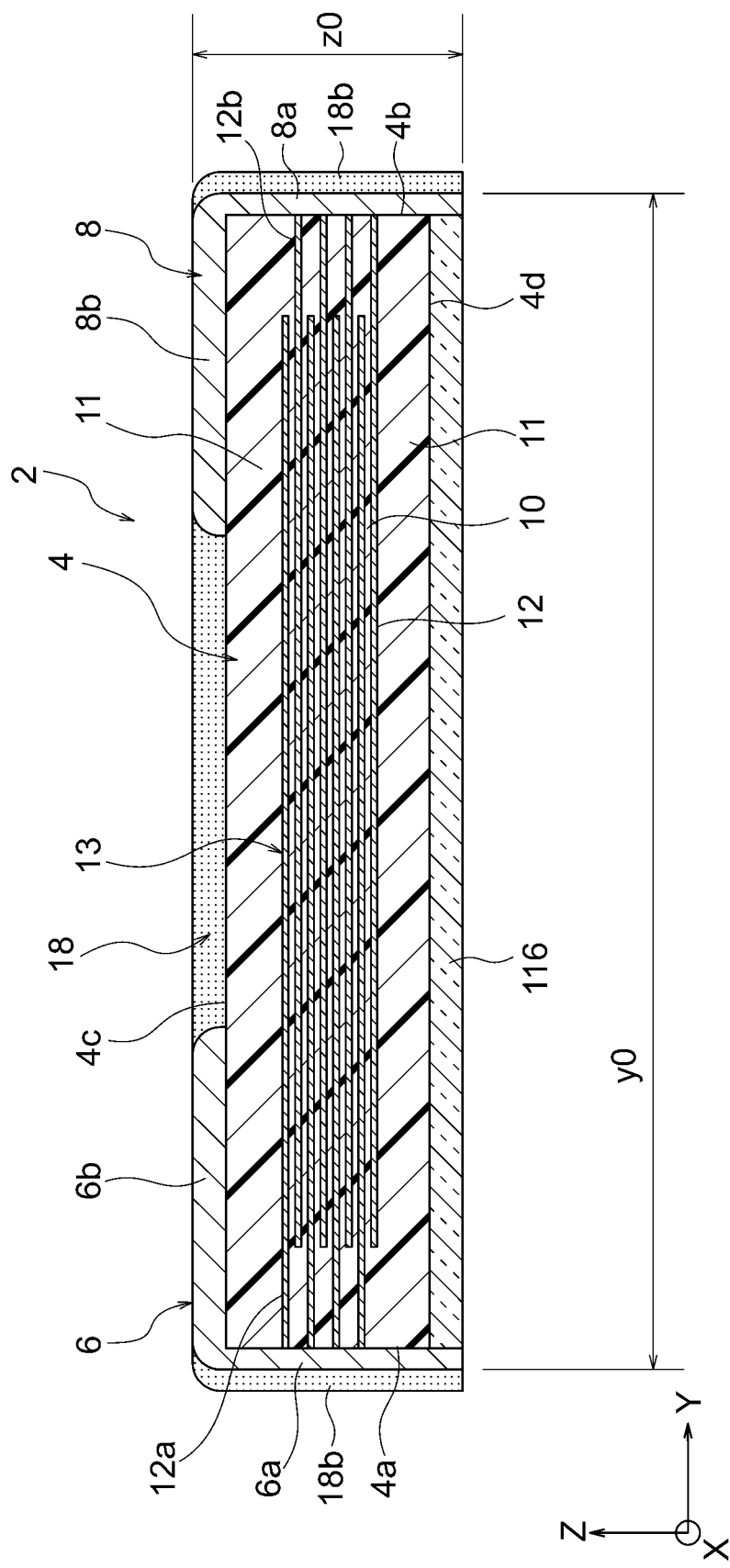
FIG. 13C is a longitudinal cross-sectional view of a multilayer ceramic capacitor according to further another embodiment of the present invention.
Figure 15:
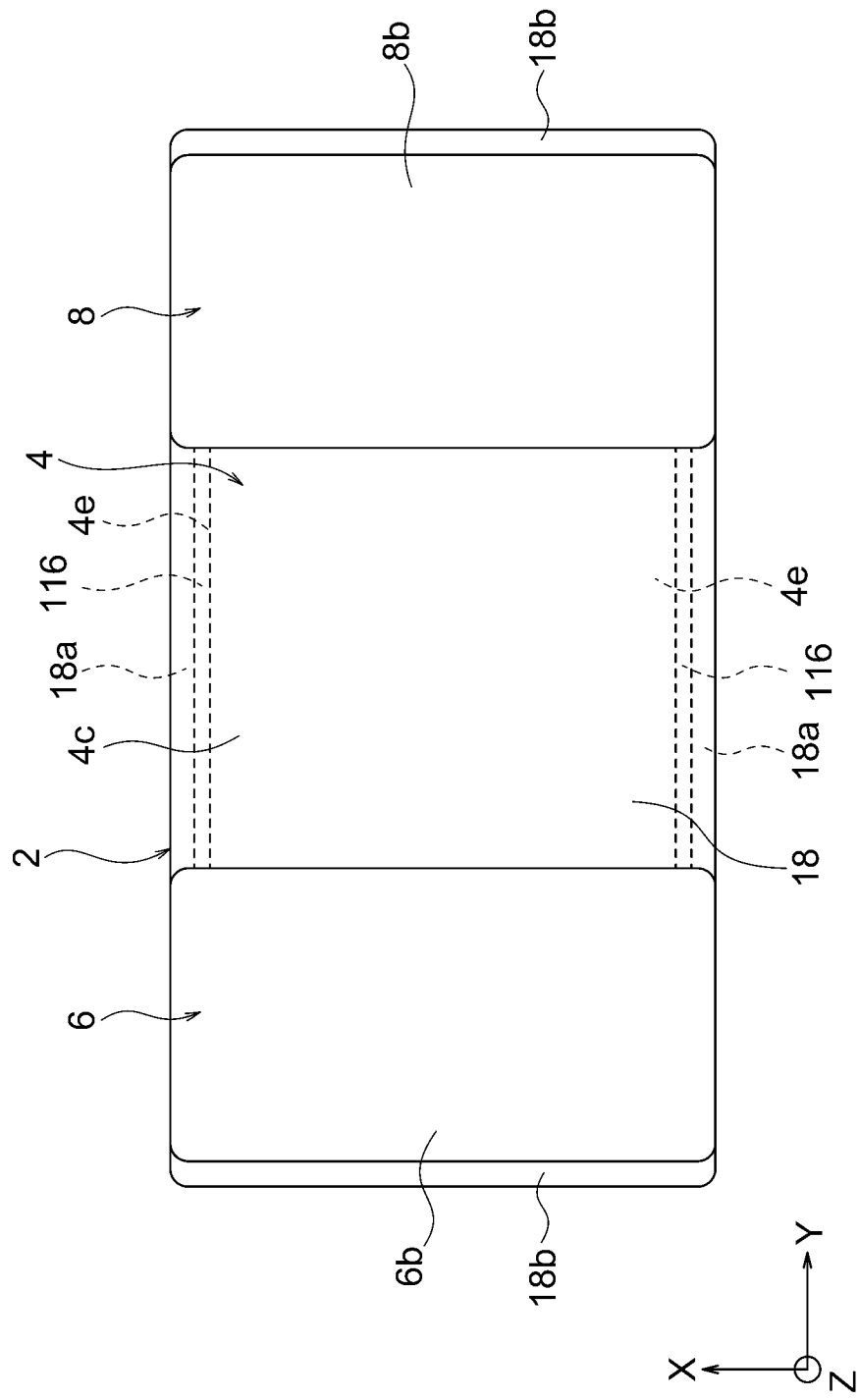
FIG. 15 is a plane view of the multilayer ceramic capacitor shown in FIG. 13A.

Except for the following matters, as shown in FIG. 13C, a multilayer ceramic capacitor 2b according to the present embodiment is similar to the multilayer ceramic capacitor 2a according to Thirteenth Embodiment. In the present embodiment, the entire lower surface 4d of the element body 4 is covered with the reinforcement layer 116.

Here, the "entire lower surface 4d" means that the lower surface 4d is substantially entirely covered, but that there may be a part that is not slightly covered. For example, the reinforcement layer 116 has a cover rate of 90% to 100%, which is obtained from the formula of (an area of the reinforcement layer 116 covering the lower surface 4d/an area of the lower surface 4d)×100. This makes it possible to increase the bending strength of the multilayer ceramic capacitor 2b even if it is thinned.

In the present embodiment, the reinforcement layer 116 covering the lower surface 4d, the reinforcement layer 116 covering the lateral surface 4e (4e), and the reinforcement layer 116 covering the upper surface 4c may have the same thickness or different thicknesses.

In the present embodiment, the reinforcement layer 116 covering the lower surface 4d has any thickness, but is preferably thinner than the reinforcement layer 116 covering the upper surface 4c. This prevents the multilayer ceramic capacitor 2b from being too large in the Z-axis direction and makes it possible to mount the multi-layer ceramic capacitor 2b without any problem.

In the present embodiment, the surface of the reinforcement layer 116 covering the lower surface 4d is a flat surface. Since the exterior surface of the reinforcement layer 116 covering the lower surface 4d is a flat surface, the multilayer ceramic capacitor 2b is easily embedded into the multilayer substrate 40. When the flat surface (the surface of the reinforcement layer 116 covering the lower surface 4d) is placed on a mount surface, the multilayer ceramic capacitor 2b is tightly mounted on the mount surface and has an improved bending strength.

The reinforcement layer 116 covering the lower surface 4d is formed by any method and is formed by, for example, applying the paste for the reinforcement layer onto the lower surface 4d of the element body 4 and firing it. After that, the terminal electrodes 6 and 8 and the end cover layers 18b and 18b are formed. Instead, the reinforcement layer 116 covering the lower surface 4d may be formed by applying the paste for the reinforcement layer onto the lower surface 4d of the element body 4 with the terminal electrodes 6 and 8 and the end cover layers 18b and 18b and firing it. After the firing, the exterior surface of the reinforcement layer 116 covering the lower surface 4d may be polished to be flat.

Other Embodiments

The present invention is not limited to the above-mentioned embodiments and may variously be changed. Instead, the embodiments may be combined. For example, the upper-surface reinforcement layer 16 shown in FIG. 1B, FIG. 2B, FIG. 2C, FIG. 7B, FIG. 8B, and FIG. 8C, the lateral reinforcement layers 16a shown in FIG. 2C and FIG. 8C, and/or the reinforcement layer 116 shown in FIG. 7C may be the reinforcement layer 116 shown in FIG. 13A to FIG. 18. Specifically, the upper-surface reinforcement layer 16, the lateral reinforcement layers 16a, and/or the reinforcement layer 116 may contain a filler and a substrate, the filler may be made of glass or alumina, and the filler may have a needle-like shape, a column-like shape, or a plate-like shape.

In First Embodiment to Third Embodiment and seventh Embodiment to Ninth Embodiment, the upper-surface cover layer 18 covers the upper surface 4c of the element body 4 located between the pair of upper electrode parts 6b and 8b, but the upper-surface cover layer 18 may not cover the upper surface 4c of the element body 4.

In Twelfth Embodiment to Fourteenth Embodiment, the reinforcement layer 116 may be formed only on the upper surface 4c, only on the lower surface 4d, or only on the lateral surfaces 4e of the element body 4. The reinforcement layer 116 may not be formed on either of the pair of lateral surfaces 4e and 4e or may be formed only on either of the lateral surfaces 4e.

The above description shows a firing method when the filler is glass and the substrate is glass, but a firing method when the filler is alumina is as below.

First, when the filler is alumina and the substrate is glass, the firing method is as below.

A needle-like, column-like, or plate-like alumina is previously contained in a paste for the reinforcement layer together with a glass raw material to be the substrate after firing. Then, the paste for the reinforcement layer is applied onto the element body 4 in the above-mentioned manner.

For example, the element body 4 applied with the paste for the reinforcement layer is fired while being retained at 650° C. to 930° C. for 0.1 hours to 2 hours in a humidified or dry $N_2$ atmosphere.

When the filler is alumina and the substrate is resin, the firing method is as below.

A needle-like, column-like, or plate-like alumina is previously contained in a paste for the reinforcement layer together with a resin to be the substrate after firing. Then, the paste for the reinforcement layer is applied onto the element body 4 in the above-mentioned manner.

For example, the element body 4 applied with the paste for the reinforcement layer is fired while being retained at 250° C. to 450° C. for 0.1 hours to 2 hours in a humidified or dry $N_2$ atmosphere. Hereinbefore, shown is a firing method when the filler is alumina.

When one or more element bodies 4 are arranged and attached instead of the dummy block 20 shown in FIG. 4, FIG. 10B, and FIG. 16, the element bodies 4 are provided with only the end electrode parts 6a and 8a and the lateral electrode parts 6c and 8c. That is, in that case, obtained is a multilayer ceramic capacitor having a terminal electrode where the terminal electrodes 6 and 8 are not substantially formed on either the lower surface 4d or the upper surface 4c of the element body 4. This multi-layer ceramic capacitor 2 has a terminal electrode where the terminal electrodes 6 and 8 are not substantially formed on either the lower surface 4d or the upper surface 4c of the element body 4 and can thereby be thinner.

The cover layers are formed in any order. For example, the end cover layers 18b are formed, and the upper-surface cover layer 18 is formed. Moreover, when the upper-surface cover layer 18 and the lateral cover layers 18a are made of the substantially same material, the upper-surface cover layer 18 and the lateral cover layers 18a may be formed at the same time.

Figure 6:
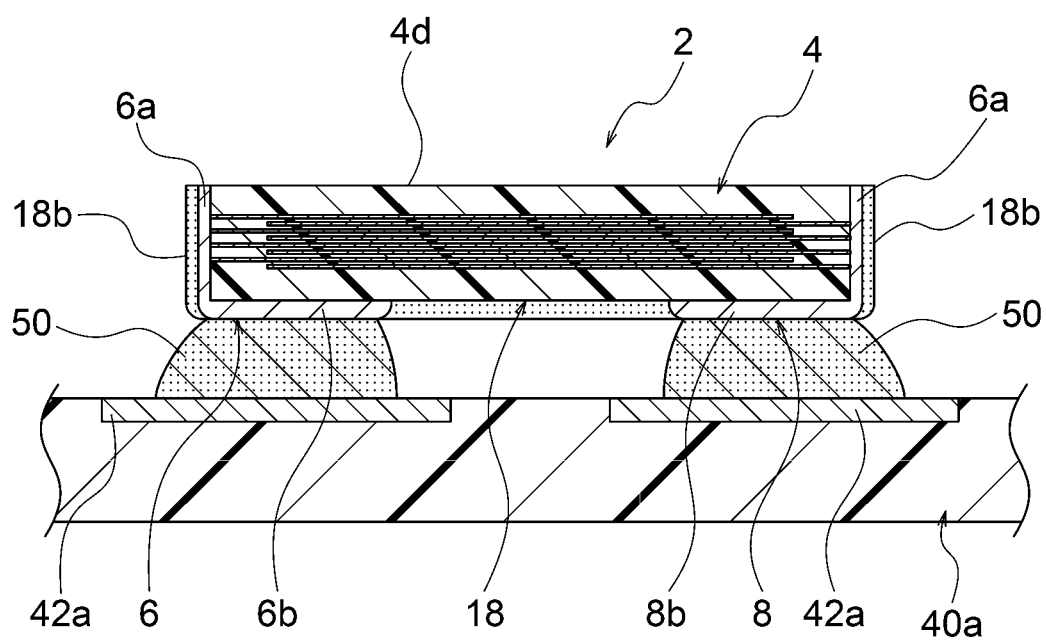
FIG. 6 is a cross-sectional view of a main part of the multilayer ceramic capacitor shown in FIG. 1A illustrating a use example thereof.

Incidentally, the multilayer ceramic capacitor 2 according to the present embodiment may be mounted on a circuit board 40a as shown in FIG. 6, FIG. 12, and FIG. 18 using a solder 50. In this case, the multilayer ceramic capacitor 2 is disposed upside down in the Z-axis direction, and the upper electrode parts 6b and 8b of the terminal electrodes 6 and 8 are directed downward in the figure and are connected to the wiring pattern 42a of the circuit board 40a by the solder 50. Incidentally, the solder 50 has a solder fillet and is also contacted with the end electrode parts 6a and 8a of the terminal electrodes 6 and 8.

In each of the above-mentioned embodiments, the longitudinal direction of the multilayer ceramic capacitor is the Y-axis direction, and the short direction of the multilayer ceramic capacitor is the X-axis direction. However, the longitudinal direction of the multilayer ceramic capacitor may be the X-axis direction, and the short direction of the multilayer ceramic capacitor may be the Y-axis direction. That is, the distance between the two terminal electrodes 6 and 8 facing each other can be smaller than the distance between the two lateral surfaces 4e and 4e facing each other. In this case, the length x0 in the X-axis direction can be three times or larger than the thickness z0 and is preferably 300 μm or larger (more preferably, 400 μm to 1200 μm). The width y0 in the Y-axis direction can be twice or larger than the thickness z0 and is preferably 200 μm or larger (more preferably, 200 μm to 600 μm).

The multi-layer ceramic electronic device of the present invention is not limited to multilayer ceramic capacitors and is applicable to other multi-layer electronic devices. Other multilayer electronic devices are all electronic devices where dielectric layers (insulation layers) are laminated via internal electrodes and are, for example, bandpass filters, inductors, multilayer three-terminal filters, piezoelectric elements, PTC thermistors, NTC thermistors, and varistors.

EXAMPLES

Hereinafter, the present invention is explained based on more detailed examples, but the present invention is not limited to the examples.

[Experiment 1]
Sample No. 1

As described below, a multilayer ceramic capacitor 2 of Sample No. 1 was manufactured.

100 parts by mass of $BaTiO_3$ based ceramic powder, 10 parts by mass of polyvinyl butyral resin, 5 parts by mass of dioctyl phthalate (DOP) as plasticizer, and 100 parts by mass of alcohol as solvent were initially mixed and turned into a paste in a ball mill to obtain a paste for inner green sheets.

Apart from the paste for inner green sheets, 44.6 parts by mass of Ni particles, 52 parts by mass of terpineol, 3 parts by mass of ethyl cellulose, and 0.4 parts by mass of benzotriazole were kneaded by a triple roll mill and turned into a slurry to obtain a paste for internal electrode layers.

Inner green sheets were formed on a PET film using the above-manufactured paste for inner green sheets. Next, internal electrode pattern layers were formed in a predetermined pattern using the paste for internal electrode layers, and the sheets were thereafter peeled from the PET film to obtain inner green sheets having the internal electrode pattern layers.

The inner green sheets having the internal electrode pattern layers obtained as described above were laminated alternately to manufacture an internal laminated body.

Next, an appropriate number of outer green sheets was formed on the top and bottom of the internal laminated body using a paste for outer green sheets and was pressed and adhered in the lamination direction to obtain a green laminated body. The paste for outer green sheets was obtained in a similar manner to the paste for inner green sheets.

Next, the green laminated body was cut to obtain green chips.

Next, the obtained green chips were debindered, fired, and annealed with the following conditions to obtain an element body 4.

In the debindering, the heating rate was 60° C./hour, the retention temperature was 260° C., the retention time was 8 hours, and the atmosphere was the air.

In the firing, the heating rate was 200° C./hour, the retention temperature was 1000° C. to 1200° C., and the temperature retention time was 2 hours. The cooling rate was 200° C./hour. Incidentally, the atmosphere gas was a humidified $N_2+H_2$ mixed gas.

In the annealing, the heating rate was 200° C./hour, the retention temperature was 500° C. to 1000° C., the temperature retention time was 2 hours, the cooling rate was 200° C./hour, and the atmosphere gas was a humidified $N_2$ gas.

Incidentally, a wetter was used for humidifying the atmosphere gas of the firing and the atmosphere gas of the annealing.

Next, as shown in FIG. 4, a dummy block 20 was temporarily attached between lower surfaces 4d and 4d of two element bodies 4 and 4, and these were integrated to initially form a work 22. The work 22 was attached into a through hole 32 of a holding plate 30.

Next, a paste for terminal electrodes was prepared by kneading and pasting 100 parts by mass of a mixture of spherical Cu particles (average particle size: 0.4 μm) and flaky Cu powder, 30 parts by mass of organic vehicle (5 parts by mass of ethyl cellulose resin were dissolved in 95 parts by mass of butyl carbitol), and 6 parts by mass of butyl carbitol.

The obtained paste for terminal electrodes was applied onto the end surface of the ceramic sintered body in the Y-axis direction by dipping and was fired at 850° C. for 10 minutes in $N_2$ atmosphere to form terminal electrodes 6 and 8.

Next, the dummy block 20 was removed to divide the two element bodies 4 and 4.

Next, a paste for cover layers was prepared by kneading a Si—B—Zn—O based glass powder whose softening point was 600° C., a binder whose main component was ethyl cellulose, and terpineol and acetone (dispersion media) using a mixer.

Pre-fired end cover layers were printed on the exterior surfaces of the end electrode parts 6a and 8a of the terminal electrodes 6 and 8 using the paste for cover layers.

After the printing, end cover layers 18b were fired on the dried chips while being retained at 700° C. for 0.1 hours in $N_2$ atmosphere.

The thickness of the multilayer ceramic capacitor 2 was 60 μm. The thickness of the upper electrode part 6b (8b) was 15 μm. The thickness of the end electrode part 6a (8a) was 10 μm. The relative thickness of the end cover layers 18b was 100%. The cover ratio of the end cover layers 18b was 99%. Incidentally, the cover rate of the end cover layers was measured by a SEM observation of the end surfaces.

Sample No. 2

Except for forming no end cover layers 18b, the multilayer ceramic capacitor 2 of Sample No. 2 was manufactured similarly to Sample No. 1. The specification of Sample No. 2 is shown in Table 1.

Sample No. 3

Except for changing the materials of the end cover layers 18b to a Si—Al-M-O based glass, the multilayer ceramic capacitor 2 of Sample No. 3 was manufactured similarly to Sample No. 1. The specification of Sample No. 3 is shown in Table 1.

Sample No. 4

Except for changing the materials of the end cover layers 18b to polyimide resin and for changing the cover ratio of the end cover layers 18b to 96%, the multi-layer ceramic capacitor 2 of Sample No. 4 was manufactured similarly to Sample No. 1. The specification of Sample No. 4 is shown in Table 1.

Sample No. 5

Except for changing the cover rate of the end cover layers 18b to 90%, the multilayer ceramic capacitor 2 of Sample No. 5 was manufactured similarly to Sample No. 1. The specification of Sample No. 5 is shown in Table 1.

Sample No. 6 and Sample No. 7

Except for changing the relative thickness of the end cover layers 18b as described in Table 1, the multilayer ceramic capacitors 2 of Sample No. 6 and Sample No. 7 were manufactured similarly to Sample No. 1. The specifications of Sample No. 6 and Sample No. 7 are shown in Table 1.

Sample No. 8

Except for having a step of forming the upper-surface cover layer 18, the multilayer ceramic capacitor 2 of Sample No. 8 was manufactured similarly to Sample No. 1. In Sample No. 8, the upper-surface cover layer 18 was formed after the end cover layers 18b were formed, the upper-surface cover layer 18 was formed similarly to the end cover layers 18b, and the surfaces of the upper electrode parts 6b and 8b, the surface of the upper-surface cover layer 18, and the ends of the end cover layers 18b in the Z-axis direction were polished to be substantially flush with each other. Then, the multilayer ceramic capacitor 2 of Sample No. 8 was obtained. Incidentally, the relative thickness of the upper-surface cover layer 18 was 90 to 110%. The specification of Sample No. 8 is shown in Table 1.

<Insulation Property IR after Humidity Resistance Load Test>

The obtained multilayer ceramic capacitors 2 were immersed into an acid liquid and measured in terms of insulation resistance by voltage application of 6.3V at 121° C. and 95% RH for 20 hours. Table 1 shows a relative value of each sample when the insulation resistance of Sample No. 2 was 100%. Incidentally, the insulation resistance of Sample No. 2 was $1\times10^{10}\Omega$.

<Three-Point Bending Strength>

The three-point bending strength of the obtained multilayer ceramic capacitors 2 was measured using a measuring instrument (product name: 5543, manufactured by Instron). The jig distance between two points that supported the test piece during the measurement was 400 μm. The measurement rate was 0.5 mm/min. An average (unit: MPa) of values obtained by measuring 10 test pieces was measured. Table 1 shows a relative value of each sample when the three-point bending strength of Sample No. 2 was 100%. Incidentally, the three-point bending strength of Sample No. 2 was 200 MPa.

concaves of unevenness on the surface of the element body 4 as shown in FIG. 8A3) was 20%.

After that, the resist film 60 was removed. Then, a dummy block 20 was temporarily attached between lower surfaces 4d and 4d of two element bodies 4 and 4, and these were integrated to initially form a work 22 as shown in FIG. 10B. Then, the work 22 was attached into a through hole 32 of a holding plate 30.

TABLE 1

| | End Cover Layers | | | Insulation Property | Three-Point |
| --- | --- | --- | --- | --- | --- |
| Sample No. | Presence of Upper-Surface Cover Layer | Cover Rate | Relative Thickness ※1 (%) Material | IR After Humidity Resistance Load Test (%) | Bending Strength (%) |
| 1 | no | 99% | 100 Si—B—Zn—O based glass | 100 | 120 |
| 2 | no | 0% | 0 — | less than 10% ($10 \times 10^8 \sim 10^9 \Omega$) | 100 |
| 3 | no | 99% | 100 Si—Al—M—O based glass | 100 | 130 |
| 4 | no | 96% | 100 polyimide resin | 90 | 110 |
| 5 | no | 90% | 100 Si—B—Zn—O based glass | 50 | 120 |
| 6 | no | 99% | 20 Si—B—Zn—O based glass | 100 | 110 |
| 7 | no | 99% | 500 Si—B—Zn—O based glass | 100 | 150 |
| 8 | yes | 99% | 100 Si—B—Zn—O based glass | 100 | 160 |

※1 . . . Relative Thickness of End Cover Layers (%) = (Average Thickness of End Cover Layers/Average Thickness of End Electrode Parts) × 100

According to Table 1, when the external surfaces of the end electrode parts were covered with end cover layers (Sample No. 1), the insulation property IR after the humidity resistance load test and the three-point bending strength were favorable, compared to when the external surfaces of the end electrode parts were covered with no end cover layers (Sample No. 2).

According to Table 1, even when the end cover layers were made of Si—Al-M-O based glass (Sample No. 3) and when the end cover layers were made of polyimide resin (Sample No. 4), the insulation property IR after the humidity resistance load test and the three-point bending strength were favorable.

According to Table 1, when the cover rate of the end cover layers was more than 90% (Sample No. 1, Sample No. 3, and Sample No. 4), the insulation property IR after the humidity resistance was favorable, compared to when the cover rate of the end cover layers was 90% (Sample No. 5).

According to Table 1, when the relative thickness of the end cover layers was 20 to 500% (Sample No. 1, Sample No. 6, and Sample No. 7), the insulation property IR after the humidity resistance load test and the three-point bending strength were favorable, compared to when the external surfaces of the end electrode parts were covered with no end cover layers (Sample No. 2).

According to Table 1, when there was an upper-surface cover layer in addition to end cover layers (Sample No. 8), the three-point bending strength was more favorable.

[Experiment 2]
Sample No. 101

As described below, a multilayer ceramic capacitor 2 of Sample No. 101 was manufactured.

As with Experiment 1, an element body 4 was initially obtained. Then, as shown in FIG. 10A, conductive metal films 5 were formed on the surface of the element body 4 (a resist film 60 was formed in a predetermined pattern) by a sputtering apparatus. The kind of the conductive metal films 5 is shown in Table 11. As shown in Table 11, the coverage area ratio of the metal film 5 (the metal film 5 covers Next, a paste for terminal electrodes was obtained by kneading and pasting 100 parts by mass of a mixture of spherical Cu particles (average particle size: 0.4 μm) and flaky Cu powder, 30 parts by mass of organic vehicle (5 parts by mass of ethyl cellulose resin were dissolved in 95 parts by mass of butyl carbitol), and 6 parts by mass of butyl carbitol.

The obtained paste for terminal electrodes was applied onto the end surface of the ceramic sintered body in the Y-axis direction by dipping and was fired at 850° C. for 10 minutes in $N_2$ atmosphere to form terminal electrodes 6 and 8 on the surface of the conductive metal films 5 of the element body 4.

Next, the dummy block 20 was removed to divide the two element bodies 4 and 4.

Next, a paste for cover layers was prepared by kneading a Si—B—Zn—O based glass powder whose softening point was 600° C., a binder whose main component was ethyl cellulose, and terpineol and acetone (dispersion media) using a mixer.

Pre-fired end cover layers were printed on the exterior surfaces of the end electrode parts 6a and 8a of the terminal electrodes 6 and 8 using the paste for cover layers.

After the printing, end cover layers 18b were fired on a dried chip while being retained at 700° C. for 0.1 hours in $N_2$ atmosphere. The materials of the end cover layers are shown in Table 11.

The thickness of the multilayer ceramic capacitor 2 was 60 μm. The thickness of the upper electrode part 6b (8b) was 15 μm. The thickness of the end electrode part 6a (8a) was 10 μm. The relative thickness of the end cover layers 18b was 100%. The cover ratio of the end cover layers 18b was 99%. Incidentally, the cover rate of the end cover layers was measured by a SEM observation of the end surfaces.

Sample No. 102

Except for having a long sputtering time, for setting a coverage ratio of the metal film 5 to 50%, and for forming no end cover layers 18b, the multilayer ceramic capacitor 2 of Sample No. 102 was manufactured similarly to Sample No. 101. The specification of Sample No. 102 is shown in Table 11.

Sample No. 103

Except for having a long sputtering time, for setting a coverage ratio of the metal film 5 to 50%, and for changing the materials of the end cover layers 18b to a Si—Al—Ca—O based glass, the multilayer ceramic capacitor 2 of Sample No. 103 was manufactured similarly to Sample No. 101. The specification of Sample No. 103 is shown in Table 11.

Sample No. 104

Except for having a long sputtering time, for setting a coverage ratio of the metal film 5 to 50%, and for changing the materials of the end cover layers 18b to polyimide resin, the multilayer ceramic capacitor 2 of Sample No. 104 was manufactured similarly to Sample No. 101. The specification of Sample No. 104 is shown in Table 11.

Sample No. 105

Except for having a long sputtering time, setting a coverage ratio of the metal film 5 to 70%, and changing a cover rate of the end cover layers 18b to 90%, the multilayer ceramic capacitor 2 of Sample No. 105 was manufactured similarly to Sample No. 101. The specification of Sample No. 105 is shown in Table 11.

Sample No. 106 and Sample No. 107

Except for having a long sputtering time, for setting a coverage ratio of the metal film 5 to 70%, and for changing a relative thickness of the end cover layers 18b as shown in Table 11, the multilayer ceramic capacitors 2 of Sample No. 106 and Sample No. 107 were manufactured similarly to Sample No. 101. The specifications of Sample No. 106 and Sample No. 107 are shown in Table 11.

Sample No. 108

Except for having a long sputtering time, for setting a coverage ratio of the metal film 5 to 50%, and for having a step of forming the upper-surface cover layer 18, the multilayer ceramic capacitor 2 of Sample No. 108 was manufactured similarly to Sample No. 101. In Sample No. 108, the upper-surface cover layer 18 was formed after the end cover layers 18b were formed, the upper-surface cover layer 18 was formed similarly to the end cover layers 18b, and the surfaces of the upper electrode parts 6b and 8b, the surface of the upper-surface cover layer 18, and the ends of the end cover layers 18b in the Z-axis direction were polished to be substantially flush with each other. Then, the multilayer ceramic capacitor 2 of Sample No. 108 was obtained. Incidentally, the relative thickness of the upper-surface cover layer 18 was 90 to 110%. The specification of Sample No. 108 is shown in Table 11.

Sample No. 109 to Sample No. 114

Except for changing the kind of the metal films 5 from Pt to the metals shown in Table 11, the multilayer ceramic capacitors 2 of Sample No. 109 to Sample No. 114 were manufactured similarly to Sample No. 103. The specifications of Sample No. 109 to Sample No. 114 are shown in Table 11. Incidentally, the materials of the end cover layers were changed in Sample No. 111.

Sample No. 115

Except for having a short sputtering time, for setting a coverage ratio of the metal film 5 to 10%, and for changing a cover rate of the end cover layers 18b to 90%, the multilayer ceramic capacitor 2 of Sample No. 115 was manufactured similarly to Sample No. 101. The specification of Sample No. 115 is shown in Table 11.

Sample No. 116

Except for having a long sputtering time, for setting a coverage ratio of the metal film 5 to 90%, and for changing a cover rate of the end cover layers 18b to 90%, the multilayer ceramic capacitor 2 of Sample No. 116 was manufactured similarly to Sample No. 101. The specification of Sample No. 116 is shown in Table 11.

Sample No. 117

Except for forming no metal films 5 and changing a cover rate of the end cover layers 18b to 90%, the multilayer ceramic capacitor 2 of Sample No. 117 was manufactured similarly to Sample No. 101. The specification of Sample No. 117 is shown in Table 11.

Sample No. 118

Except for forming neither metal films 5 nor end cover layers 18b, the multilayer ceramic capacitor 2 of Sample No. 118 was manufactured similarly to Sample No. 101. The specification of Sample No. 118 is shown in Table 11.

<Insulation Property IR after Humidity Resistance Load Test>

The obtained multilayer ceramic capacitors 2 were immersed into an acid liquid and measured in terms of insulation resistance by voltage application of 6.3V at 121° C. and 95% RH for 20 hours. Table 11 shows a relative value of each sample when the insulation resistance of Sample No. 101 was 100%. Incidentally, the insulation resistance of Sample No. 101 was $1 \times 10^{10} \Omega$.

<Insulation Property IR after Cycle Test (IR after Thermal Shock)>

For the obtained multilayer ceramic capacitors 2, 20 capacitor samples subjected to 2000 cycles (a cycle: the temperature was retained at −55° C. for 10 minutes in an air tank, increased to 125° C. for 5 minutes, retained at 125° C. for 10 minutes in the air tank, and decreased to −55° C. for 5 minutes) were prepared. Insulation resistances IR (insulation resistance value) of these capacitors were measured after they were applied with a DC voltage (6.3V) at 20° C. for 10 seconds using an insulation resistance meter (R8340A manufactured by Advantest) and were left as they were for 20 seconds. Table 11 shows a relative value of each sample when the insulation resistance IR of Sample No. 101 was 100%. Incidentally, the insulation resistance IR of Sample No. 101 was $1.0 \times 10^{\wedge} 10 \Omega$.

<Three-Point Bending Strength>

The three-point bending strength was measured similarly to Experiment 1. Table 11 shows a relative value of each sample when the three-point bending strength of Sample No. 102 was 100%. Incidentally, the three-point bending strength of Sample No. 102 was 200 MPa.

TABLE 11

| Sample No. | Presence of Upper-Surface Cover Layer | Presence of Conductive Metal Film | Kind of Conductive Metal Film | Coverage Area Ratio of Conductive Metal Film | End Cover Layers Cover Rate | End Cover Layers Relative Thickness |
|---|---|---|---|---|---|---|
| 101 | no | yes | Pt | 20% | 99% | 100% |
| 102 | no | yes | Pt | 70% | 0% | 0% |
| 103 | no | yes | Pt | 50% | 99% | 100% |
| 104 | no | yes | Pt | 50% | 96% | 100% |

TABLE 11-continued

| | | | | | | |
|---|---|---|---|---|---|---|
| 105 | no | yes | Pt | 70% | 90% | 100% |
| 106 | no | yes | Pt | 70% | 99% | 20% |
| 107 | no | yes | Pt | 70% | 99% | 500% |
| 108 | yes | yes | Pt | 50% | 99% | 100% |
| 109 | no | yes | Ru | 50% | 99% | 100% |
| 110 | no | yes | Rh | 50% | 99% | 100% |
| 111 | no | yes | Ru | 50% | 99% | 100% |
| 112 | no | yes | Re | 50% | 99% | 100% |
| 113 | no | yes | Ir | 50% | 99% | 100% |
| 114 | no | yes | Pd | 50% | 99% | 100% |
| 115 | no | yes | Pt | 10% | 90% | 100% |
| 116 | no | yes | Pt | 90% | 90% | 100% |
| 117 | no | no | no | 0% | 90% | 100% |
| 118 | no | no | no | 0% | 0% | 0% |

| Sample No. | End Cover Layers Material | Insulation Property IR After Humidity Resistance Load Test (%) | Insulation Property IR After Cycle Test (%) | Three-Point Bending Strength (%) |
|---|---|---|---|---|
| 101 | Si—B—Zn—O based glass | 100 | 100 | 120 |
| 102 | — | 50 | 50 | 100 |
| 103 | Si—Al—Ca—O based glass | 100 | 100 | 130 |
| 104 | polyimide resin | 100 | 100 | 110 |
| 105 | Si—B—Zn—O based glass | 80 | 80 | 120 |
| 106 | Si—B—Zn—O based glass | 100 | 100 | 110 |
| 107 | Si—B—Zn—O based glass | 100 | 100 | 150 |
| 108 | Si—B—Zn—O based glass | 100 | 100 | 160 |
| 109 | Si—Al—Ca—O based glass | 100 | 100 | 130 |
| 110 | Si—Al—Ca—O based glass | 100 | 100 | 130 |
| 111 | Si—B—Zn—O based glass | 100 | 100 | 130 |
| 112 | Si—Al—Ca—O based glass | 100 | 100 | 130 |
| 113 | Si—Al—Ca—O based glass | 100 | 100 | 130 |
| 114 | Si—Al—Ca—O based glass | 100 | 100 | 130 |
| 115 | Si—B—Zn—O based glass | 70 | 70 | 100 |
| 116 | Si—B—Zn—O based glass | 80 | 80 | 100 |
| 117 | Si—B—Zn—O based glass | 20 | 20 | 100 |
| 118 | — | less than 10% ($10 \times 10^8 \sim 10^9 \Omega$) | less than 10% ($10 \times 10^8 \sim 10^9 \Omega$) | 100 |

According to Table 11, compared to forming no conductive metal films and covering the external surfaces of the end electrode parts with no end cover layers (Sample No. 118), when forming conductive metal films and covering the external surfaces of the end electrode parts with the end cover layers (Sample No. 101), both the insulation property IR after the humidity resistance load test and the insulation property IR after the cycle test were favorable, and the three-point bending strength was favorable.

According to Table 11, when conductive metal films were formed (Sample No. 102), both the insulation property IR after the humidity resistance load test and the insulation property IR after the cycle test were favorable, compared to when no conductive metal films were formed (Sample No. 118).

According to Table 11, compared to Sample No. 118, even when the end cover layers were made of Si—Al—Ca—O based glass (Sample No. 103) and when the end cover layers were made of polyimide resin (Sample No. 104), the insulation property IR after the humidity resistance load test, the insulation property IR after the cycle test, and the three-point bending strength were favorable.

According to Table 11, when the cover rate of the end cover layers was more than 90% (Sample No. 101, Sample No. 103, and Sample No. 104), both the insulation property IR after the humidity resistance load test and the insulation property IR after the cycle test were favorable, compared to when the cover rate of the end cover layers was 90% (Sample No. 105).

According to Table 11, when the relative thickness of the end cover layers was 20 to 500% (Sample No. 101, Sample No. 106, and Sample No. 107), the insulation property IR after the humidity resistance load test, the insulation property IR after the cycle test, and the three-point bending strength were favorable, compared to when the external surfaces of the end electrode parts were covered with no end cover layers (Sample No. 118).

According to Table 11, when there was an upper-surface cover layer in addition to end cover layers (Sample No. 108), the three-point bending strength was more favorable.

According to Table 11, similar effects were obtained even though the kind of the conductive metal films was changed from Pt (Sample No. 103) to Ru, Rh, Re, Ir, or Pd (Sample No. 109 to Sample No. 114), and similar effects were also obtained even though the kind of the glass of the end cover layers was changed (Sample No. 109 and Sample No. 111).

According to Table 11, when the coverage area ratio of the conductive metal films was 10 to 90% (Sample No. 115 and Sample No. 116), both the insulation property IR after the humidity resistance load test and the insulation property IR after the cycle test were improved, compared to when no conductive metal films were formed (Sample No. 117).

[Experiment 3]

Manufacturing Example 1

Sample No. 201

As described below, the multilayer ceramic capacitor 2 of Sample No. 201 was manufactured.

As with Experiment 1, a dummy block 20 was temporarily attached between lower surfaces 4d and 4d of two element bodies 4 and 4, and these were integrated to form a work 22 as shown in FIG. 16.

Next, a reinforcement layer 116 covering an upper surface 4c was formed by the following method.

Next, a paste for reinforcement layer was prepared by kneading 100 parts by mass of a Si—Al—Ca—Zn—O based glass, 10 parts by mass of a resin whose main component was ethyl cellulose, and 35 parts by mass of terpineol and 20 parts by mass of acetone (dispersion media) using a mixer.

The entire upper surface 4c of the element body 4 of the work 22 perpendicular to the Z-axis was applied with the paste for reinforcement layer by dipping and was thereafter dried to obtain a chip. Then, the reinforcement layer 116 was fired on the upper surface 4c of the chip while being retained at 850° C. for 0.1 hours in a humidified $N_2$ atmosphere.

Next, a paste for terminal electrodes was obtained by kneading and pasting 100 parts by mass of a mixture of spherical Cu particles (average particle size: 0.4 µm) and flaky Cu powder, 30 parts by mass of organic vehicle (5 parts by mass of ethyl cellulose resin were dissolved in 95 parts by mass of butyl carbitol), and 6 parts by mass of butyl carbitol.

The obtained paste for terminal electrodes was applied onto the end surface of the ceramic sintered body in the Y-axis direction by dipping and was fired at 850° C. for 10 minutes in $N_2$ atmosphere to form terminal electrodes 6 and 8.

Next, the dummy block 20 was removed to divide the two element bodies 4 and 4.

The specification of the multilayer ceramic capacitor 2 is shown in Table 1. The thickness of the multilayer ceramic capacitor 2 was 80 µm. The thickness of the upper electrode part 6b (8b) was 15 µm. The thickness of the end electrode part 6a (8a) was 10 µm. The relative thickness of the reinforcement layer 116 covering the upper surface 4c was 20%.

Sample No. 202 to Sample No. 209 and Sample No. 215 to Sample No. 220

Except for changing the materials of the filler and the substrate of the reinforcement layer 116 covering the upper surface 4c, the amount, the shape, and the size of the filler, and the firing temperature and the firing time of the paste for reinforcement layer as described in Table 21 or Table 22, the multilayer ceramic capacitors were manufactured similarly to Sample No. 201. The specifications are shown in Table 21 or Table 22.

Sample No. 210

Except that, in forming a reinforcement layer 116 covering an upper surface 4c, a paste for reinforcement layer was prepared by kneading a plate-like alumina, a Si—Al—Zn—O based glass, a resin whose main component was ethyl cellulose, and terpineol and acetone (dispersion media) using a mixer, and that the firing temperature and the firing time of the paste for reinforcement layer were set to those described in Table 21, a multilayer ceramic capacitor was obtained similarly to Sample No. 201. The specification is shown in Table 21.

Sample No. 211

Except for adding a column-like alumina into a paste for reinforcement layer instead of a plate-like alumina in forming a reinforcement layer 116 covering an upper surface 4c, a multilayer ceramic capacitor was obtained similarly to Sample No. 210. The specification is shown in Table 22.

Sample No. 212

Except that, in forming a reinforcement layer 116 covering an upper surface 4c, a paste for reinforcement layer was prepared by kneading a Si—Al—Ca—Zn—Li—B—O based glass, a polyimide resin, and terpineol and acetone (dispersion media) using a mixer, and that the firing temperature and the firing time of the paste for reinforcement layer were set to those described in Table 22, a multilayer ceramic capacitor was obtained similarly to Sample No. 201. The specification is shown in Table 22.

Sample No. 213

Except that, in forming a reinforcement layer 116 covering an upper surface 4c, a plate-like alumina was added into a paste for reinforcement layer instead of a Si—Al—Ca—Zn—Li—B—O based glass, and that the firing temperature and the firing time of the paste for reinforcement layer were set to those described in Table 22, a multi-layer ceramic capacitor was obtained similarly to Sample No. 212. The specification is shown in Table 22.

Sample No. 214

Except for adding a column-like alumina into a paste for reinforcement layer instead of a plate-like alumina in forming a reinforcement layer 116 covering an upper surface 4c, a multilayer ceramic capacitor was obtained similarly to Sample No. 213. The specification is shown in Table 22.

Sample No. 221

Except for forming no reinforcement layer 116 covering an upper surface 4c, a multilayer ceramic capacitor was manufactured similarly to Sample No. 201. The specification is shown in Table 22.

Manufacturing Example 2

Sample No. 231 to Sample No. 239 and Sample No. 245 to Sample No. 250

Except for forming an upper-surface cover layer 18 and end cover layers in the following manner and for changing the materials of the filler and the substrate of the reinforcement layer 116, the amount, the shape, and the size of the filler, and the firing temperature and the firing time of the paste for reinforcement layer as described in Table 23 or Table 24, a multilayer ceramic capacitor was obtained similarly to Sample No. 201. The specifications are shown in Table 23 or Table 24.

The upper-surface cover layer and the end cover layers were formed as below.

First of all, based on the method of Manufacturing Example 1, a dummy block was removed to divide two element bodies 4 and 4, and an element body with terminal electrodes 6 and 8 was prepared.

Next, a paste for cover layers was prepared by kneading a Si—B—Zn—O based glass powder whose softening point was 600° C., a binder whose main component was ethyl cellulose, and terpineol and acetone (dispersion media) using a mixer.

Pre-fired end cover layers were printed on the exterior surfaces of the end electrode parts 6a and 8a of the terminal electrodes 6 and 8 using the paste for cover layers.

Next, a pre-fired upper-surface cover layer was printed between the upper electrode parts 6b and 8b using the paste for cover layers.

After the printing, the end cover layers 18b and the upper-surface cover layer 18 were fired on the dried chip while being retained at 650° C. for 0.1 hours in $N_2$ atmosphere.

Next, the surfaces of the upper electrode parts 6b and 8b, the surface of the upper-surface cover layer 18, and the ends of the end cover layers 18b in the Z-axis direction were polished to be flush with each other. Then, a multilayer ceramic capacitor was obtained.

The relative thickness of the end cover layers 18b was 100%. The cover rate of the end cover layers was 99%. The relative thickness of the upper-surface cover layer was 90% to 110%. Incidentally, the cover rate of the end cover layers was measured by a SEM observation of the end surfaces.
Sample No. 240

Except for forming an upper-surface cover layer 18 and end cover layers 18b in a similar manner to Sample No. 231, a multilayer ceramic capacitor was manufactured similarly to Sample No. 210. The specification is shown in Table 23.
Sample No. 241

Except for forming an upper-surface cover layer 18 and end cover layers 18b in a similar manner to Sample No. 231, a multilayer ceramic capacitor was manufactured similarly to Sample No. 211. The specification is shown in Table 24.
Sample No. 242

Except for forming an upper-surface cover layer 18 and end cover layers 18b in a similar manner to Sample No. 231, a multilayer ceramic capacitor was manufactured similarly to Sample No. 212. The specification is shown in Table 24.
Sample No. 243

Except for forming an upper-surface cover layer 18 and end cover layers 18b in a similar manner to Sample No. 231, a multilayer ceramic capacitor was manufactured similarly to Sample No. 213. The specification is shown in Table 24.
Sample No. 244

Except for forming an upper-surface cover layer 18 and end cover layers 18b in a similar manner to Sample No. 231, a multilayer ceramic capacitor was manufactured similarly to Sample No. 214. The specification is shown in Table 24.

Manufacturing Example 3

Sample No. 251 to Sample No. 270

Except that a reinforcement layer 116 was not formed on an upper surface 4c but formed on a lower surface 4d, and that the materials of the filler and the substrate of the reinforcement layer 116 covering the lower surface 4d, the amount, the shape, and the size of the filler, and the firing temperature and the firing time of the paste for reinforcement layer were changed as described in Table 25 or Table 26, a multi-layer ceramic capacitor was obtained similarly to Sample No. 231. The specification is shown in Table 25.

The reinforcement layer 116 covering the lower surface 4d was formed in the following manner. First of all, the entire lower surface 4d of the element body 4 perpendicular to the Z-axis was applied with a paste for reinforcement layer by dipping and thereafter dried to obtain a chip. Then, the reinforcement layer 116 covering the lower surface 4d was fired on the chip at the firing temperature and the firing time described in Table 25 or Table 26. Terminal electrodes 6 and 8, end cover layers 18b, and an upper-surface cover layer 18 were formed on the element body 4 (the reinforcement layer 116 covering the lower surface 4d was fired) by the method of Manufacturing Example 2.

The ends of the terminal electrodes 6 and 8 in the Z-axis direction near the lower surface 4d, the ends of the end cover layers 18b in the Z-axis direction near the lower surface 4d, and the exterior surface of the reinforcement layer 116 covering the lower surface 4d were polished to be flush with each other. Then, a multilayer ceramic capacitor was obtained.
Sample No. 260

Except that a reinforcement layer 116 was not formed on an upper surface 4c but formed on a lower surface 4d in a similar manner to the Sample No. 251, a multilayer ceramic capacitor was obtained similarly to Sample No. 240. The specification is shown in Table 25.
Sample No. 261

Except that a reinforcement layer 116 was not formed on an upper surface 4c but formed on a lower surface 4d in a similar manner to the Sample No. 251, a multilayer ceramic capacitor was obtained similarly to Sample No. 241. The specification is shown in Table 26.
Sample No. 262

Except that a reinforcement layer 116 was not formed on an upper surface 4c but formed on a lower surface 4d in a similar manner to the Sample No. 251, a multilayer ceramic capacitor was obtained similarly to Sample No. 242. The specification is shown in Table 26.
Sample No. 263

Except that a reinforcement layer 116 was not formed on an upper surface 4c but formed on a lower surface 4d in a similar manner to the Sample No. 251, a multilayer ceramic capacitor was obtained similarly to Sample No. 243. The specification is shown in Table 26.
Sample No. 264

Except that a reinforcement layer 116 was not formed on an upper surface 4c but formed on a lower surface 4d in a similar manner to the Sample No. 251, a multilayer ceramic capacitor was obtained similarly to Sample No. 244. The specification is shown in Table 26.

<Three-Point Bending Strength>

The three-point bending strength was measured similarly to Experiment 1. Table 21 to Table 26 show a relative value of each sample when the three-point bending strength of Sample No. 221 was 100%. Incidentally, the three-point bending strength of Sample No. 221 was 200 MPa.

<Insulation Property IR after Cycle Test (IR after Thermal Shock)>

As with Experiment 2, insulation resistances IR (insulation resistance values) were measured. Table 21 to Table 26 show a relative value of each sample when the insulation resistance IR of Sample No. 221 was 100%. Incidentally, the insulation resistance IR of Sample No. 221 was $7.7 \times 10^9 \Omega$.

TABLE 21

| Sample No. | Surface Covered by Reinforcement Layer | Material | | Amount of Filler in Reinforcement Layer [vol %] | Softening Point of Glass contained in Reinforcement Layer [° C.] | Firing Temperature of Reinforcement Layer [° C.] |
|---|---|---|---|---|---|---|
| | | Filler | Substrate | | | |
| 201 | upper surface | Si—Al—Ca—Zn—O based glass | Si—Al—Ca—Zn—O based glass | 30 | 800 | 850 |
| 202 | upper surface | Si—Al—Ca—Zn—O based glass | Si—Al—Ca—Zn—O based glass | 55 | 800 | 850 |

TABLE 21-continued

| | | | | | | |
|---|---|---|---|---|---|---|
| 203 | upper surface | Si—Al—Ca—Zn—O based glass | Si—Al—Ca—Zn—O based glass | 80 | 800 | 850 |
| 204 | upper surface | Si—Al—Ca—Zn—O based glass | Si—Al—Ca—Zn—O based glass | 30 | 800 | 850 |
| 205 | upper surface | Si—Al—Ca—Zn—O based glass | Si—Al—Ca—Zn—O based glass | 55 | 800 | 850 |
| 206 | upper surface | Si—Al—Ca—Zn—O based glass | Si—Al—Ca—Zn—O based glass | 80 | 800 | 850 |
| 207 | upper surface | Si—Al—Ca—Zn—Li—O based glass | Si—Al—Ca—Zn—Li—O based glass | 55 | 630 | 680 |
| 208 | upper surface | Si—Al—Ca—B—O based glass | Si—Al—Ca—B—O based glass | 55 | 650 | 700 |
| 209 | upper surface | Si—Al—Ca—V—O based glass | Si—Al—Ca—V—O based glass | 55 | 680 | 730 |
| 210 | upper surface | alumina | Si—Al—Zn—O based glass | 55 | 750 | 800 |

| Sample No. | Firing Time of Reinforcement Layer [hr] | Filler | | | | Presence of Upper-Surface Cover Layer and End Cover Layers | Three-Point Bending Strength (%) | IR after Thermal Shock |
|---|---|---|---|---|---|---|---|---|
| | | Shape | Particle Size in Minor Axis [μm] | Particle Size in Major Axis [μm] | Aspect Ratio of Minor Axis/ Major Axis [%] | | | |
| 201 | 0.1 | needle-like | 0.10 | 0.50 | 20.0 | no | 180% | 150% |
| 202 | 0.1 | needle-like | 0.10 | 3.00 | 3.3 | no | 160% | 150% |
| 203 | 0.1 | needle-like | 0.10 | 15.00 | 0.7 | no | 190% | 150% |
| 204 | 0.1 | needle-like | 3.00 | 5.00 | 60.0 | no | 170% | 150% |
| 205 | 0.1 | needle-like | 3.00 | 10.00 | 30.0 | no | 200% | 150% |
| 206 | 0.1 | needle-like | 3.00 | 15.00 | 20.0 | no | 220% | 150% |
| 207 | 0.1 | needle-like | 0.10 | 3.00 | 3.3 | no | 155% | 150% |
| 208 | 0.1 | needle-like | 0.10 | 3.00 | 3.3 | no | 150% | 150% |
| 209 | 0.1 | needle-like | 0.10 | 3.00 | 3.3 | no | 140% | 150% |
| 210 | 0.1 | plate-like | 0.10 | 3.00 | 3.3 | no | 170% | 155% |

TABLE 22

| Sample No. | Surface Covered by Reinforcement Layer | Material | | Amount of Filler in Reinforcement Layer [vol %] | Softening Point of Glass contained in Reinforcement Layer [° C.] | Firing Temperature of Reinforcement Layer [° C.] |
|---|---|---|---|---|---|---|
| | | Filler | Substrate | | | |
| 211 | upper surface | alumina | Si—Al—Zn—O based glass | 55 | 750 | 800 |
| 212 | upper surface | Si—Al—Ca—Zn—Li—B—O based glass | polyimide resin | 55 | 650 | 450 |
| 213 | upper surface | alumina | polyimide resin | 55 | no | 450 |
| 214 | upper surface | alumina | polyimide resin | 55 | no | 450 |
| 215 | upper surface | Si—Al—Ca—Zn—O based glass | Si—Al—Ca—Zn—O based glass | 55 | 800 | 850 |
| 216 | upper surface | Si—Al—Ca—Zn—O based glass | Si—Al—Ca—Zn—O based glass | 55 | 800 | 850 |
| 217 | upper surface | Si—Al—Ca—Zn—O based glass | Si—Al—Ca—Zn—O based glass | 55 | 800 | 850 |
| 218 | upper surface | Si—Al—Ca—Zn—O based glass | Si—Al—Ca—Zn—O based glass | 55 | 800 | 850 |
| 219 | upper surface | Si—Al—Ca—Zn—O based glass | Si—Al—Ca—Zn—O based glass | 10 | 800 | 850 |
| 220 | upper surface | Si—Al—Ca—Zn—O based glass | Si—Al—Ca—Zn—O based glass | 90 | 800 | 850 |
| 221 | no | no | no | no | no | no |

| Sample No. | Firing Time of Reinforcement Layer [hr] | Filler | | | | Presence of Upper-Surface Cover Layer and End Cover Layers | Three-Point Bending Strength (%) | IR after Thermal Shock |
|---|---|---|---|---|---|---|---|---|
| | | Shape | Particle Size in Minor Axis [μm] | Particle Size in Major Axis [μm] | Aspect Ratio of Minor Axis/ Major Axis [%] | | | |
| 211 | 0.1 | column-like | 0.10 | 3.00 | 3.3 | no | 160% | 155% |
| 212 | 0.1 | needle-like | 0.10 | 3.00 | 3.3 | no | 150% | 140% |
| 213 | 0.1 | plate-like | 0.10 | 3.00 | 3.3 | no | 140% | 140% |
| 214 | 0.1 | column-like | 0.10 | 3.00 | 3.3 | no | 130% | 140% |
| 215 | 0.1 | needle-like | 0.05 | 15.00 | 0.3 | no | 102% | 120% |

TABLE 22-continued

| | | | | | | | | |
|---|---|---|---|---|---|---|---|---|
| 216 | 0.1 | needle-like | 5.00 | 8.00 | 62.5 | no | 104% | 120% |
| 217 | 0.1 | needle-like | 0.10 | 0.10 | 100.0 | no | 106% | 120% |
| 218 | 0.1 | needle-like | 0.10 | 20.00 | 0.5 | no | 105% | 120% |
| 219 | 0.1 | needle-like | 0.10 | 3.00 | 3.3 | no | 102% | 120% |
| 220 | 0.1 | needle-like | 0.10 | 3.00 | 3.3 | no | 105% | 120% |
| 221 | no | no | no | no | no | no | 100% | 100% |

TABLE 23

| Sample No. | Surface Covered by Reinforcement Layer | Material Filler | Material Substrate | Amount of Filler in Reinforcement Layer [vol %] | Softening Point of Glass contained in Reinforcement Layer [° C.] | Firing Temperature of Reinforcement Layer [° C.] |
|---|---|---|---|---|---|---|
| 231 | upper surface | Si—Al—Ca—Zn—O based glass | Si—Al—Ca—Zn—O based glass | 30 | 800 | 850 |
| 232 | upper surface | Si—Al—Ca—Zn—O based glass | Si—Al—Ca—Zn—O based glass | 55 | 800 | 850 |
| 233 | upper surface | Si—Al—Ca—Zn—O based glass | Si—Al—Ca—Zn—O based glass | 80 | 800 | 850 |
| 234 | upper surface | Si—Al—Ca—Zn—O based glass | Si—Al—Ca—Zn—O based glass | 30 | 800 | 850 |
| 235 | upper surface | Si—Al—Ca—Zn—O based glass | Si—Al—Ca—Zn—O based glass | 55 | 800 | 850 |
| 236 | upper surface | Si—Al—Ca—Zn—O based glass | Si—Al—Ca—Zn—O based glass | 80 | 800 | 850 |
| 237 | upper surface | Si—Al—Ca—Zn—Li—O based glass | Si—Al—Ca—Zn—Li—O based glass | 55 | 630 | 680 |
| 238 | upper surface | Si—Al—Ca—B—O based glass | Si—Al—Ca—B—O based glass | 55 | 650 | 700 |
| 239 | upper surface | Si—Al—Ca—V—O based glass | Si—Al—Ca—V—O based glass | 55 | 680 | 730 |
| 240 | upper surface | alumina | Si—Al—Zn—O based glass | 55 | 750 | 800 |

| Sample No. | Firing Time of Reinforcement Layer [hr] | Filler Shape | Filler Particle Size in Minor Axis [µm] | Filler Particle Size in Major Axis [µm] | Filler Aspect Ratio of Minor Axis/Major Axis [%] | Presence of Upper-Surface Cover Layer and End Cover Layers | Three-Point Bending Strength (%) | IR after Thermal Shock |
|---|---|---|---|---|---|---|---|---|
| 231 | 0.1 | needle-like | 0.10 | 0.50 | 20.0 | yes | 200% | 150% |
| 232 | 0.1 | needle-like | 0.10 | 3.00 | 3.3 | yes | 180% | 150% |
| 233 | 0.1 | needle-like | 0.10 | 15.00 | 0.7 | yes | 210% | 150% |
| 234 | 0.1 | needle-like | 3.00 | 5.00 | 60.0 | yes | 190% | 150% |
| 235 | 0.1 | needle-like | 3.00 | 10.00 | 30.0 | yes | 220% | 150% |
| 236 | 0.1 | needle-like | 3.00 | 15.00 | 20.0 | yes | 240% | 150% |
| 237 | 0.1 | needle-like | 0.10 | 3.00 | 3.3 | yes | 175% | 150% |
| 238 | 0.1 | needle-like | 0.10 | 3.00 | 3.3 | yes | 170% | 150% |
| 239 | 0.1 | needle-like | 0.10 | 3.00 | 3.3 | yes | 160% | 150% |
| 240 | 0.1 | plate-like | 0.10 | 3.00 | 3.3 | yes | 190% | 155% |

TABLE 24

| Sample No. | Surface Covered by Reinforcement Layer | Material Filler | Material Substrate | Amount of Filler in Reinforcement Layer [vol %] | Softening Point of Glass contained in Reinforcement Layer [° C.] | Firing Temperature of Reinforcement Layer [° C.] |
|---|---|---|---|---|---|---|
| 241 | upper surface | alumina | Si—Al—Zn—O based glass | 55 | 750 | 800 |
| 242 | upper surface | Si—Al—Ca—Zn—Li—B—O based glass | polyimide resin | 55 | 650 | 450 |
| 243 | upper surface | alumina | polyimide resin | 55 | no | 450 |
| 244 | upper surface | alumina | polyimide resin | 55 | no | 450 |
| 245 | upper surface | Si—Al—Ca—Zn—O based glass | Si—Al—Ca—Zn—O based glass | 55 | 800 | 850 |

TABLE 24-continued

| Sample No. | Surface Covered by Reinforcement Layer | Material Filler | Material Substrate | Amount of Filler in Reinforcement Layer [vol %] | Softening Point of Glass contained in Reinforcement Layer [° C.] | Firing Temperature of Reinforcement Layer [° C.] |
|---|---|---|---|---|---|---|
| 246 | upper surface | Si—Al—Ca—Zn—O based glass | Si—Al—Ca—Zn—O based glass | 55 | 800 | 850 |
| 247 | upper surface | Si—Al—Ca—Zn—O based glass | Si—Al—Ca—Zn—O based glass | 55 | 800 | 850 |
| 248 | upper surface | Si—Al—Ca—Zn—O based glass | Si—Al—Ca—Zn—O based glass | 55 | 800 | 850 |
| 249 | upper surface | Si—Al—Ca—Zn—O based glass | Si—Al—Ca—Zn—O based glass | 10 | 800 | 850 |
| 250 | upper surface | Si—Al—Ca—Zn—O based glass | Si—Al—Ca—Zn—O based glass | 90 | 800 | 850 |
| 221 | no | no | no | no | no | no |

| Sample No. | Firing Time of Reinforcement Layer [hr] | Filler Shape | Filler Particle Size in Minor Axis [μm] | Filler Particle Size in Major Axis [μm] | Aspect Ratio of Minor Axis/ Major Axis [%] | Presence of Upper-Surface Cover Layer and End Cover Layers | Three-Point Bending Strength (%) | IR after Thermal Shock |
|---|---|---|---|---|---|---|---|---|
| 241 | 0.1 | column-like | 0.10 | 3.00 | 3.3 | yes | 180% | 155% |
| 242 | 0.1 | needle-like | 0.10 | 3.00 | 3.3 | yes | 160% | 140% |
| 243 | 0.1 | plate-like | 0.10 | 3.00 | 3.3 | yes | 160% | 140% |
| 244 | 0.1 | column-like | 0.10 | 3.00 | 3.3 | yes | 150% | 140% |
| 245 | 0.1 | needle-like | 0.05 | 15.00 | 0.3 | yes | 112% | 120% |
| 246 | 0.1 | needle-like | 5.00 | 8.00 | 62.5 | yes | 114% | 120% |
| 247 | 0.1 | needle-like | 0.10 | 0.10 | 100.0 | yes | 116% | 120% |
| 248 | 0.1 | needle-like | 0.10 | 20.00 | 0.5 | yes | 115% | 120% |
| 249 | 0.1 | needle-like | 0.10 | 3.00 | 3.3 | yes | 112% | 120% |
| 250 | 0.1 | needle-like | 0.10 | 3.00 | 3.3 | yes | 115% | 120% |
| 221 | no | no | no | no | no | yes | 100% | 100% |

TABLE 25

| Sample No. | Surface Covered by Reinforcement Layer | Material Filler | Material Substrate | Amount of Filler in Reinforcement Layer [vol %] | Softening Point of Glass contained in Reinforcement Layer [° C.] | Firing Temperature of Reinforcement Layer [° C.] |
|---|---|---|---|---|---|---|
| 251 | lower surface | Si—Al—Ca—Zn—O based glass | Si—Al—Ca—Zn—O based glass | 30 | 800 | 850 |
| 252 | lower surface | Si—Al—Ca—Zn—O based glass | Si—Al—Ca—Zn—O based glass | 55 | 800 | 850 |
| 253 | lower surface | Si—Al—Ca—Zn—O based glass | Si—Al—Ca—Zn—O based glass | 80 | 800 | 850 |
| 254 | lower surface | Si—Al—Ca—Zn—O based glass | Si—Al—Ca—Zn—O based glass | 30 | 800 | 850 |
| 255 | lower surface | Si—Al—Ca—Zn—O based glass | Si—Al—Ca—Zn—O based glass | 55 | 800 | 850 |
| 256 | lower surface | Si—Al—Ca—Zn—O based glass | Si—Al—Ca—Zn—O based glass | 80 | 800 | 850 |
| 257 | lower surface | Si—Al—Ca—Zn—Li—O based glass | Si—Al—Ca—Zn—Li—O based glass | 55 | 630 | 680 |
| 258 | lower surface | Si—Al—Ca—B—O based glass | Si—Al—Ca—B—O based glass | 55 | 650 | 700 |
| 259 | lower surface | Si—Al—Ca—V—O based glass | Si—Al—Ca—V—O based glass | 55 | 680 | 730 |
| 260 | lower surface | alumina | Si—Al—Zn—O based glass | 55 | 750 | 800 |

| Sample No. | Firing Time of Reinforcement Layer [hr] | Filler Shape | Filler Particle Size in Minor Axis [μm] | Filler Particle Size in Major Axis [μm] | Aspect Ratio of Minor Axis/ Major Axis [%] | Presence of Upper-Surface Cover Layer and End Cover Layers | Three-Point Bending Strength (%) | IR after Thermal Shock |
|---|---|---|---|---|---|---|---|---|
| 251 | 0.1 | needle-like | 0.10 | 0.50 | 20.0 | yes | 190% | 150% |
| 252 | 0.1 | needle-like | 0.10 | 3.00 | 3.3 | yes | 170% | 150% |
| 253 | 0.1 | needle-like | 0.10 | 15.00 | 0.7 | yes | 200% | 150% |
| 254 | 0.1 | needle-like | 3.00 | 5.00 | 60.0 | yes | 180% | 150% |
| 255 | 0.1 | needle-like | 3.00 | 10.00 | 30.0 | yes | 210% | 150% |
| 256 | 0.1 | needle-like | 3.00 | 15.00 | 20.0 | yes | 230% | 150% |
| 257 | 0.1 | needle-like | 0.10 | 3.00 | 3.3 | yes | 165% | 150% |
| 258 | 0.1 | needle-like | 0.10 | 3.00 | 3.3 | yes | 160% | 150% |

TABLE 25-continued

| | | | | | | | | |
|---|---|---|---|---|---|---|---|---|
| 259 | 0.1 | needle-like | 0.10 | 3.00 | 3.3 | yes | 150% | 150% |
| 260 | 0.1 | plate-like | 0.10 | 3.00 | 3.3 | yes | 180% | 155% |

TABLE 26

| Sample No. | Surface Covered by Reinforcement Layer | Material | | Amount of Filler in Reinforcement Layer [vol %] | Softening Point of Glass contained in Reinforcement Layer [° C.] | Firing Temperature of Reinforcement Layer [° C.] |
|---|---|---|---|---|---|---|
| | | Filler | Substrate | | | |
| 261 | lower surface | alumina | Si—Al—Zn—O based glass | 55 | 750 | 800 |
| 262 | lower surface | Si—Al—Ca—Zn—L—B—O based glass | polyimide resin | 55 | 650 | 450 |
| 263 | lower surface | alumina | polyimide resin | 55 | no | 450 |
| 264 | lower surface | alumina | polyimide resin | 55 | no | 450 |
| 265 | lower surface | Si—Al—Ca—Zn—O based glass | Si—Al—Ca—Zn—O based glass | 55 | 800 | 850 |
| 266 | lower surface | Si—Al—Ca—Zn—O based glass | Si—Al—Ca—Zn—O based glass | 55 | 800 | 850 |
| 267 | lower surface | Si—Al—Ca—Zn—O based glass | Si—Al—Ca—Zn—O based glass | 55 | 800 | 850 |
| 268 | lower surface | Si—Al—Ca—Zn—O based glass | Si—Al—Ca—Zn—O based glass | 55 | 800 | 850 |
| 269 | lower surface | Si—Al—Ca—Zn—O based glass | Si—Al—Ca—Zn—O based glass | 10 | 800 | 850 |
| 270 | lower surface | Si—Al—Ca—Zn—O based glass | Si—Al—Ca—Zn—O based glass | 90 | 800 | 850 |
| 221 | no | no | no | no | no | no |

| Sample No. | Firing Time of Reinforcement Layer [hr] | Filler | | | | Presence of Upper-Surface Cover Layer and End Cover Layers | Three-Point Bending Strength (%) | IR after Thermal Shock |
|---|---|---|---|---|---|---|---|---|
| | | Shape | Particle Size in Minor Axis [μm] | Particle Size in Major Axis [μm] | Aspect Ratio of Minor Axis/Major Axis [%] | | | |
| 261 | 0.1 | column-like | 0.10 | 3.00 | 3.3 | yes | 170% | 155% |
| 262 | 0.1 | needle-like | 0.10 | 3.00 | 3.3 | yes | 150% | 140% |
| 263 | 0.1 | plate-like | 0.10 | 3.00 | 3.3 | yes | 150% | 140% |
| 264 | 0.1 | column-like | 0.10 | 3.00 | 3.3 | yes | 140% | 140% |
| 265 | 0.1 | needle-like | 0.05 | 15.00 | 0.3 | yes | 107% | 120% |
| 266 | 0.1 | needle-like | 5.00 | 8.00 | 62.5 | yes | 109% | 120% |
| 267 | 0.1 | needle-like | 0.10 | 0.10 | 100.0 | yes | 111% | 120% |
| 268 | 0.1 | needle-like | 0.10 | 20.00 | 0.5 | yes | 110% | 120% |
| 269 | 0.1 | needle-like | 0.10 | 3.00 | 3.3 | yes | 107% | 120% |
| 270 | 0.1 | needle-like | 0.10 | 3.00 | 3.3 | yes | 110% | 120% |
| 221 | no | no | no | no | no | yes | 100% | 100% |

According to Table 21 and Table 22, the three-point bending strength was high when there was a reinforcement layer covering an upper surface (Sample No. 201 to Sample No. 220) compared to when there was no reinforcement layer covering an upper surface (Sample No. 221).

According to Table 21 and Table 22, the IR after thermal shock was favorable when there was a reinforcement layer covering an upper surface (Sample No. 201 to Sample No. 220) compared to when there was no reinforcement layer covering an upper surface (Sample No. 221). This confirms that the adhesion between the upper-surface electrode parts and the reinforcement layer covering the upper surface was favorable when there was a reinforcement layer covering an upper surface (Sample No. 201 to Sample No. 220) compared to when there was no reinforcement layer covering an upper surface.

According to Table 21 and Table 24, the three-point bending strength was high when there were an upper-surface cover layer and end cover layers (Sample No. 231 to Sample No. 250) compared to when there was no upper-surface cover layer or end cover layers (Sample No. 201 to Sample No. 220).

According to Table 25 and Table 26, the three-point bending strength was high when there was a reinforcement layer covering a lower surface (Sample No. 231 to Sample No. 250) compared to when there was no reinforcement layer covering a lower surface (Sample No. 221).

DESCRIPTION OF THE REFERENCE NUMERICAL 2, 2a, 2b, 2c . . . multilayer ceramic capacitor
4 . . . element body
4a, 4b . . . leading end
4c . . . upper surface
4d . . . lower surface
4e . . . lateral surface
5 . . . conductive metal film
5a . . . inner end 6 . . . first terminal electrode
6a . . . end electrode part
6b . . . upper electrode part
6c . . . lateral electrode part
8 . . . second terminal electrode
8a . . . end electrode part
8b . . . upper electrode part
8c . . . lateral electrode part
10 . . . inner dielectric layer
11 . . . exterior region
12 . . . internal electrode layer
12a, 12b . . . leading part
13 . . . interior region
14 . . . side-gap region
116 . . . reinforcement layer
16 . . . upper-surface reinforcement layer
16a . . . lateral reinforcement layer
18 . . . upper-surface reinforcement layer
18a . . . lateral cover layer
18b . . . end cover layer
18c . . . lower-surface cover layer
20 . . . dummy block
22 . . . work
30 . . . holding plate
32 . . . through hole
40 . . . multilayer substrate
40a . . . circuit board
42, 42a . . . wiring pattern
50 . . . solder
60 . . . resist film
62 . . . installation stand

What is claimed is:

1. A multi-layer ceramic electronic device comprising:
an element body in which internal electrode layers and insulation layers substantially parallel to a plane including a first axis and a second axis are laminated alternately in a third axis; and
terminal electrodes formed on an external surface of the element body and electrically connected with the internal electrode layers,
wherein the terminal electrodes include:
a pair of end electrode parts facing each other in the second axis and covering ends of the element body in the second axis in which the internal electrode layers are led; and
a pair of upper electrode parts continuing to the end electrode parts and each partially covering an upper surface of the element body substantially perpendicular to the third axis,
wherein external surfaces of the end electrode parts are covered with end cover layers,
wherein the element body includes a reinforcement layer,
wherein the reinforcement layer covers at least one of a pair of lateral surfaces facing each other in the first axis, the upper surface, and the lower surface of the element body,
wherein the reinforcement layer contains a filler and a substrate,
wherein the filler is made of glass or alumina,
wherein the filler has a needle-like shape, a column-like shape, or a plate-like shape, and
wherein the terminal electrodes are not substantially formed on a lower surface of the element body located opposite to the upper surface of the element body in the third axis.

2. A multi-layer ceramic electronic device comprising:
an element body in which internal electrode layers and insulation layers substantially parallel to a plane including a first axis and a second axis are laminated alternately in a third axis; and
terminal electrodes formed on an external surface of the element body and electrically connected with the internal electrode layers,
wherein the terminal electrodes include:
a pair of end electrode parts facing each other in the second axis and covering ends of the element body in the second axis in which the internal electrode layers are led; and
a pair of upper electrode parts continuing to the end electrode parts and each partially covering an upper surface of the element body substantially perpendicular to the third axis,
wherein external surfaces of the end electrode parts are covered with end cover layers,
wherein the element body includes a reinforcement layer,
wherein the reinforcement layer covers at least one of a pair of lateral surfaces facing each other in the first axis, the upper surface, and the lower surface of the element body,
wherein the reinforcement layer contains a filler and a substrate,
wherein the filler is made of glass or alumina,
wherein the filler has a needle-like shape, a column-like shape, or a plate-like shape, and
wherein a lower surface of the element body located opposite to the upper surface of the element body in the third axis is entirely exposed outside.

3. The multi-layer ceramic electronic device according to claim 1, wherein an upper-surface cover layer covering the upper surface of the element body located between the pair of upper electrode parts has an external surface substantially flush with external surfaces of the upper electrode parts.

4. The multi-layer ceramic electronic device according to claim 2, wherein an upper-surface cover layer covering the upper surface of the element body located between the pair of upper electrode parts has an external surface substantially flush with external surfaces of the upper electrode parts.

* * * * *